United States Patent
Fujiwara

(10) Patent No.: US 8,338,320 B2
(45) Date of Patent: Dec. 25, 2012

(54) OPTICAL GLASS, PREFORM FOR PRECISION PRESS-MOLDING, OPTICAL ELEMENT, METHODS FOR MANUFACTURING THEREOF, AND IMAGING DEVICE

(75) Inventor: Yasuhiro Fujiwara, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 45 days.

(21) Appl. No.: 12/599,405

(22) PCT Filed: May 28, 2009

(86) PCT No.: PCT/JP2009/002367
§ 371 (c)(1),
(2), (4) Date: Mar. 17, 2010

(87) PCT Pub. No.: WO2009/144947
PCT Pub. Date: Dec. 3, 2009

(65) Prior Publication Data
US 2010/0255979 A1 Oct. 7, 2010

(30) Foreign Application Priority Data

May 30, 2008 (JP) .................. 2008-143566
Mar. 25, 2009 (JP) .................. 2009-074729

(51) Int. Cl.
C03C 3/15 (2006.01)
C03C 3/155 (2006.01)
C03C 3/068 (2006.01)

(52) U.S. Cl. ............... 501/50; 501/51; 501/78; 501/79
(58) Field of Classification Search ............... 501/50, 501/51, 78, 79
See application file for complete search history.

(56) References Cited

U.S. PATENT DOCUMENTS

| 2005/0188724 A1 | 9/2005 | Ikenishi et al. |
| 2005/0197243 A1 | 9/2005 | Hayashi |
| 2007/0049483 A1* | 3/2007 | Hayashi .............. 501/78 |
| 2008/0167172 A1* | 7/2008 | Hayashi .............. 501/51 |

FOREIGN PATENT DOCUMENTS

| CN | 1663923 A | 9/2005 |
| JP | 2005-247613 A | 9/2005 |
| JP | 2005-281124 A | 10/2005 |
| JP | 2008-120677 A | 5/2008 |
| WO | WO 2008050591 A1 * | 5/2008 |

OTHER PUBLICATIONS

International Preliminary Report on Patentability and Written Opinion dated Dec. 9, 2010.
Chinese Office Action corresponding to Chinese Patent Application No. 200980000421.1, dated Jul. 5, 2011.
Chinese Office Action corresponding to Chinese Patent Application No. 200980000421.1, dated Feb. 6, 2012.

* cited by examiner

Primary Examiner — Karl Group
(74) Attorney, Agent, or Firm — Sughrue Mion, PLLC

(57) ABSTRACT

An optical Glass characterized by comprising, denoted as molar percentages: $B_2O_5$—5 to 45 percent; $SiO_2$—0 to 6 percent (excluding 6 percent); $Li_2O$, $Na_2O$, $K_2O$ in total—0 to 3 percent; ZnO—10 to 40 percent; $La_2O_3$—5 to 30 percent; $Gd_2O_3$—1 to 20 percent; and $ZrO_2$, $TaO_2$, $TiO_2$, $Nb_2O_5$, $WO_3$, and $Bi_2O_3$ in total—2.5 to 20 percent. The cation ratio of the $Ti^{4+}$ content relative to the total content of $Zr^{4+}$, $Ta^{5+}$, $Ti^{4+}$, $Nb^{5+}$, $W^{6+}$, and $Bi^{3+}$ is 0.30 or lower; in that the temperature Tp at which a viscosity of $10^{7.2}$ dPa·s is exhibited is 706° C. or lower. The refractive index nd and the Abbé number ν(nu)d satisfy all of the following relations (I) to (IV): $34.0 \leq \nu d < 40$ (I); $nd \geq 1.87$ (II); $nd \geq 2.245 - 0.01 \times \nu d$ (III) and $nd \leq 2.28 - 0.01 \times \nu d$ (IV).

15 Claims, 1 Drawing Sheet

US 8,338,320 B2

OPTICAL GLASS, PREFORM FOR PRECISION PRESS-MOLDING, OPTICAL ELEMENT, METHODS FOR MANUFACTURING THEREOF, AND IMAGING DEVICE

CROSS-REFERENCES TO RELATED PATENT APPLICATIONS

The present application claims priority under Japanese Patent Application 2008-143566, filed on May 30, 2008, and Japanese Patent Application 2009-74729, filed on Mar. 25, 2009, the entire contents of which are hereby incorporated by reference.

TECHNICAL FIELD

The present invention relates to an optical glass of high refractive index that is well suited to precision press molding, an optical element and a preform for precision press molding comprised of this glass, and methods for manufacturing the same.

BACKGROUND ART

Chromatic aberration in imaging systems typified by camera lenses and the like is corrected by combining high dispersion lenses and low dispersion lenses. In recent years, to the extent that aberration can be corrected, the tendency has been to employ optical glass of higher refractive index in both high and low dispersion lenses to achieve greater functionality and greater compactness.

It is possible to achieve greater compactness and functionality in an optical system by employing an optically functional surface on an aspherical lens in addition to the optical characteristics of the glass constituting the lens. Precision press molding is suited to the production of such lenses in large quantities.

To increase the productivity of precision press molding, it is first necessary for the glass material or preform for precision pressing to have a certain moldability to ensure production properties. That is, a certain level of glass viscosity at a temperature at which crystals do not precipitate or a certain resistance to devitrification at a temperature where the glass has a viscosity permitting molding is required.

In addition, it is necessary to increase the productivity of precision press molding. An expensive mold material having resistance to heat and high rigidity, such as SiC or a carbide material, and a pressing mold the molding surface of which has been precision processed into a shape that is the reverse of the shape of the optically functional surface of an optical element, are employed in precision press molding. Thus, the service life of the pressing mold greatly affects production costs and large-quantity productivity. Thus, effort is expended on employing a glass with a low glass transition temperature and a low sag temperature to lower the temperature during press molding and avoid thermal degradation of the pressing mold.

Patent Documents 1 and 2 propose low-dispersion glasses for use in precision press molding.

[Patent Document 1] JP-A-2006-016293
[Patent Document 2] JP-A-2006-016295

The descriptions in above-mentioned Patent Documents 1 and 2, and of US2005-0272589A1 and US2008-0220961, which are members of the family of Patent Documents 1 and 2, are hereby incorporated by reference in their entirety.

Problems to be Solved by the Invention

The glasses specifically disclosed in above-mentioned Patent Documents 1 and 2 are all high refractive index, low dispersion glasses with Abbé numbers $\nu_d$ of 40 or higher. These glasses contain large quantities of rare earth components such as $La_2O_3$ and $Gd_2O_3$ that impart a high refractive index and low dispersion to the composition. Further, by minimizing the contents of components such as $ZrO_2$, $Ta_2O_5$, $TiO_2$, $Nb_2O_5$, $WO_3$, and $Bi_2O_3$, which impart a high refractive index but compromise low dispersion, both a high refractive index and low dispersion are achieved. Glasses containing large amounts of rare earth components are characterized in that the thermal stability of the glass decreases as the content of the rare earth component used to raise the refractive index increases, and in that crystallization tends to increase when large amounts of alkali components or alkaline earth components are incorporated to lower the glass transition temperature.

In such glasses, when the glass transition temperature is lowered to prevent thermal degradation of the pressing mold during precision press molding, the thermal stability of the glass decreases, the liquidus temperature increases, and the viscosity at the liquidus temperature decreases, making it hard to mold the glass melt. As a result, the productivity of glass material or preforms for precision press molding drops markedly. When the productivity of the glass material or preform for precision glass molding drops in the series of processes from melting the glass to manufacturing a lens, the productivity of the process as a whole also diminishes.

To solve this problem, it is effective to increase the refractive index while keeping in mind the low temperature softening properties and thermal stability of the glass. One conceivable specific measure is to employ a $B_2O_3$—$La_2O_3$ composition as a base and incorporate or increase the quantity of high refractive index-imparting components that also impart stability to the glass, such as $ZrO_2$, $Ta_2O_5$, $TiO_2$, $Nb_2O_5$, $WO_3$, and $Bi_2O_3$.

In this process, it is not necessary to limit the Abbé number $\nu_d$ of a low dispersion glass to 40 or higher. The degree of aberration correction achieved based on the optical characteristics of the high dispersion lens with which it is combined is taken into account, the Abbé number is reduced to the extent possible, and the refractive index is increased by that amount to improve the moldability of the glass, thereby achieving greater functionality and greater compactness in the optical device without compromising the productivity of the optical glass.

However, in glasses with increased quantities of $ZrO_2$, $Ta_2O_5$, $TiO_2$, $Nb_2O_5$, $WO_3$, and $Bi_2O_3$, not only does low dispersion diminish in the manner set forth above, but precision press moldability also becomes problematic.

For example, despite lowering the viscosity to a degree permitting adequate press molding at a temperature at which thermal degradation of the mold tends not to occur, there are problems in that various defects are generated in the pressing surface by precision press molding, compromising optical performance.

Accordingly, when such glasses are precision press molded, there are problems in that the glass fuses to the pressing mold, bubbles are produced on the surface of the glass, and the jig used to introduce the heated preform into the pressing mold fuses to the preform as the number of press moldings with a single pressing mold increases. As a result, the molding yield per pressing mold decreases and temporary halting of production to replace a mold tends to compromise productivity. In extreme cases, there is the possibility of a major problem in the form of fusion of the glass and pressing mold damaging the pressing mold or press apparatus.

High demand is anticipated for lenses manufactured from high refractive index, low dispersion glasses, which are the key to high functionality and compactness. There is a great need to solve such problems and increase large-quantity productivity.

The first object of the present invention, devised to solve such problems, is to provide an optical glass that is suited to precision press molding and is of good moldability; an optical element and a preform for precision press molding that are comprised of this optical glass; and methods for manufacturing the precision press molding preform and optical element. The second object is to provide an imaging device in which the above optical element is mounted.

Means of Solving the Problems

The means of solving the above problems in the present invention is as follows.

[1]

An optical Glass characterized by comprising, denoted as molar percentages:

| | |
|---|---|
| $B_2O_3$ | 5 to 45 percent; |
| $Li_2O$ | 0 to 3 percent; |
| $ZnO$ | 10 to 40 percent; |
| $La_2O_3$ | 5 to 30 percent; |
| $Gd_2O_3$ | 0 to 20 percent; and | at least one from among $TiO_2$, $Nb_2O_5$, $WO_3$, and $Bi_2O_3$; in that the total content X of Ti, Nb, W, and Bi, denoted as a cation percentage, is 3 to 35 percent; in that the Abbé number ν(nu)d and refractive index nd fall within the range delimited by sequentially connecting with straight lines points A (40, 1.85), B (39, 1.91), C (33, 1.93), D (34, 1.87), and A (40, 1.85) in FIG. 1 (where lines AB, BC, CD, and DA are included, and point A is excluded); and in that the glass transition temperature Tg satisfies relation (1) below:

$$Tg[°C.] \leq 655° C. - 5 \times X \qquad (1).$$

[2]

The optical Glass of [1], wherein the glass further comprises

| | |
|---|---|
| $ZrO_2$ | 0 to 10 molar percent; and |
| $Ta_2O_5$ | 0 to 20 molar percent. |

[3]

The optical Glass of [1] or [2], wherein the glass further comprises, denoted as molar percentages:

| | |
|---|---|
| $Na_2O$ and $K_2O$ in total | equal to or more than 0 percent and less than 0.5 percent; |
| MgO, CaO, SrO, and BaO in total | 0 to 10 percent; |
| $Y_2O_3$ | 0 to 10 percent; |
| $Yb_2O_3$ | 0 to 10 percent; and |
| $Al_2O_3$ | 0 to 10 percent. |

[4]

The optical Glass of any of [1] to [3], wherein the glass further comprises $SiO_2$ as an optional component and content of $SiO_2$ is 0 to 0.55-fold content of $B_2O_3$.

[5]

An optical Glass characterized by comprising, denoted as molar percentages:

| | |
|---|---|
| $B_2O_3$ | 5 to 45 percent; |
| $SiO_2$ | 0 to 6 percent (excluding 6 percent); |
| $Li_2O$, $Na_2O$, $K_2O$ in total | 0 to 3 percent; |
| ZnO | 10 to 40 percent; |
| $La_2O_3$ | 5 to 30 percent; |
| $Gd_2O_3$ | 0 to 20 percent; and |
| $ZrO_2$, $TaO_2$, $TiO_2$, $Nb_2O_5$, $WO_3$, and $Bi_2O_3$ in total | 12.5 to 20 percent; | in that the cation ratio of the $Ti^{4+}$ content relative to the total content of $Zr^{4+}$, $Ta^{5+}$, $Ti^{4+}$, $Nb^{5+}$, $W^{6+}$, and $Bi^{3+}$ is 0.30 or lower; in that the temperature Tp at which a viscosity of $10^{7.2}$ dPa·s is exhibited is 706° C. or lower; and in that the refractive index nd and the Abbé number ν(nu)d satisfy all of relations (I) to (IV) below.

$$34.0 \leq vd < 40 \qquad (I)$$

$$nd \geq 1.87 \qquad (II)$$

$$nd \geq 2.23 - 0.01 \times vd \qquad (III)$$

$$nd \leq 2.28 - 0.01 \times vd \qquad (IV)$$

[6]

The optical Glass of [5], wherein the glass further comprises 1 to 20 molar percent of $Gd_2O_3$.

[7]

The optical Glass of [5] or [6], wherein the glass further comprises, denoted as molar percentages:

| | |
|---|---|
| $ZrO_2$ | equal to or less than 10 percent; |
| $Ta_2O_5$ | equal to or less than 15 percent; |
| $TiO_2$ | equal to or less than 10 percent; |
| $Nb_2O_5$ | equal to or less than 8 percent; |
| $WO_3$ | equal to or less than 20 percent; and |
| $Bi_2O_3$ | equal to or less than 10 molar percent. |

[8]

The optical Glass of any of [5] to [7], wherein the glass further comprises, denoted as molar percentages:

| | |
|---|---|
| MgO, CaO, SrO, and BaO in total | 0 to 10 percent; |
| $Y_2O_3$ | 0 to 10 percent; |
| $Yb_2O_3$ | 0 to 10 percent; and |
| $Al_2O_3$ | 0 to 10 percent. |

[9]

The optical Glass of any of [1] to [8], characterized in that the glass further comprises as a optional element 0 to 10 molar percent of $Y_2O_3$; and the ratio of the $La_2O_3$ content to the total content of $La_2O_3$, $Gd_2O_3$, and $Y_2O_3$ ($La_2O_3 + Gd_2O_3 + Y_2O_3$), which is ($La_2O_3/(La_2O_3 + Gd_2O_3 + Y_2O_3)$) is greater than 0.66.

[10]

The optical Glass of any of [1] to [9], wherein the glass comprises, denoted as molar percentages:

| | |
|---|---|
| $TiO_2$ | equal to or less than 10 percent; |
| $Nb_2O_5$ | equal to or less than 8 percent; |
| $WO_3$ | equal to or less than 20 percent; and |
| $Bi_2O_3$ | equal to or less than 10 percent. |

[11]

The optical Glass of any of [1] to [10], wherein the glass comprises:

$Ta_2O_5$ 1 to 15 molar percent.

[12]

The optical Glass of any of [1] to [11], wherein liquidus temperature is equal to or lower than 1,200° C.

[13]

A preform for precise press molding comprised of the optical glass of any of [1] to [8].

[14]

A method of manufacturing a preform for precision press molding comprising melting glass starting materials; causing the glass melt obtained to flow out; separating the glass melt gobs; and molding the glass melt gobs in a cooling step, characterized in that a preform comprised of the optical glass of any of [1] to [12] is molded.

[15]

A method of manufacturing a preform for precision press molding comprising melting glass starting materials; molding the glass melt obtained to prepare a molded article; and processing the molded article to prepare a preform comprised of the optical glass of any of [1] to [12] is molded.

[16]

An optical element comprised of the optical glass of any of [1] to [12].

[17]

An optical element obtained by precision press molding a preform for precise press molding of [13].

[18]

A method of manufacturing an optical element comprising precision press molding a preform of [13], or a preform produced by a method of [14] or [15].

[19]

A method of manufacturing an optical element comprising precision press molding preforms of [13], or preforms produced by a method of [14] or [15] by repeatedly being processed in a precision press molding step using a single pressing mold to produce a large quantity of optical elements.

[20]

The method of manufacturing an optical element of [18] or [19], wherein the preform is introduced into a pressing mold, the preform and pressing mold are heated together, and precision press molding is conducted.

[21]

The method of manufacturing an optical element of [18] or [19], wherein the preform that has been heated is introduced into a preheated pressing mold and precision press molding is conducted.

[22]

An imaging device equipped with the optical element of [18] or [19].

Effect of the Invention

The present invention provides an optical glass that is suited to precision press molding and is of good moldability; an optical element and a preform for precision press molding that are comprised of this optical glass; methods for manufacturing the precision press molding preform and optical element; and an imaging device equipped with the above optical element.

MODES OF CARRYING OUT THE INVENTION

Figure 1:
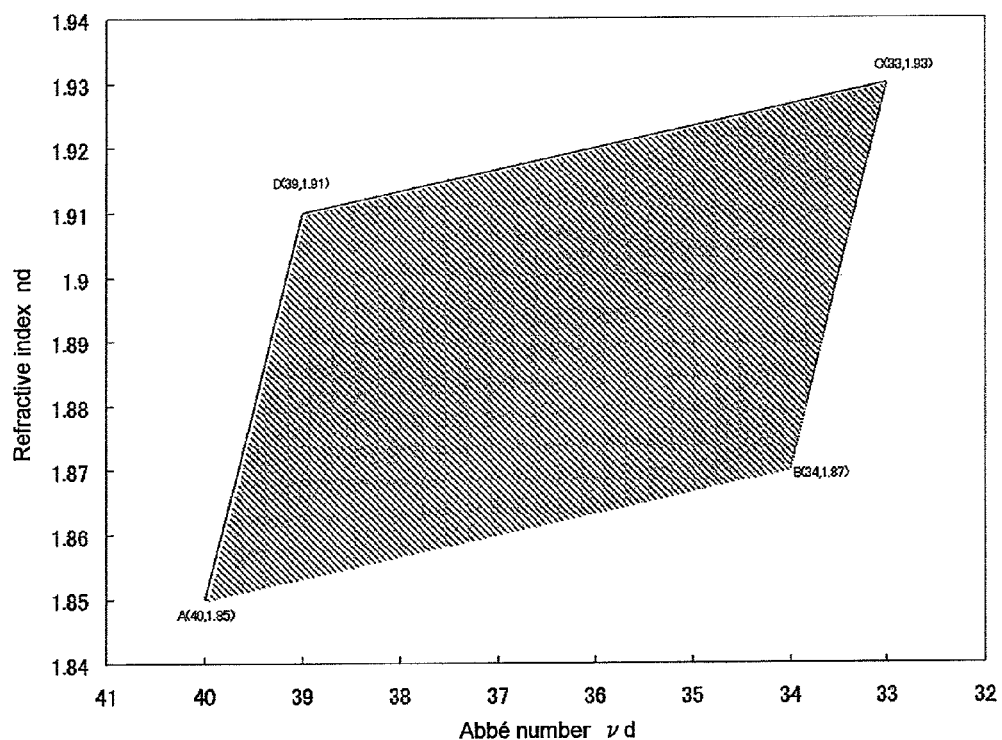
FIG. 1 shows the distribution of the refractive index nd and Abbé number v(nu)d of Optical Glass I.

The optical glass of the present invention has two forms. The first aspect is called Optical Glass I and the second aspect is called Optical Glass II.

[Optical Glass I]

Optical Glass I of the present invention is an optical glass based on a $B_2O_3$—$La_2O_3$ composition having a refractive index nd exceeding 1.85 and an Abbé number v(nu)d of less than 40. The present inventors surmised that the main reason that the precision press moldability of glasses having such optical characteristics decreased was that the Ti ions, Nb ions, W ions, and Bi ions incorporated in substantial quantities into the glass reacted with the molding surface of the pressing mold at high temperatures. Ti ions, Nb ions, W ions, and Bi ions tend to undergo a change in valence at elevated temperature during press molding. As a result, they are thought to tend to cause an oxidation-reduction reaction with the molding surface. The present inventors thought that if this reaction could be suppressed even in glasses containing large quantities of $TiO_2$, $Nb_2O_5$, $WO_3$, and $Bi_2O_3$, precision press moldability could be improved.

Accordingly, the present inventors conducted various research. As a result, they discovered that by considering the following four factors in establishing a glass composition and glass characteristics, it was possible to improve precision press molding. Form 1 of the present invention was devised on that basis.

The first factor relates to temperature. The above reaction is promoted by a rise in temperature. Accordingly, it is important to impart thermal characteristics permitting press molding at a low temperature to the glass. Conventionally, the glass transition temperature, an indicator of the low temperature softening property of a glass, is established from the perspective of inhibiting thermal degradation of the pressing mold. However, simply lowering the glass transition temperature to a degree at which thermal degradation of the pressing mold tends not to occur is not enough to inhibit reaction of the molding surface with Ti ions, Nb ions, W ions, and Bi ions. From the perspective of inhibiting the oxidation-reduction reaction between these ions and the molding surface, determining the glass transition temperature was found to be important. The greater the total content of Ti, Nb, W, and Bi, the lower the glass transition temperature from the perspective of inhibiting the reaction. When the total content of Ti, Nb, W, and Bi is small, the limit on the glass transition temperature is relaxed, making it possible to inhibit the reaction between the above cations and the molding surface. That is, determining the upper limit of the glass transition temperature by means of the total content of the above cation components is a first means of solving the problems.

The second factor relates to glass network-forming components. Among glass network-forming components, $B_2O_3$ assumes a triple or quadruple-coordinated structure. The quadruple-coordinated $BO_4$ structure in boric acid rare earth crystals coordinates with rare earth ions, and is thought to maintain the oxide number of the ions. The oxygen atoms in this quadruple-coordinated $BO_4$ structure have a powerful ability to oxidize other ions. Additionally, $SiO_2$ is primarily present in glass in the form of tetrahedral $SiO_4$. However, since the oxygen coordinating with the Si is strongly bonded, these oxygen atoms have a relatively weak ability to oxidize other ions. Thus, $B_2O_3$ is thought to more strongly maintain Ti ions, Nb ions, W ions, and Bi ions on the oxidation side than $SiO_2$.

Until now, $SiO_2$ has been actively incorporated into glass based on a $B_2O_3$—$La_2O_3$ composition to increase thermal stability and improve the moldability of the glass melt. However, when $SiO_2$ is incorporated to keep Ti ions, Nb ions, W ions, and Bi ions on the oxidation side and prevent the reaction between the glass and the molding surface of the pressing mold, it is desirable to limit the content of $SiO_2$ based on the content of $B_2O_3$. Further, from this perspective, it is also possible not to incorporate $SiO_2$; in this context, $SiO_2$ is an optional component.

The third factor relates to the thermal stability of the glass. $SiO_2$ improves the thermal stability of the glass and enhances the moldability of the glass melt. However, it is a component that raises the glass transition temperature. Although alkali components lower the glass transition temperature, they also lower the thermal stability of the glass. Accordingly, based on factor 2, $SiO_2$ is an optional component. The content of $SiO_2$ is desirably limited. By also limiting the quantity of alkali components, it is possible to maintain thermal stability without a substantial rise in the glass transition temperature. Of the alkali components, $Li_2O$ has the greatest effect on lowering the Tg and Tp while maintaining the refractive index. Thus, it is appropriate to limit the $Li_2O$ content.

The fourth factor is lowering the glass transition temperature without substantial reliance on alkali components. The third factor limits the quantity of alkali components; to compensate for this, ZnO is incorporated as a glass component.

In the first aspect of the present invention, the above problems are solved by simultaneously satisfying these four factors.

Optical Glass I, devised on the basis of this idea, is characterized by comprising, denoted as molar percentages:

| | |
|---|---|
| $B_2O_3$ | 5 to 45 percent; |
| $Li_2O$ | 0 to 3 percent; |
| ZnO | 10 to 40 percent; |
| $La_2O_3$ | 5 to 30 percent; |
| $Gd_2O_3$ | 0 to 20 percent; | and at least one from among $TiO_2$, $Nb_2O_5$, $WO_3$, and $Bi_2O_3$; in that the total content X of Ti, Nb, W, and Bi, denoted as a cation percentage, is 3 to 35 percent; in that the Abbé number v(nu)d and refractive index nd fall within the range delimited by sequentially connecting with straight lines points A (40, 1.85), B (39, 1.91), C (33, 1.93), D (34, 1.87), and A (40, 1.85) in FIG. 1 (where lines AB, BC, CD, and DA are included, and point A is excluded); and in that the glass transition temperature Tg satisfies relation (1) below:

$$\text{Tg}[° \text{C.}] \leq 655° \text{C.} - 5 \times X \quad (1).$$

This glass will be described in detail. The contents and total contents of components denoted as oxides are denoted as molar percentages. The individual contents and total content of Ti, Nb, W, and Bi, when denoted as Ti, Nb, W, and Bi, are denoted as cation percentages.

$B_2O_3$ is a glass network-forming component. In the present invention, it is an essential component. At a content of less than 5 percent, the thermal stability of the glass decreases and the liquidus temperature rises, resulting in excessively low viscosity in the course of molding the glass melt, and complicating molding. Conversely, when the content exceeds 45 percent, it becomes difficult to maintain the desired refractive index and Abbé number. Accordingly, the content of $B_2O_3$ is 5 to 45 percent. The lower limit of the $B_2O_3$ content is desirably 10 percent, preferably 15 percent, more preferably 20 percent, and still more preferably, 25 percent. The desirable upper limit is 40 percent.

$SiO_2$ is an optional component that serves to increase the thermal stability of the glass and raise the glass transition temperature. As set forth above, it bonds weakly with Ti, Nb, W, and Bi, and has a weak effect on inhibiting the reaction between the pressing mold and Ti, Nb, W, and Bi. By contrast, $B_2O_3$ serves to inhibit this reaction. From this perspective, in Optical Glass I, $SiO_2$ is not an essential component, but an optional component. When $SiO_2$ is incorporated, the content of $SiO_2$ is desirably limited based on the $B_2O_3$ content. Specifically, taking into account the difference between $SiO_2$ and $B_2O_3$ in effects on the above reaction of network-forming components, the upper limit of the $SiO_2$ content is desirably established based on the $B_2O_3$ content. That is, to enhance the reaction-inhibiting effect and increase the large-quantity productivity of optical elements by precision press molding, the content of $SiO_2$ is desirably 0 to 0.55-fold the content of $B_2O_3$. The content of $SiO_2$ is preferably 0 to 0.49-fold the $B_2O_3$ content, more preferably, 0 to 0.48-fold the $B_2O_3$ content, still more preferably, 0 to 0.40-fold the $B_2O_3$ content, even more preferably, 0 to 0.3-fold the $B_2O_3$ content, and yet more preferably, 0 to 0.25-fold the $B_2O_3$ content, 0 to 0.20-fold the $B_2O_3$ content, 0 to 0.15-fold the $B_2O_3$ content, 0 to 0.10-fold the $B_2O_3$ content, 0 to 0.08-fold the $B_2O_3$ content, and most preferably, 0 to 0.06-fold the $B_2O_3$ content. In this manner, a preferred range is achieved by progressively reducing the upper limit. It is also possible not to incorporate $SiO_2$. In the various above desirable ranges of the ratio of the $SiO_2$ content to the $B_2O_3$ content, the $SiO_2$ content, when independently specified, desirably falls within a range of 0 to 6 percent, preferably a range of 0 to 5.5 percent, more preferably a range of 0 to 5 percent, still more preferably a range of 0 to 4 percent, even more preferably a range of 0 to 3.5 percent, yet even more preferably a range of 0 to 3 percent. Establishing the $SiO_2$ content as set forth above lowers the glass transition temperature and enhances the inhibiting effect on the reaction of the glass and the pressing mold.

$Li_2O$ is a component that enhances glass meltability, and is an alkali metal component that functions to lower the glass transition temperature while maintaining a high refractive index. When the content thereof exceeds 3 percent, thermal stability drops and it becomes difficult to obtain desired optical characteristics. Chemical durability also drops, volatility increases during melting and molding, striae form, and variation in optical characteristics, particularly the refractive index, increases. Thus, the content of $Li_2O$ is 0 to 3 percent. The content of $Li_2O$ is desirably less than 2 percent, preferably less than 1.5 percent, more preferably less than 1 percent, still more preferably less than 0.5 percent. It is possible not to incorporate any $Li_2O$ at all.

ZnO is an essential component that functions to enhance glass meltability and lower the glass transition temperature. Since the content of $Li_2O$ is limited in the manner set forth above, ZnO plays an important role in lowering the glass transition temperature. At a content of less than 10 percent, this effect is not readily achieved, and at greater than 40 percent, thermal stability decreases and it becomes difficult to obtain desired optical characteristics. Accordingly, the ZnO content is 10 to 40 percent. The lower limit of the ZnO content is desirably 15 percent, preferably 17 percent, more preferably 18 percent, still more preferably 25 percent, and the desirable upper limit of the ZnO content is 35 percent.

$La_2O_3$ is an essential component that serves to raise the refractive index while maintaining low dispersion without loss of the thermal stability of the glass. When the content thereof is less than 5 percent, it is difficult to achieve desired optical characteristics, and at greater than 30 percent, thermal stability decreases and the glass transition temperature rises. Accordingly, the $La_2O_3$ content is 5 to 30 percent. The lower limit of the $La_2O_3$ content is desirably 7 percent, preferably 8 percent, more preferably 9 percent, still more preferably 10 percent. The upper limit of the $La_2O_3$ content is desirably 28 percent, preferably 25 percent, more preferably 23 percent, still more preferably 20 percent.

$Gd_2O_3$ is an optional component that serves to raise the refractive index while maintaining low dispersion without loss of the thermal stability of the glass. When the content thereof exceeds 20 percent, thermal stability drops and the glass transition temperature rises. Accordingly, the $Gd_2O_3$ content is 0 to 20 percent. The lower limit of the $Gd_2O_3$ content is desirably 0.1 percent, preferably 0.5 percent, more preferably 1 percent. The upper limit of the $Gd_2O_3$ content is desirably 18 percent, preferably 15 percent, more preferably 12 percent, and still more preferably 10 percent.

$TiO_2$, $Nb_2O_5$, $WO_3$, and $Bi_2O_3$ are components that strongly raise the refractive index. Accordingly, at least one from among $TiO_2$, $Nb_2O_5$, $WO_3$, and $Bi_2O_3$ is incorporated to obtain desired optical characteristics. In addition to adjusting optical characteristics, they also serve to adjust reactivity with the pressing mold; thus, the content of $TiO_2$, $Nb_2O_5$, $WO_3$, and $Bi_2O_3$ is specified based on the total content X of Ti, Nb, W, and Bi denoted as a cation percentage. The total content X of Ti, Nb, W, and Bi is specified as a cation percentage because it specifies the composition of the glass with regard to inhibiting the reaction of Ti ions, Nb ions, W ions, and Bi ions (all of which are cations) with the molding surface.

When the total content X of Ti, Nb, W, and Bi is less than 3 percent, it becomes difficult to attain desired optical characteristics. In particular, it becomes difficult to achieve a refractive index nd exceeding 1.85 and an Abbé number v(nu)d of less than 40 while maintaining thermal stability. By contrast, when the total content X exceeds 25 percent, the frequency of strong fusion of the glass to the molding surface due to the reaction between the glass and the pressing mold increases during precision press molding and it becomes difficult to achieve large-quantity productivity during precision press molding even by adjusting the quantities of other components. Accordingly, the total content X of Ti, Nb, W, and Bi when denoted as a cation percentage is 3 to 25 percent. The lower limit of the total content X of Ti, Nb, W, and Bi desirably exceeds 3.5 percent, preferably exceeds 4 percent, and the upper limit is desirably 20 percent, preferably 18 percent, more preferably 16 percent, still more preferably 14 percent, even more preferably 13 percent, yet even more preferably 12 percent, still even more preferably 11 percent and yet still more preferably, in sequence, 10.5 percent, 10 percent, 9.5 percent, and 9 percent. The various above desirable upper limits of X can be combined with any of the various lower limits.

From the perspectives of enhancing the thermal stability of the glass, reducing and preventing coloration of the glass, lowering the glass transition temperature, and the like, the above upper and lower limits of the total content X of Ti, Nb, W, and Bi are combined as desired. For example, based on a total content exceeding 3.5 percent but not exceeding 13 percent, the individual contents of $TiO_2$, $Nb_2O_5$, $WO_3$, and $Bi_2O_3$ are desirably set to within the ranges given below.

The $TiO_2$ content is desirably 10 percent or less, preferably 8 percent or less, more preferably 6 percent or less, still more preferably 4 percent or less, even more preferably 3 percent or less, yet even more preferably 2 percent or less from the perspectives of maintaining thermal stability and reducing and preventing coloration. The $TiO_2$ content can also be made zero.

The $Nb_2O_5$ content is desirably 8 percent or less, preferably 7 percent or less, more preferably 5 percent or less, still more preferably 3 percent or less, even more preferably 2 percent or less, yet even more preferably 1 percent or less from the perspectives of maintaining thermal stability and reducing and preventing coloration. The incorporation of no $Nb_2O_5$ is of even greater preference.

The $WO_3$ content is desirable 20 percent or less from the perspectives of maintaining thermal stability and reducing and preventing coloration. The incorporation of a suitable quantity of $WO_3$ functions to lower the glass transition temperature. Accordingly, the lower limit of the $WO_3$ content is desirably 1 percent, preferably 3 percent, more preferably 4 percent. The upper limit is desirably 18 percent, preferably 16 percent, more preferably 14 percent, still more preferably 12 percent, even more preferably 10 percent.

From the perspectives of maintaining thermal stability and reducing and preventing coloration, the $Bi_2O_3$ content desirably falls within a range of 0 to 10 percent, preferably falls within a range of 0 to 8 percent, more preferably falls within a range of 0 to 6 percent, still more preferably falls within a range of 0 to 4 percent, even more preferably falls within a range of 0 to 2 percent, and yet even more preferably falls within a range of 0 to 1 percent, with no incorporation being particularly desirable.

Optical Glass I has an Abbé number v(nu)d and a refractive index nd falling within the range delimited by sequentially connecting with straight lines points A(40, 1.85), B(39, 1.91), C(33, 1.93), D(34, 1.87), and A(40, 1.85) in FIG. 1 (where lines AB, BC, CD, and DA are included, and point A is excluded).

FIG. 1 is shown by the method generally employed in the corresponding technical field to indicate the distribution of the Abbé number v(nu)d and refractive index of an optical glass. The vertical axis denotes the refractive index nd, and the horizontal axis denotes the Abbé number v(nu)$_d$. As is the convention, the Abbé number v(nu)d decreases to the right and increases to the left on the horizontal axis. Both the vertical and horizontal axes are linear representations.

In FIG. 1, a point the x coordinate of which is an Abbé number v(nu)d and the y coordinate of which is a refractive index nd is referred to as an optical constant plot. The optical constant plot of Optical Glass I is positioned somewhere within the range delimited by points A, B, C, D, and A, or on the line connecting points A and B (excluding A), on the line connecting points B and C, on the line connecting points C and D, or on the line connecting points D and A (excluding A).

When the optical constant plot of an optical glass lies beneath line AB or on point A, it is difficult to achieve a high degree of functionality or compactness with an optical element with such an optical glass. Thus, the plot is limited to above line AB or on line AB, excluding point A. When the optical constant plot lies to the left of line BC, on line CD, to the left of line DA, or on point A, thermal stability drops or the glass transition temperature rises. Thus, the optical constant plot is limited to points lying on or to the left of line BC, on or beneath line CD, and on or to the right of line DA (excluding point A).

To provide an optical glass suited to achieving optical elements of high functionality and compactness, the refractive index nd and Abbé number v(nu)d desirably satisfy relation (a) below, and preferably satisfy relation (b) below. To further enhance thermal stability and precision press moldability the refractive index nd and Abbé number v(nu)d desirably satisfy relation (c) below, preferably satisfy relation (d) below, and more preferably, satisfy relation (e) below.

$$nd \geq 1.995 - 0.0033 \times vd \quad (a)$$

$$nd \geq 2.000 - 0.0033 \times vd \quad (b)$$

$$nd \leq 2.035 - 0.0033 \times vd \quad (c)$$

$$nd \leq 2.030 - 0.0033 \times vd \quad (d)$$

$$nd \leq 2.022 - 0.0033 \times vd \quad (e)$$

To obtain a glass affording better large-quantity productivity by precision press molding while maintaining good thermal stability, the upper limit of the Abbé number v(nu)d is desirably 39.5, preferably 39, more preferably 38.5, and still more preferably, 38. To provide a lens material suited to correction of chromatic aberration through combination with a lens made of a glass of high refractive index and low dispersion, an optical glass with an Abbé number v(nu)d of 33.5 or greater is desirable, an optical glass with an Abbé number v(nu)d of 34.0 or greater is preferred, and an optical glass with an Abbé number v(nu)d of 34.5 or greater is more preferred, an optical glass with an Abbé number v(nu)d of 35.0 or greater is still more preferred, an optical glass with an Abbé number v(nu)d of 35.5 or greater is even more preferred, an optical glass with an Abbé number v(nu)d of 35.8 or greater is yet more preferred, an optical glass with an Abbé number v(nu)d of 36.0 or greater is even still more preferred, an optical glass with an Abbé number v(nu)d of 36.2 or greater is yet even more preferred, and an optical glass with an Abbé number v(nu)d of 36.4 or greater is particularly preferred.

The refractive index can be adjusted to within the range of the present invention by adjusting the quantities incorporated of primarily $B_2O_3$, $Li_2O$, $La_2O_3$, $Gd_2O_3$, $TiO_2$, $Nb_2O_5$, $WO_3$, and $Bi_2O_3$ among the above-described glass components to within the ranges of the present invention. However, components other than these components also affect the refractive index, and can thus be suitably adjusted. The Abbé number can be adjusted to within the range of the present invention by adjusting the quantities incorporated of primarily $B_2O_3$, $La_2O_3$, $Gd_2O_3$, $TiO_2$, $Nb_2O_5$, $WO_3$, and $Bi_2O_3$ among the above-described glass components. However, components other than these components also affect the refractive index and the Abbé number, and can thus be suitably adjusted.

As set forth above, the upper limit of the glass transition temperature Tg is specified for Optical Glass I based on the total content X of Ti, Nb, W, and Bi. The total content of Ti, Nb, W, and Bi is specified as X [%], the number X is multiplied by 5, the unit is ° C., and the temperature obtained by subtracting this from 650° C. is adopted as the upper limit of the glass transition temperature Tg. The upper limit of the glass transition temperature Tg varies with X. The reactivity of the glass with the molding surface of the pressing mold during precision press molding also varies. When X increases, the reactivity increases; when X decreases, so does the reactivity. In glasses in which X is large, the reactivity can be inhibited by keeping the temperature of the glass and the molding surface of the pressing mold low during precision press molding. In glasses in which X is small, the limitations relating to the temperature of the glass and the molding surface of the pressing mold during precision press molding are relaxed. The temperature of the glass and the molding surface of the pressing mold during precision press molding must be set high for glasses with high glass transition temperatures, and can be set low for glasses with low glass transition temperatures. Since the glass transition temperature Tg tends to rise as X increases in this manner, it is necessary to inhibit a rise in the glass transition temperature Tg from the perspective of inhibiting reactivity during precision press molding. Thus, by establishing the relation between X and the glass transition temperature Tg in a prescribed relational equation, a glass that satisfies this relational equation will permit increased large-quantity productivity in precision press molding. This relational equation was arrived at empirically by the present inventors from the above-described perspectives. The optical glass of the present invention is limited to a glass having a composition indicating a glass transition temperature Tg falling within a range determined based on the total content X of Ti, Nb, W, and Bi.

Relation (1) below expresses the numeric relation between X and the upper limit of the glass transition temperature Tg.:

$$Tg [° C.] \leq 655° C. - 5 \times X \quad (1)$$

For example, when the total content X of Ti, Nb, W, and Bi is a cation percentage of 5, $$Tg \leq 655° C. - 5 \times 5° C. = 655° C. - 25° C. = 630° C$$

and the composition of the glass is adjusted so that the glass transition temperature is 630° C. or lower. When X is a cation percentage of 10, $$Tg \leq 655° C. - 5 \times 10° C. = 655° C. - 50° C. = 605° C$$

and the composition of the glass is adjusted so that the glass transition temperature is 605° C. or lower.

To further increase large-quantity productivity in precision press molding, a glass satisfying relation (2) below is desirable, a glass satisfying relation (3) below is preferred, a glass satisfying relation (4) below is of greater preference, and a glass satisfying relation (5) below is of still greater preference.

$$Tg [° C.] \leq 650° C. - 5 \times X \quad (2)$$

$$Tg [° C.] \leq 645° C. - 5 \times X \quad (3)$$

$$Tg [° C.] \leq 640° C. - 5 \times X \quad (4)$$

$$Tg [° C.] \leq 635° C. - 5 \times X \quad (5)$$

Lowering of the glass transition temperature is desirable to lower the temperature during precision press molding. However, when lowered excessively, it becomes difficult to maintain desired optical characteristics and the thermal stability of the glass decreases. Thus, the glass transition temperature is desirably 500° C. or greater while satisfying the above relation. The glass transition temperature can be adjusted to within the above range by adjusting primarily the quantities of $SiO_2$, $Li_2O$, and ZnO that are incorporated among the above-described glass components to within the ranges of the present invention. However, other components also affect the glass transition temperature and can be suitably adjusted.

The maximum temperature to which the glass is exposed during precision press molding varies somewhat depending on the method of molding, but can be thought of in terms of the temperature at which the glass exhibits a viscosity of $10^{7.2}$ dPa·s(referred to as "Tp"). To achieve even greater large-quantity productivity in precision press molding, the following ranges established based on X with the upper limit of Tp can be adopted as a preferred range.

Glasses satisfying relation (5) below fall within such a desirable range. Glasses satisfying relation (6) below are preferred. Glasses satisfying relation (7) below are of greater preference. Glasses satisfying relation (8) below are of even greater preference. And glasses satisfying relation (9) below are of still greater preference.

$$Tp[°C.] \leq 755°C. - 5 \times X \quad (5)$$

$$Tp[°C.] \leq 750°C. - 5 \times X \quad (6)$$

$$Tp[°C.] \leq 745°C. - 5 \times X \quad (7)$$

$$Tp[°C.] \leq 740°C. - 5 \times X \quad (8)$$

$$Tp[°C.] \leq 735°C. - 5 \times X \quad (9)$$

The Tp can be adjusted in the same manner as the glass transition temperature Tg.

Optical Glass I can comprise the following optional components in addition to the above-described components.

$ZrO_2$ serves to improve the thermal stability and chemical durability of the glass and raise the refractive index when incorporated in suitable quantity. However, a content exceeding 10 percent decreases the thermal stability of the glass and increases the glass transition temperature. Thus, the content of $ZrO_2$ is 0 to 10 percent. The lower limit of the $ZrO_2$ content is desirably 0.5 percent, preferably 1 percent, and more preferably, 2 percent. The upper limit is desirably 9 percent, preferably 8 percent, more preferably 7 percent, and still more preferably, 6 percent.

The incorporation of a suitable quantity of $Ta_2O_5$ markedly improves the thermal stability of the glass and serves to raise the refractive index while maintaining low dispersion. However, when the content exceeds 15 percent, the thermal stability of the glass decreases and the glass transition temperature rises. Thus, the $Ta_2O_5$ content is 0 to 15 percent. The lower limit of the $Ta_2O_5$ content is desirably 1 percent, preferably 2 percent. The upper limit of the $Ta_2O_5$ content is desirably 13 percent, preferably 11 percent, more preferably 9 percent, still more preferably 8 percent.

$Na_2O$ and $K_2O$ function to enhance the meltability of the glass and lower the glass transition temperature. However, their ability to lower the glass transition temperature while maintaining a high refractive index is poorer than that of $Li_2O$. Excessive incorporation decreases the thermal stability, lowers the refractive index, and compromises the chemical durability of the glass. It also causes the formation of striae due to volatization during melting and molding, and causes variation in optical characteristics, particularly the refractive index. Accordingly, the total content of $Na_2O$ and $K_2O$ is desirably less than 0.5 percent, preferably less than 0.3 percent, and $Na_2O$ and $K_2O$ are more preferably not incorporated.

MgO, CaO, SrO, and BaO serve to improve the meltability of the glass and lower the glass transition temperature. However, excessive incorporation diminishes thermal stability and decreases chemical durability, making it difficult to obtain desired optical characteristics. Thus, the total content of MgO, CaO, SrO, and BaO is 0 to 10 percent. The total content of MgO, CaO, SrO, and BaO is desirably 0 to 8 percent, preferably 0 to 6 percent, more preferably 0 to 4 percent, still more preferably 0 to 2 percent, even more preferably 0 to 1 percent, yet more preferably 0 to 0.8 percent, even still more preferably 0 to 0.5 percent, and yet even preferably 0 percent.

$Y_2O_3$ functions to raise the refractive index. However, excessive incorporation lowers the thermal stability of the glass and raises the glass transition temperature. Thus, the $Y_2O_3$ content is 0 to 10 percent. The $Y_2O_3$ content is desirably 0 to 8 percent, preferably 0 to 6 percent, more preferably 0 to 4 percent, still more preferably 0 to 2 percent, even more preferably 0 to 1 percent, yet more preferably 0 percent.

Thermal stability can be further enhanced by optimizing the proportion of $La_2O_3$, $Gd_2O_3$, and $Y_2O_3$. Specifically, the proportion of $La_2O_3$, $Gd_2O_3$, and $Y_2O_3$ means the ratio of the $La_2O_3$ content to the total content of $La_2O_3$, $Gd_2O_3$, and $Y_2O_3$ ($La_2O_3+Gd_2O_3+Y_2O_3$), namely ($La_2O_3/(La_2O_3+Gd_2O_3+Y_2O_3)$). Employing a ratio greater than 0.66 further enhances thermal stability and further lowers the liquidus temperature. From the perspective of enhancement of thermal stability and further lowering of the liquidus temperature, the lower limit of the ratio of ($La_2O_3/(La_2O_3+Gd_2O_3+Y_2O_3)$) is desirably 0.67, preferably 0.68, more preferably 0.69 and still more preferably 0.70. The upper limit thereof is desirably 0.90, preferably 0.85.

Thermal stability can be even further enhanced by optimizing the proportion of $La_2O_3$ and $Gd_2O_3$. Specifically, the proportion of $La_2O_3$ and $Gd_2O_3$ means the ratio of the $La_2O_3$ content to the total content of $La_2O_3$ and $Gd_2O_3$ ($La_2O_3+Gd_2O_3$), namely ($La_2O_3/(La_2O_3+Gd_2O_3)$). Employing a ratio greater than 0.66 further enhances thermal stability and further lowers the liquidus temperature. From the perspective of enhancement of thermal stability and further lowering of the liquidus temperature, the lower limit of the ratio of $La_2O_3/(La_2O_3+Gd_2O_3)$ is desirably 0.67, preferably 0.68, more preferably 0.69 and still more preferably 0.70. The upper limit thereof is desirably 0.90, preferably 0.85.

Keeping the proportion of $La_2O_3$, $Gd_2O_3$, and $Y_2O_3$, or the proportion of $La_2O_3$ and $Gd_2O_3$, within the ranges given above improves thermal stability and inhibits a rise in the liquidus temperature. In particular, it is desirable to keep the proportion of $La_2O_3$, $Gd_2O_3$, and $Y_2O_3$, or the proportion of $La_2O_3$ and $Gd_2O_3$, within the above stated range in a high refractive index glass satisfying relation (a) above, which gives a relation between the refractive index and the Abbé number. It is preferable to keep the proportion of $La_2O_3$, $Gd_2O_3$, and $Y_2O_3$, or the proportion of $La_2O_3$ and $Gd_2O_3$, within the above stated range in a high refractive index glass satisfying relation (b) above.

$Yb_2O_3$ functions to raise the refractive index. However, excessive incorporation diminishes the thermal stability of the glass and raises the glass transition temperature. Thus, the $Yb_2O_3$ content is 0 to 10 percent. The $Yb_2O_3$ content is desirably 0 to 8 percent, preferably 0 to 6 percent, more preferably 0 to 4 percent, still more preferably 0 to 2 percent, even more preferably 0 to 1 percent, yet more preferably no incorporation.

$Al_2O_3$ can be incorporated to adjust the viscosity of the glass melt and the like. However, excessive incorporation decreases the thermal stability of the glass. Thus, the $Al_2O_3$ content is 0 to 10 percent. The $Al_2O_3$ content is desirably 0 to 8 percent, preferably 0 to 6 percent, more preferably 0 to 4 percent, still more preferably 0 to 2 percent, even more preferably 0 to 1 percent, yet more preferably no incorporation.

Other components in the form of small quantities of $GeO_2$, $Ga_2O_3$, and $Lu_2O_3$ can be incorporated. However, these components are both expensive and nonessential. Thus, they are desirably not incorporated. $GeO_2$ promotes reduction of the elements Ti, Nb, W, and Bi, and is thus desirably not incorporated from the perspective of enhancing large-quantity productivity in precision press molding.

A portion of the starting materials of the above components can be replaced with fluoride and a small amount of F can be incorporated into the glass. However, F volatilizes markedly during melting and molding of the glass, causing the generation of striae and variation in optical characteristics, particularly the refractive index. Thus, the F content is 0 to 8 molar percent, desirably 0 to 6 molar percent, preferably 0 to 4 molar percent, more preferably 0 to 2 molar percent, still more preferably 0 to 1 molar percent. It is preferable not to incorporate F. When molding a preform for precision press molding in a step in which a glass melt gob is cooled, described further below, internal homogeneity as well as an extremely high degree of optical uniformity without surface striae are required. Thus, the incorporation of F is to be avoided.

Pb, Cd, As, Th, Cr, Te, and Se are toxic. Thus, in consideration of their environmental effects, they are desirably not incorporated into the glass. Pb is reduced during precision press molding, adhering to the surface of the glass and to the surface of the pressing mold, and compromising the molding precision of precision press molding. From these perspectives, it is desirably not incorporated.

The incorporation of Cs is ineffective, and Cs is an expensive component. Thus, it is desirably not incorporated. Fe, Cu, Co, Nd, Er, and the like cause coloration of the glass, and are thus desirably not incorporated.

$Sb_2O_3$, $SnO_2$, $CeO_2$, nitrates, ammonium, chlorides, and the like can be added as clarifiers within a range of 0 to 1 weight percent in total based on the total amount of the glass components. To enhance the clarifying effect, 0 to 1 weight percent of $Sb_2O_3$ based on the total amount of the glass components is desirably added. However, $Sb_2O_3$ exhibits a strong oxidative property. To minimize damage to the molding surface of the pressing mold, the quantity added based on the total amount of the glass components is desirably 0 to 0.8 weight percent, preferably 0 to 0.5 weight percent.

$SnO_2$, $CeO_2$, nitrates, ammonium, chlorides, and the like have a weaker oxidative property than $Sb_2O_3$. Thus, to reduce the burden on the molding surface of the pressing mold while promoting clarification, the quantity of $SnO_2$, $CeO_2$, nitrates, ammonium, chlorides, and the like that are added in total based on the total amount of the glass components is desirably kept within a range of 0 to 1 weight percent, preferably a range of 0 to 0.5 weight percent.

To increase large-quantity productivity in precision press molding, enhance the thermal stability of the glass, and achieve desired optical characteristics, excluding the above-described clarifiers, the total content of $B_2O_3$, $SiO_2$, $Li_2O$, ZnO, $La_2O_3$, $Gd_2O_3$, $TiO_2$, $Nb_2O_5$, $WO_3$, $Bi_2O_3$, $ZrO_2$, $Ta_2O_5$, $Na_2O$, $K_2O$, MgO, CaO, SrO, BaO, $Y_2O_3$, $Yb_2O_3$, and $Al_2O_3$ is desirably 94 percent or greater, preferably 95 percent or greater, more preferably 96 percent or greater, still more preferably 97 percent or greater, even more preferably 98 percent or greater, yet more preferably 99 percent or greater and even still more preferably 100 percent or greater.

The total content of $B_2O_3$, $SiO_2$, $Li_2O$, ZnO, $La_2O_3$, $Gd_2O_3$, $TiO_2$, $Nb_2O_5$, $WO_3$, $Bi_2O_3$, $ZrO_2$, and $Ta_2O_5$ is desirably 94 percent or greater, preferably 95 percent or greater, more preferably 96 percent or greater, still more preferably 97 percent or greater, even more preferably 98 percent or greater, yet more preferably 99 percent or greater and even still more preferably 100 percent or greater.

The low-temperature softening property of Optical Glass I is determined by the glass transition temperature, but a preferred glass can be indicated with emphasis on the sag temperature.

A sag temperature Ts is desirably 700° C. or lower, preferably 690° C. or lower, more preferably 685° C. or lower, still more preferably 680° C. or lower, even more preferably 670° C. or lower to increase large-quantity productivity in precision press molding. However, an excessively low sag temperature lowers the thermal stability of the glass and makes it difficult to achieve desired optical characteristics. Thus, a sag temperature of 550° C. or higher is desirable.

The sag temperature Ts can be adjusted in the same manner as the glass transition temperature.

As set forth above, large-quantity productivity in precision press molding is determined by the degree of the reaction between the molding surface and the glass that occurs with the glass and the molding surface of the pressing mold in a state of tight contact at elevated temperature. The case where a large number of preforms comprised of the same type of glass are prepared, and these preforms are successively precision press molded in a single pressing mold is envisioned.

When the reaction between the glass and the molding surface is envisioned as taking place with the pressing mold applying pressure to the glass with the temperature of the glass above the glass transition temperature, as set forth above, the time during which this state is maintained in a single cycle of precision press molding is denoted as "t", and the number of precision press molding cycles conducted without problem is denoted as "n", the longer the time t×n, the better the large-quantity productivity of the glass can be said to be.

With conventional glasses, even when the surface of a preform is coated with a film preventing fusion with the pressing mold, the number of times "n" that precision press molding can be successively conducted is on the order of several dozen. By contrast, the number "n" reaches 80 or more, desirably 100 or more, preferably 200 or more, more preferably 300 or more, and still more preferably 500 or more when employing a preform comprised of Optical Glass I.

When "t" is set to 80 seconds when employing a conventional glass, t×n comes out to about 4,000 seconds, or falls short of 4,000 seconds. By contrast, 4,000 seconds are exceeded, desirably 8,000 seconds or more, preferably 16,000 seconds or more, more preferably 24,000 seconds or more and still more preferably 40,000 seconds or more when employing a preform comprised of the optical glass of the present invention.

When employing a preform comprised of Optical Glass I repeatedly in a single pressing mold in this manner, the number of times "n" that successful precision press molding can be consecutively conducted is large and the extended period t×n is long. Thus, maintenance of the pressing mold is reduced and the frequency with which the precision press molding process must be stopped to replace the pressing mold is reduced. Thus, the present invention greatly increases productivity, reduces production costs, and markedly improves the large quantity production properties of optical elements.

[Optical Glass II]

Optical Glass II is an optical glass based on a $B_2O_3$—$La_2O_3$ composition with a refractive index nd of 1.87 or greater and an Abbé number ν(nu)d of 34.0 or greater but less than 40. To achieve such optical characteristics, high refractive index-imparting components in the form of $La_2O_3$ and $Gd_2O_3$, as well as suitable quantities of $ZrO_2$, $Ta_2O_5$, $TiO_2$, $Nb_2O_5$, $WO_3$, and $Bi_2O_3$, are incorporated. However, when the proportions of the high refractive index-imparting components are not properly adjusted, precision press moldability drops markedly.

The Ti ions, Nb ions, W ions, and Bi ions, particularly the Ti ions, contained in the glass tend to change valence under high temperature during press molding. As a result, an oxidation reaction is thought to tend to occur with the molding surface. Even in glasses containing large quantities of high refractive index-imparting components, it is necessary to inhibit this reaction to maintain a certain level of precision press moldability.

Accordingly, the present inventors conducted extensive research. As a result, they discovered that precision press moldability was improved by establishing the glass composition and characteristics by taking into account the following five factors. The present invention was devised on that basis.

The first factor relates to temperature. The above reaction is promoted by a rise in temperature. Accordingly, it is important to impart to the glass thermal characteristics permitting press molding at a low temperature. Conventionally, the glass transition temperature, an indicator of the low temperature softening property of a glass, is established from the perspective of inhibiting thermal degradation of the pressing mold rather than from the perspective of inhibiting the reaction between glass components and the molding surface. However, simply lowering the glass transition temperature to a degree at which thermal degradation of the pressing mold tends not to occur is not enough to inhibit reaction of the molding surface with Ti ions, Nb ions, W ions, and Bi ions. It is important to inhibit the reaction by limiting the temperature to the temperature at which precision press molding is actually conducted, or close to it.

For this reason, for example, designing the glass material based on indicators relating to the temperature at which the glass deforms, such as the temperature Tp indicating the viscosity of the glass at $10^{7.2}$ dPa·s, is necessary to resolve the above-described problems.

The second factor relates to glass network-forming components. $SiO_2$ (an optional component) and $B_2O_3$ are primary examples of the network-forming components of Optical Glass II. $SiO_2$ is thought to be primarily present in the glass as a quadruple-coordinated $SiO_4$ tetrahedron. Additionally, $B_2O_3$ is known to assume a triple or quadruple-coordinated structure, and has been proposed to assume a quadruple-coordinated $BO_4$ structure coordinated with polyvalent ions of rare earth elements or the like in boric acid rare earth crystals. On this basis, quadruple-coordinated $BO_4$ tetrahedrons are presumed to be primarily present in the second aspect of the present invention, as well.

Since oxygen coordinated in $SiO_4$ tetrahedrons forms strong covalent bonds with Si, the absolute value of the negative effective charge of the oxygen atoms is low, and their ability to oxidize other ions is weak. Additionally, since the oxygen coordinated in the $BO_4$ tetrahedron has a strong ion-bonding property, the absolute value of the negative effective charge of the oxygen atoms is great, and their ability to oxidize other ions is strong. Thus, the function of maintaining the oxidized state of Ti ions, Nb ions, W ions, and Bi ions of $B_2O_3$ is thought to be greater than that of $SiO_2$.

In the past, $SiO_2$ has been actively incorporated to increase thermal stability and improve the moldability of the glass melt. However, it is necessary to limit the $SiO_2$ content to a prescribed range to maintain the oxidized state of Ti ions, Nb ions, W ions, and Bi ions, particularly Ti ions, and to inhibit the reaction between the glass and the molding surface of the pressing mold.

The third factor relates to the thermal stability of the glass. $SiO_2$ improves the thermal stability of the glass and enhances the moldability of the glass melt. However, it is a component that raises the glass transition temperature and Tp. Although alkali metal components lower the glass transition temperature and Tp, they also lower the thermal stability of the glass. Accordingly, based on factor 2, if the alkali metal component is limited in addition to limiting the $SiO_2$ content, it is possible to maintain the thermal stability of the glass without raising the glass transition temperature or Tp. It is also possible to further improve thermal stability by keeping rare earth components such as $La_2O_3$ and $Gd_2O_3$ within a prescribed range. Optical Glass II can contain a rare earth component in the form of $Y_2O_3$ as an optional component. However, when incorporating $Y_2O_3$, although keeping it within a prescribed range produces a lesser effect than $La_2O_3$ or $Gd_2O_3$, it is still possible to improve thermal stability.

The fourth factor relates to reducing the glass transition temperature without relying heavily on alkali metal components. The third factor limits the amount of alkali metal component. To compensate for this, ZnO is incorporated as a glass component to lower the glass transition temperature and Tp without decreasing the refractive index.

The fifth factor is limiting the ratio of $TiO_2$, which tends to undergo a change in valence and tends to undergo an oxidation-reduction reaction with the molding surface during precision press molding, to achieve a high refractive index characteristic while incorporating a prescribed total quantity of $ZrO_2$, $Ta_2O_5$, $TiO_2$, $Nb_2O_5$, $WO_3$, and $Bi_2O_3$ in addition to prescribed quantities of $La_2O_3$ and $Gd_2O_3$. When an excessively large total content of $ZrO_2$, $Ta_2O_5$, $TiO_2$, $Nb_2O_5$, $WO_3$, and $Bi_2O_3$ is incorporated, there are problems in that the thermal stability of the glass decreases and the glass transition temperature and Tp rise. The above combined content is thus established in light of this.

The second aspect of the present invention solves the above-described problems by simultaneously satisfying these five factors.

Optical Glass II, devised on the basis of this idea, is characterized by comprising, denoted as molar percentages:

| | |
|---|---|
| $B_2O_3$ | 5 to 45 percent; |
| $SiO_2$ | 0 to 6 percent (excluding 6 percent); |
| $Li_2O$, $Na_2O$, $K_2O$ in total | 0 to 3 percent; |
| ZnO | 10 to 40 percent; |
| $La_2O_3$ | 5 to 30 percent; |
| $Gd_2O_3$ | 0 to 20 percent; and |
| $ZrO_2$, $TaO_2$, $TiO_2$, $Nb_2O_5$, $WO_3$, and $Bi_2O_3$ in total | 12.5 to 20 percent; | in that the cation ratio of the $Ti^{4+}$ content relative to the total content of $Zr^{4+}$, $Ta^{5+}$, $Ti^{4+}$, $Nb^{5+}$, $W^{6+}$, and $Bi^{3+}$ is 0.30 or lower; in that the temperature Tp at which a viscosity of $10^{7.2}$ dPa·s is exhibited is 706° C. or lower; and in that the refractive index nd and the Abbé number v(nu)d satisfy all of relations (I) to (IV) below.

$$34.0 \leq vd < 40 \quad \text{(I)}$$

$$nd \geq 1.87 \quad \text{(II)}$$

$$nd \geq 2.23 - 0.01 \times vd \quad \text{(III)}$$

$$nd \leq 2.28 - 0.01 \times vd \quad \text{(IV)}$$

The above glass will be described in detail below. Contents and total contents of components denoted as oxides are molar percentages. The individual contents and total contents of Ti, Nb, W, and Bi when indicated as $Zr^{4+}$, $Ta^{5+}$, $Ti^{4+}$, $Nb^{5+}$, $W^{6+}$, and $Bi^{3+}$ denote cation percentages.

$B_2O_3$ is a glass network-forming component. In the present invention, it is an essential component. At a content of less than 5 percent, the thermal stability of the glass decreases and the liquidus temperature rises, resulting in excessively low viscosity in the course of molding the glass melt, and complicating molding. Conversely, when the content exceeds 45 percent, it becomes difficult to maintain the desired refractive index and Abbé number. Accordingly, the content of $B_2O_3$ is 5 to 45 percent. The lower limit of the content of $B_2O_3$ is desirably 10 percent, preferably 15 percent, more preferably 20 percent, and still more preferably 25 percent. The upper limit of the content of $B_2O_3$ is desirably 40 percent.

$SiO_2$ is an optional component that serves to increase the thermal stability of the glass and raise the glass transition temperature and Tp. As set forth above, it bonds weakly with Ti, Nb, W, and Bi, and has a weak effect on inhibiting the reaction between the pressing mold and Ti, Nb, W, and Bi. By contrast, $B_2O_3$ serves to inhibit this reaction. When the content of $SiO_2$ is 6 percent or greater, there are problems in that the reaction-inhibiting effect decreases, the glass fuses to the molding surface during precision press molding, and bubbles form in the glass. Accordingly, the $SiO_2$ content is 0 to 6 percent (excluding 6 percent). The content of $SiO_2$ is desirably a range of 0 to 5.5 percent, preferably a range of 0 to 5 percent, more preferably a range of 0 to 4 percent, still more preferably a range of 0 to 3.5 percent, and even more preferably a range of 0 to 3 percent. Establishing the $SiO_2$ content as set forth above lowers the glass transition temperature and Tp while enhancing the inhibiting effect on the reaction between the glass and the molding surface of the mold.

$Li_2O$, $Na_2O_1$ and $K_2O$ are components that serve to improve the meltability of the glass and lower the glass transition temperature and Tp. However, when the total content of $Li_2O$, $Na_2O_1$ and $K_2O$ exceeds 3 percent, the thermal stability decreases and it becomes difficult to achieve desired optical characteristics. Further, chemical durability deteriorates, volatilization during melting and molding increases, striae form, and variation in optical characteristics, particularly in the refractive index, increases. Thus, the total content of $Li_2O$, $Na_2O$, and $K_2O$ is 0 to 3 percent. The total content of $Li_2O$, $Na_2O_1$ and $K_2O$ is desirably less than 2 percent, preferably less than 1.5 percent, more preferably less than 1 percent, and still more preferably less than 0.5 percent. It is also possible not to incorporate $Li_2O$, $Na_2O_1$ or $K_2O$.

$Li_2O$ is an alkali metal component that functions strongly to lower the glass transition temperature and Tp while maintaining a high refractive index. Accordingly, the content of $Li_2O$ is desirably the greatest among $Li_2O$, $Na_2O$, and $K_2O$. It is possible not to incorporate $Na_2O$ or $K_2O$.

When attempting to lower the pressing temperature of the glass and enhance precision pressing moldability, it is desirable to incorporate a large quantity of alkali metal components. However, alkali metal components sever the network structure of the glass and promote crystallization. Accordingly, taking into account the moldability of the glass material, the content of $Li_2O$ desirably falls within a range of 0 to 10 percent, preferably a range of 0 to 8 percent, more preferably a range of 0 to 6 percent, still more preferably a range of 0 to 5 percent, even more preferably a range of 0 to 3 percent and yet more preferably a range of 0 to 2 percent (excluding 2 percent), even still more preferably a range of 0 to 1.5 percent (excluding 1.5 percent), yet even more preferably a range of 0 to 1 percent (excluding 1 percent), still yet even more preferably a range of 0 to 0.5 percent (excluding 0.5 percent), with a glass containing no $Li_2O$ being optimal.

ZnO is an essential component that functions to enhance glass meltability and lower the glass transition temperature. Since the content of $Li_2O$ is limited to within the range set forth above, ZnO plays an important role in lowering the glass transition temperature. When the content thereof is less than 10 percent, it becomes difficult to achieve this effect. When 40 percent is exceeded, thermal stability decreases and it becomes difficult to achieve desired optical characteristics. Accordingly, the ZnO content is 10 to 40 percent. The lower limit of the ZnO content is desirably 15 percent, preferably 17 percent, more preferably 18 percent, and still more preferably 25 percent, and the desirable upper limit is 35 percent.

$La_2O_3$ is an essential component that serves to raise the refractive index while maintaining low dispersion without loss of the thermal stability of the glass. When the content thereof is less than 5 percent, it is difficult to achieve desired optical characteristics, and at greater than 30 percent, thermal stability decreases and the glass transition temperature and Tp rise. Accordingly, the $La_2O_3$ content is 5 to 30 percent. The lower limit of the $La_2O_3$ content is desirably 7 percent, preferably 8 percent, more preferably 9 percent, and still more preferably 10 percent, and the upper limit is desirably 28 percent, preferably 25 percent, more preferably 23 percent, and still more preferably 20 percent.

$Gd_2O_3$ is an effective component that serves to raise the refractive index while maintaining low dispersion without loss of the thermal stability of the glass. When the content thereof exceeds 20 percent, thermal stability drops and the glass transition temperature and Tp rise. Accordingly, the $Gd_2O_3$ content is 0 to 20 percent. To obtain effects of incorporation of $Gd_2O_3$, the $Gd_2O_3$ content is desirably a range of 1 to 20 percent. The lower limit of the $Gd_2O_3$ content is desirably 1 percent, preferably 2 percent, more preferably 3 percent, and still more preferably 4 percent and the upper limit is desirably 18 percent, preferably 15 percent, more preferably 12 percent, and still more preferably 10 percent.

$ZrO_2$, $Ta_2O_5$, $TiO_2$, $Nb_2O_5$, $WO_3$, and $Bi_2O_3$ are components that strongly raise the refractive index. Accordingly, when the total content of $ZrO_2$, $Ta_2O_5$, $TiO_2$, $Nb_2O_5$, $WO_3$, and $Bi_2O_3$ is less than 12.5 percent, it becomes difficult to obtain desired optical characteristics. When the total content exceeds 20 percent, the glass transition temperature and Tp rise and the thermal stability of the glass drops. Thus, the total content of $ZrO_2$, $Ta_2O_5$, $TiO_2$, $Nb_2O_5$, $WO_3$, and $Bi_2O_3$ is 12.5 to 20 percent. The lower limit of the total content of $ZrO_2$, $Ta_2O_5$, $TiO_2$, $Nb_2O_5$, $WO_3$, and $Bi_2O_3$ is desirably 13 percent, preferably 14 percent, more preferably 15 percent and the upper limit is desirably 25 percent, preferably 22 percent, more preferably 19 percent, still more preferably 18 percent and even more preferably 17 percent.

For the same reasons as above, the total quantity of Zr, Ta, Ti, Nb, W, and Bi can be given based on the total content of $Zr^{4+}$, $Ta^{5+}$, $Ti^{4+}$, $Nb^{5+}$, $W^{6+}$, and $Bi^{3+}$. That is, the lower limit of the total content of $Zr^{4+}$, $Ta^{5+}$, $Ti^{4+}$, $Nb^{5+}$, $W^{6+}$, and $Bi^{3+}$ is desirably 10 percent, preferably 11 percent, more preferably 12 percent, still more preferably 13 percent and the upper limit is desirably 20 percent, preferably 18 percent, more preferably 16 percent, still more preferably 15 percent and even more preferably 14 percent.

When the total content of $Ti^{4+}$, $Nb^{5+}$, $W^{6+}$, and $Bi^{3+}$ is less than 3 percent, it tends to become difficult to obtain desired optical characteristics while maintaining thermal stability, and when the total content exceeds 25 percent, the frequency of strong fusion of the glass to the pressing mold due to reaction of the glass with the pressing mold during precision press molding tends to increase. Thus, the total content of $Ti^{4+}$, $Nb^{5+}$, $W^{6+}$, and $Bi^{3+}$ is desirably 3 to 25 percent. The lower limit of the total content x preferably 3.5 percent, more preferably 4 percent and the upper limit is desirably 20 percent, preferably 18 percent, more preferably 16 percent, still more preferably 14 percent and even more preferably 13 percent, yet more preferably 12 percent and even still more preferably 11 percent, yet even preferably 10.5 percent and most preferably 10 percent.

In particular, the amount of increase in viscosity per unit weight and the glass reducing property of $Ti^{4+}$ are greater than those of other polyvalent ions. Accordingly, to reduce the tendency of occurrence of the fusion reaction with the pressing mold, the cation ratio of the $Ti^{4+}$ content to the total content of $Zr^{4+}$, $Ta^{5+}$, $Ti^{4+}$, $Nb^{5+}$, $W^{6+}$, and $Bi^{3+}$ is desirably 0.40 or lower, preferably 0.35 or lower, more preferably 0.30 or lower, still more preferably 0.25 or lower, even more preferably 0.20 or lower, yet more preferably 0.15 or lower, even still more preferably 0.10 or lower, yet even more preferably 0.05 or lower, still yet even more preferably 0.03 or lower, particularly preferably 0.02 or lower.

$ZrO_2$, when incorporated in suitable quantity, functions to enhance the thermal stability and chemical durability of the glass and increase the refractive index. However, when the content thereof exceeds 10 percent, the thermal stability of the glass decreases and the glass transition temperature and Tp rise. Thus, the content of $ZrO_2$ is desirably 0 to 10 percent. The lower limit of $ZrO_2$ content is preferably 0.5 percent, more preferably 1 percent, still more preferably 2 percent and the upper limit is desirably 9 percent, preferably 8 percent, more preferably 7 percent, still more preferably 6 percent.

$Ta_2O_5$, when incorporated in suitable quantity, functions to markedly enhance the thermal stability of the glass and raise the refractive index while maintaining low dispersion. However, when the content thereof exceeds 15 percent, the thermal stability of the glass decreases and the glass transition temperature rises. Thus, the content of $Ta_2O_5$ is desirably 0 to 15 percent. The lower limit of $Ta_2O_5$ content is preferably 1 percent, more preferably 2 percent and the upper limit is desirably 13 percent, preferably 11 percent, more preferably 9 percent, still more preferably 8 percent.

From the perspectives of maintaining thermal stability and reducing and preventing coloration, the content of $TiO_2$ is desirably 10 percent or lower, preferably 8 percent or lower, more preferably 6 percent or lower, still more preferably 4 percent or lower, even more preferably 3 percent or lower, yet more preferably 2 percent or lower. A $TiO_2$ content of zero is also possible.

From the perspectives of maintaining thermal stability and reducing and preventing coloration, the content of $Nb_2O_5$ is desirably 8 percent or lower, preferably 7, more preferably 5 percent or lower, still more preferably 3 percent or lower, even more preferably 2 percent or lower, yet more preferably 1 percent or lower, even still more preferably not containing.

The content of $WO_3$ is desirably 20 percent or lower from the perspectives of maintaining thermal stability and reducing and preventing coloration. The introduction of a suitable quantity of $WO_3$ serves to lower the glass transition temperature. Accordingly, the lower limit of the content of $WO_3$ is desirably 1 percent preferably 3 percent, more preferably 4 percent and the upper limit is desirably 18 percent, preferably 16 percent, more preferably 14 percent, still more preferably 12 percent, even more preferably 10 percent.

The content of $Bi_2O_3$ desirably falls within a range of 0 to 10 percent, preferably within a range of 0 to 8 percent, more preferably within a range of 0 to 6 percent, still more preferably within a range of 0 to 4 percent, even more preferably within a range of 0 to 2 percent, yet more preferably within a range of 0 to 1 percent, even still more preferably not containing, from the perspectives of maintaining thermal stability and reducing and preventing coloration.

The refractive index nd and Abbé number v(nu)d of Optical Glass II can be specified so as to fall within a range simultaneously satisfying the four relations of relations (I) to (IV) below.

$$34.0 \leq vd < 40 \quad (I)$$

$$nd \geq 1.87 \quad (II)$$

$$nd \geq 2.23 - 0.01 \times vd \quad (III)$$

$$nd \leq 2.28 - 0.01 \times vd \quad (IV)$$

Figure 2:
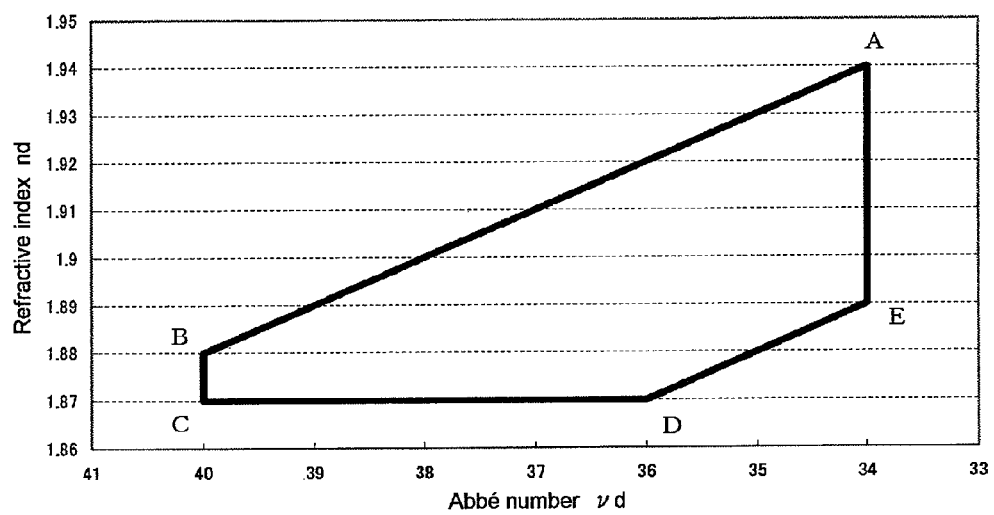
FIG. 2 shows the distribution of the refractive index nd and Abbé number v(nu)d of Optical Glass II.

In FIG. 2, the refractive index nd is plotted on the vertical axis and the Abbé number v(nu)d is plotted on the horizontal axis in the same manner as in FIG. 1. As is the convention, the Abbé number v(nu)d decreases to the right and increases to the left on the horizontal axis. Both the vertical and horizontal axes are linear representations.

In FIG. 2, glasses (with Abbé numbers v(nu)d and refractive indexes nd) that simultaneously satisfy the above four relations have Abbé numbers v(nu)d and refractive indexes nd that fall within the range delimited by sequentially connecting with straight lines points A (34, 1.94), B (40, 1.88), C (40, 1.87), D (36, 1.87), E (34, 1.89), and A (34, 1.94) (where lines AB (excluding point B), CD (excluding point C), DE, and EA are included, and line BC is excluded).

FIG. 2 is shown by the method that is generally employed in the relevant field of art to indicate the distribution of the refractive index nd and Abbé number v(nu)d of Optical Glass II. The refractive index nd is plotted on the vertical axis, and the Abbé number v(nu)d is plotted on the horizontal axis. As is the convention, the Abbé number v(nu)d decreases to the right and increases to the left on the horizontal axis. Both the vertical and horizontal axes are linear representations.

When the optical constant plot lies above line AB, thermal stability drops and the glass transition temperature and Tp rise. Thus, the optical constant plot falls within a range including points lying on line AB and points with a refractive index nd lower than line AB. When the optical constant plot lies on line BC or to the left of line BC, it becomes difficult to maintain thermal stability and obtain a desired refractive index while inhibiting a rise in the glass transition temperature and Tp. Thus, the optical constant plot in FIG. 2 falls within a range including points to the right of line BC. When the optical constant plot lies to the low refractive index side of line CD or the low refractive index side of line DE, optical glasses suited to optical elements of higher functionality and greater compactness cannot be obtained. Thus, the optical constant plot falls within a range including points lying on line CD and points with a refractive index greater than line CD, and within a range including points lying on line DE and points with a refractive index greater than line DE. To provide an optical glass suited to the correction of chromatic aberration, the optical constant plot in FIG. 2 includes points lying on line EA and points to the left of line EA.

In the above range of optical characteristics, to provide an optical glass for optical elements suited to the correction of chromatic aberration, an optical glass satisfying relation (I-1-1) below is desirable, an optical glass satisfying relation (I-1-2) below is preferred, an optical glass satisfying relation (I-1-3) below is of greater preference, an optical glass satisfying relation (I-1-4) below is of still greater preference, an optical glass satisfying the relation of (I-1-5) below is of even greater preference, and an optical glass satisfying relation (I-1-6) below is of yet still greater preference.

$$vd \geq 34.5 \quad \text{(I-1-1)}$$

$$vd \geq 35.0 \quad \text{(I-1-2)}$$

$$vd \geq 36.0 \quad \text{(I-1-3)}$$

$$vd \geq 36.5 \quad \text{(I-1-4)}$$

$$vd \geq 36.75 \quad \text{(I-1-5)}$$

$$vd \geq 37.0 \quad \text{(I-1-6)}$$

Within the range of optical characteristics indicated in FIG. 2, to improve thermal stability while lowering the glass transition temperature and Tp, an optical glass satisfying relation (I-2-1) below is desirable, an optical glass satisfying relation (I-2-2) below is preferred, and an optical glass satisfying relation (I-2-3) below is of greater preference.

$$vd \leq 39.5 \quad \text{(I-2-1)}$$

$$vd \leq 39.3 \quad \text{(I-2-2)}$$

$$vd \leq 39.0 \quad \text{(I-2-3)}$$

Within the range of optical characteristics indicated in FIG. 2, to provide an optical glass for an optical element of high functionality, and to provide an optical glass that is better suited to achieving compact optical elements, an optical glass satisfying relation (II-1) below is desirable, an optical glass satisfying relation (II-2) below is preferred, an optical glass satisfying relation (II-3) below is greater preference, and an optical glass satisfying relation (II-4) below is of still greater preference.

$$nd \geq 1.8725 \quad \text{(II-1)}$$

$$nd \geq 1.875 \quad \text{(II-2)}$$

$$nd \geq 1.8775 \quad \text{(II-3)}$$

$$nd \geq 1.88 \quad \text{(II-4)}$$

To provide an optical glass for an optical element of high functionality that is also suited to an optical element for correction of chromatic aberration, or an optical glass that is better suited to achieving a compact optical element, within the range of optical characteristics indicated in FIG. 2, an optical glass satisfying the relation of (III-1) below is desirable, an optical glass satisfying relation (III-2) below is preferred, an optical glass satisfying relation (III-3) below is of greater preference, an optical glass satisfying relation (III-4) below is of still greater preference, an optical glass satisfying relation (III-5) below is of even greater preference, an optical glass satisfying relation (III-6) below is of yet greater preference, an optical glass satisfying relation (III-7) below is of even still greater preference, an optical glass satisfying relation (III-8) below is of yet even greater preference, an optical glass satisfying relation (III-9) below is of still yet even greater preference, and an optical glass satisfying relation (III-10) below is optimal.

$$nd \geq 2.230 - 0.01 \times vd \quad \text{(III-1)}$$

$$nd \geq 2.2325 - 0.01 \times vd \quad \text{(III-2)}$$

$$nd \geq 2.235 - 0.01 \times vd \quad \text{(III-3)}$$

$$nd \geq 2.2375 - 0.01 \times vd \quad \text{(III-4)}$$

$$nd \geq 2.240 - 0.01 \times vd \quad \text{(III-5)}$$

$$nd \geq 2.2425 - 0.01 \times vd \quad \text{(III-6)}$$

$$nd \geq 2.245 - 0.01 \times vd \quad \text{(III-7)}$$

$$nd \geq 2.2475 - 0.01 \times vd \quad \text{(III-8)}$$

$$nd \geq 2.250 - 0.01 \times vd \quad \text{(III-9)}$$

$$nd \geq 2.2525 - 0.01 \times vd \quad \text{(III-10)}$$

To further improve thermal stability or inhibit a rise in the glass transition temperature or Tp, within the range of optical characteristics indicated in FIG. 2, an optical glass satisfying relation (IV-1) is desirable, an optical glass satisfying relation (IV-2) below is preferred, an optical glass satisfying relation (IV-3) below is of greater preference, an optical glass satisfying relation (IV-4) below is of still greater preference, an optical glass satisfying relation (IV-5) below is of even greater preference, an optical glass satisfying relation (IV-6) below is of yet greater preference, an optical glass satisfying relation (IV-7) below is of even still greater preference, an optical glass satisfying relation (IV-8) below is of yet even greater preference, an optical glass satisfying relation (IV-9) below is of still yet even greater preference, and an optical glass satisfying relation (IV-10) below is optimal.

$$nd \leq 2.280 - 0.01 \times vd \quad \text{(IV-1)}$$

$$nd \leq 2.2775 - 0.01 \times vd \quad \text{(IV-2)}$$

$$nd \leq 2.275 - 0.01 \times vd \quad \text{(IV-3)}$$

$$nd \leq 2.2725 - 0.01 \times vd \quad \text{(IV-4)}$$

$$nd \leq 2.270 - 0.01 \times vd \quad \text{(IV-5)}$$

$$nd \leq 2.2675 - 0.01 \times vd \quad \text{(IV-6)}$$

$$nd \leq 2.265 - 0.01 \times vd \quad \text{(IV-7)}$$

$$nd \leq 2.2625 - 0.0 \times vd \quad \text{(IV-8)}$$

$$nd \leq 2.260 - 0.01 \times vd \quad \text{(IV-9)}$$

$$nd \leq 2.2575 - 0.01 \times vd \quad \text{(IV-10)}$$

When the Abbé number v(nu)d exceeds the above range, the content of the rare earth oxide components $La_2O_3$ and $Gd_2O_3$ will be excessive and the thermal stability of the glass will tend to decrease. When the Abbé number v(nu)d falls below the above range, the content of high refractive index-imparting components such as $TiO_2$, $Nb_2O_5$, $WO_3$, and $Bi_2O_3$ will be excessive and precision press moldability will decrease. An Abbé number v(nu)d falling within the above range is desirable to improve the thermal stability and precision press moldability of the glass and enhance the large quantity production property of optical elements.

The refractive index can be adjusted to within the above range by adjusting the quantities incorporated of the above glass components, primarily $B_2O_3$, $Li_2O$, $La_2O_3$, $Gd_2O_3$, $ZrO_2$, $Ta_2O_5$, $TiO_2$, $Nb_2O_5$, $WO_3$, and $Bi_2O_3$, to within the ranges of the present invention. However, other components also affect the refractive index and can be suitably adjusted. The Abbé index can be adjusted to within the above range by adjusting the quantities incorporated of the above glass components, primarily $B_2O_3$, $La_2O_3$, $Gd_2O_3$, $ZrO_2$, $Ta_2O_5$, $TiO_2$, $Nb_2O_5$, $WO_3$, and $Bi_2O_3$, to within the ranges of the present invention. However, other components also affect the Abbé number and can be suitably adjusted.

The temperature Tp at which a viscosity of $10^{7.2}$ dPa·s is exhibited will be described next. The maximum temperature to which the glass is exposed during precision press molding varies somewhat depending on the method of molding, but can be thought of in terms of the temperature at which the glass exhibits a viscosity of $10^{7.2}$ dPa·s (referred to as "Tp"). To achieve even greater large-quantity productivity in precision press molding, the upper limit of Tp is 706° C. By integrating the above-described first to fifth factors, it is possible to markedly improve large-quantity productivity in precision press molding.

To further improve large-quantity productivity in precision press molding, an optical glass with a Tp of 704° C. or lower is desirable, a Tp of 702° C. or lower is preferred, a Tp of 700° C. or lower is greater preference, a Tp of 698° C. or lower is still greater preference, a Tp of 696° C. or lower is even greater preference, a Tp of 694° C. or lower is yet greater preference, a Tp of 690° C. or lower is even still greater preference. When emphasizing precision press moldability over optical constants, Tp is desirably 700° C. or lower, preferably 690° C. or lower, more preferably 680° C. or lower, still more preferably 670° C. or lower.

The Tp of an optical glass can be adjusted in the same manner as the glass transition temperature Tg. That is, it can be adjusted to within the above range by adjusting the quantities of the above-described glass components that are incorporated to within the ranges of the present invention. However, other components also affect the glass transition temperature, and can be suitably adjusted.

Optical Glass II may comprise the following optional components in addition to the above-described components.

MgO, CaO, SrO, and BaO serve to improve the meltability of the glass and lower the glass transition temperature. However, excessive incorporation diminishes thermal stability and decreases chemical durability, making it difficult to obtain desired optical characteristics. Thus, the total content of MgO, CaO, SrO, and BaO is desirably 0 to 10 percent. The total content of MgO, CaO, SrO, and BaO is preferably 0 to 8 percent, more preferably 0 to 6 percent, still more preferably 0 to 4 percent, even more preferably 0 to 2 percent, yet more preferably 0 to 1 percent, even still more preferably 0 to 0.8 percent, yet even more preferably 0 to 0.5 percent, and may be 0 percent.

$Y_2O_3$ functions to raise the refractive index. However, excessive incorporation lowers the thermal stability of the glass and raises the glass transition temperature and Tp. Accordingly, the $Y_2O_3$ content is desirably 0 to 10 percent. The $Y_2O_3$ content is preferably 0 to 8 percent, more preferably 0 to 6 percent, still more preferably 0 to 4 percent, even more preferably 0 to 2 percent, yet more preferably 0 to 1 percent. More preferably, none is incorporated.

Thermal stability can be further enhanced by optimizing the proportion of $La_2O_3$, $Gd_2O_3$, and $Y_2O_3$. Specifically, making the ratio of the $La_2O_3$ content to the total content of $La_2O_3$, $Gd_2O_3$, and $Y_2O_3$ ($La_2O_3+Gd_2O_3+Y_2O_3$), namely ($La_2O_3/(La_2O_3+Gd_2O_3+Y_2O_3)$), greater than 0.66 further enhances thermal stability and further lowers the liquidus temperature. From the perspective enhancing thermal stability and further lowering liquidus temperature, the lower limit of the ratio of ($La_2O_3/(La_2O_3+Gd_2O_3+Y_2O_3)$) is 0.67, more preferably 0.68, still more preferably 0.69, even more preferably 0.70 and the upper limit of the ratio is desirably 0.90, and preferably 0.85.

Thermal stability can be even further enhanced by optimizing the proportion of $La_2O_3$ and $Gd_2O_3$. Specifically, making the ratio of $La_2O_3$ to the total content of $La_2O_3$ and $Gd_2O_3$ ($La_2O_3+Gd_2O_3$), namely ($La_2O_3/(La_2O_3+Gd_2O_3)$), greater than 0.66 further enhances thermal stability and further lowers the liquidus temperature. From the perspective enhancing thermal stability and further lowering liquidus temperature, the lower limit of the ratio of ($La_2O_3/(La_2O_3+Gd_2O_3)$) is 0.67, more preferably 0.68, still more preferably 0.69, even more preferably 0.70 and the upper limit of the ratio is desirably 0.90, preferably, more preferably 0.85. Keeping the proportion of $La_2O_3$, $Gd_2O_3$, and $Y_2O_3$, or the proportion of $La_2O_3$ and $Gd_2O_3$, within the ranges given above improves thermal stability and inhibits a rise in the liquidus temperature. In particular, it is desirable to keep the proportion of $La_2O_3$, $Gd_2O_3$, and $Y_2O_3$, or the proportion of $La_2O_3$ and $Gd_2O_3$, within the above stated range in a high refractive index glass satisfying any one of relations (II-1) to (II-4) above. Further, it is desirable to keep the proportion of $La_2O_3$, $Gd_2O_3$, and $Y_2O_3$, or the proportion of $La_2O_3$ and $Gd_2O_3$, within the above stated range in a high refractive index glass satisfying any one of relations (III-1) to (III-10) above.

$Yb_2O_3$ functions to raise the refractive index. However, excessive incorporation diminishes the thermal stability of the glass and raises the glass transition temperature. Thus, the $Yb_2O_3$ content is desirably 0 to 10 percent. The $Yb_2O_3$ content is preferably 0 to 8 percent, more preferably 0 to 6 percent, still more preferably 0 to 4 percent, even more preferably 0 to 2 percent, yet more preferably 0 to 1 percent, even still more preferably not containing.

$Al_2O_3$ can be incorporated to adjust the viscosity of the glass melt. However, excessive incorporation decreases the thermal stability of the glass. Thus, the $Al_2O_3$ content is desirably 0 to 10 percent. The $Al_2O_3$ content is preferably 0 to 8 percent, more preferably 0 to 6 percent, still preferably 0 to 4 percent, even more preferably 0 to 2 percent, yet more preferably 0 to 1 percent, even still more preferably not containing.

Other components in the form of small quantities of $GeO_2$, $Ga_2O_3$, and $Lu_2O_3$ can be incorporated. However, these components are both expensive and nonessential. Thus, they are desirably not incorporated. $GeO_2$ itself undergoes a change in valence, creating the risk of inducing the above-described oxidation reduction reaction, and is thus desirably not incorporated from the perspective of enhancing large-quantity productivity in precision press molding.

A portion of the starting materials of the above components can be replaced with fluoride and a small amount of F can be incorporated into the glass. However, F volatiles markedly during melting and molding of the glass, causing the generation of striae and variation in optical characteristics, particularly the refractive index. Thus, the F content is 0 to 8 molar percent, desirably 0 to 6 molar percent 0 to 4 molar percent, preferably 0 to 2 molar, more preferably 0 to 1 molar percent. It is preferably not to incorporate F. When molding a preform for precision press molding in a step in which a glass melt gob is cooled, described further below, internal homogeneity as well as an extremely high degree of optical uniformity without surface striae are required. Thus, the incorporation of F is to be avoided.

Pb, Cd, As, Th, Cr, Te, and Se are toxic. Thus, in consideration of their environmental effects, they are desirably not incorporated into the glass. Pb is reduced during precision press molding, adhering to the surface of the glass and to the surface of the pressing mold, and compromising the molding precision of precision press molding. From these perspectives, it is desirably not incorporated.

The incorporation of Cs is ineffective and Cs is an expensive component. Thus, it is desirably not incorporated. Fe, Cu, Co, Nd, Er, and the like cause coloration of the glass, and are thus desirably not incorporated.

$Sb_2O_3$, $SnO_2$, $CeO_2$, nitrates, ammonium, chlorides, and the like can be added as clarifiers within a range of 0 to 1 weight percent in total based on the total amount of the glass components. To enhance the clarifying effect, 0 to 1 weight percent of $Sb_2O_3$ based on the total amount of the glass components, is desirably added. However, $Sb_2O_3$ is strongly oxidative property. To minimize damage to the molding surface of the pressing mold, the quantity added based on the total amount of the glass components, is desirably 0 to 0.8 weight percent, preferably 0 to 0.5 weight percent.

$SnO_2$, $CeO_2$, nitrates, ammonium, chlorides, and the like exhibit weaker oxidativity than $Sb_2O_3$. Thus, to reduce the burden on the molding surface of the pressing mold while promoting clarification, the quantity of $SnO_2$, $CeO_2$, nitrates, ammonium, chlorides, and the like that are added in total based on the total amount of the glass components, is desirably kept within a range of 0 to 1 weight percent, preferably a range of 0 to 0.5 weight percent.

To increase large-quantity productivity in precision press molding, enhance the thermal stability of the glass, and achieve desired optical characteristics, excluding the above-described clarifiers, the total content of $B_2O_3$, $SiO_2$, $Li_2O$, ZnO, $La_2O_3$, $Gd_2O_3$, $TiO_2$, $Nb_2O_5$, $WO_3$, $Bi_2O_3$, $ZrO_2$, $Ta_2O_5$, $Na_2O$, $K_2O$, MgO, CaO, SrO, BaO, $Y_2O_3$, $Yb_2O_3$, and $Al_2O_3$ is desirably 94 percent or greater, preferably 95 percent or greater, more preferably 96 percent or greater, still more preferably 97 percent or greater, even more preferably 98 percent or greater, yet more preferably 99 percent or greater, even still more preferably 100 percent or greater.

The total content of $B_2O_3$, $SiO_2$, $Li_2O$, ZnO, $La_2O_3$, $Gd_2O_3$, $TiO_2$, $Nb_2O_5$, $WO_3$, $Bi_2O_3$, $ZrO_2$, and $Ta_2O_5$ is desirably 94 percent or greater, preferably 95 percent or greater, more preferably 96 percent or greater, still more preferably 97 percent or greater, even more preferably 98 percent or greater, yet more preferably 99 percent or greater, even still more preferably 100 percent or greater.

The low-temperature softening property of Optical Glass II is determined by Tp, but a preferred glass can be indicated with emphasis on the sag temperature.

A sag temperature Ts of 700° C. or lower is desirable, 690° C. or lower is preferred, 685° C. or lower is greater preference, 680° C. or lower is still greater preference, 670° C. or lower is even greater preference to increase large-quantity productivity in precision press molding.

When emphasizing precision press moldability over optical constants, the sag temperature Ts is desirably 670° C. or lower, preferably 660° C. or lower, more preferably 650° C. or lower, still more preferably 640° C. or lower, even more preferably 630° C. or lower, yet more preferably 620° C. or lower, even still more preferably 610° C. or lower.

However, an excessively low sag temperature lowers the thermal stability of the glass and makes it difficult to achieve desired optical characteristics. Thus, a sag temperature of 550° C. or higher is desirable.

The sag temperature Ts can be adjusted in the same manner as the glass transition temperature.

As set forth above, denoting the time during which the pressing mold continuously presses the glass with the temperature of the glass exceeding the glass transition temperature in a single cycle of precision press molding as "t", and denoting the number of precision press molding cycles conducted without problem as "n", a number "n" of 100 or greater, desirably 200 or greater, preferably 300 or greater, more preferably 500 or greater is achieved using preforms comprised of Optical Glass II.

When "t" is set to 80 seconds when employing a conventional glass, t×n comes out at about 4,000 seconds, or falls short of 4,000 seconds. By contrast, 8,000 seconds, desirably 16,000 seconds or greater, preferably 24,000 seconds or greater, more preferably 40,000 seconds or greater are exceeded when employing a preform comprised of Optical Glass II.

When employing a preform comprised of Optical Glass II repeatedly in a single pressing mold in this manner, the number of times "n" that successful precision press molding can be consecutively conducted is large and the extended period t×n is long. Thus, maintenance of the pressing mold is reduced and the frequency with which the precision press molding process must be stopped to replace the pressing mold is reduced. Thus, the second aspect of the present invention greatly increases productivity, reduces production costs, and markedly improves the large quantity production properties of optical elements.

[Common Features of Optical Glasses I and II]

While being high refractive index glasses, Optical Glasses I and II have low Tp's and thus good thermal stability. Desirable optical glasses of the present invention have a liquidus temperature of 1,200° C. or lower, preferably 1,180° C. or lower, more preferably 1,160° C. or lower, still more preferably 1,140° C. or lower, even more preferably 1,120° C. or lower, yet more preferably 1,100° C. or lower, even still more preferably 1,080° C. or lower, most preferably 1,060° C. or lower.

The lower limit of the liquidus temperature is not specifically limited. However, excessively lowering the liquidus temperature does not result in commensurate improvement in the moldability of the preform. It does, however, make it difficult to lower the glass transition temperature and sag temperature. Thus, a liquidus temperature of 800° C. or higher is desirable. Since a high refractive index glass with a low glass transition temperature will have a low liquidus temperature, moldability is well maintained when molding a glass melt while preventing devitrification.

The liquidus temperature can be adjusted by adjusting the quantities incorporated of the above-described glass components, principally the quantities of $Li_2O$ and $SiO_2$ incorporated, the ratio of $La_2O_3/(La_2O_3+Gd_2O_3+Y_2O_3)$, and the ratio of $La_2O_3/(La_2O_3+Gd_2O_3)$, facilitating the obtaining of characteristics within the above-stated ranges. However, other components sometimes also affect the liquidus temperature. In such cases, it suffices to suitably adjust them to within the above-stated ranges.

A viscosity at the liquidus temperature of 1.5 dPa·s or greater is desirable, 1.7 dPa·s or greater is preferred, 2.0 dPa·s or greater is greater preference, 2.2 dPa·s or greater is still greater preference, 2.5 dPa·s or greater is even greater preference to further enhance moldability in the course of molding of a glass melt. Additionally, the moldability of the glass decreases when the viscosity is excessively high. Thus, a viscosity at the liquidus temperature of 50 dPa·s or lower is desirable.

The glass viscosity at the above liquidus temperature can be adjusted to within the above range by adjusting the quantities incorporated of the above glass components, primarily $B_2O_3$, $SiO_2$, $Li_2O$, and ZnO. However, other components also affect the glass viscosity at the liquidus temperature, and can be suitably adjusted.

Optical Glasses I and II can be obtained by weighing out and blending starting materials such as boric acid, oxides, and as needed, carbonates, nitrates, sulfates, and hydroxides to achieve desired characteristics; thoroughly mixing the mixture; charging the mixture to a melting vessel such as a platinum crucible; heating, melting, clarifying, and homogenizing the mixture; and then conducting molding. The melting temperature is desirably 1,100 to 1,400° C., for example, to obtain homogeneous glass.

Alternatively, starting materials such as boric acid, oxides, and as needed, carbonates, nitrates, sulfates, and hydroxides can be rough melted to prepare multiple types of cullets; the cullets can be blended, heated, melted, clarified, and homogenized to obtain desired characteristics; and molding can be conducted.

In FIGS. 1 and 2, which show the relation between the refractive index and Abbé number in Optical Glasses I and II of the present invention, some portions overlap and other portions do not. The portion lying inside the range of Glass I but outside the range of Glass II represents a range within which relatively thermally stable glass can be readily manufactured. The portion lying within the range of Glass II but outside the range of Glass I represents a range of glasses of relatively high usefulness in optical design. There is a certain tradeoff between the two in terms of emphasis on thermal stability and a high degree of usefulness in optical design. Although the two share portions of their compositions and characteristics, they also differ in this manner.

From such perspectives, depending on the characteristic being emphasized, there are cases where optical glasses lying in regions where Optical Glasses I and II overlap are desirable. An Optical Glass I having a composition and various characteristics that are desirable in Optical Glass II, and an Optical Glass II having a composition and various characteristics that are desirable in Optical Glass I, are both desirable optical glasses.

[Preforms for Precision Press Molding]

The preform for precision press molding of the present invention comprises two aspects. The first aspect (called Preform I) is comprised of Optical Glass I. The second aspect (called Preform II) is comprised of Optical Glass II.

Preforms I and II will be collectively referred to hereinafter as preforms for precision press molding (or in some cases, simply as "preforms"). A preform is a premolded glass product that is heated and subjected to precision press molding. Here, the term "precision press molding," which is also widely known as mold optics molding, is a method of forming the optical functional surface of an optical element by transferring the molding surface of a pressing mold. The term "optically functional surface" means a surface that refracts, reflects, diffracts, admits, or emits light being controlled in an optical element. The lens surface of a lens corresponds to an optically functional surface.

A mold release film is desirably coated on the surface of a preform to achieve good glass extension along the molding surface while preventing the glass from reacting with and fusing to the molding surface of the pressing mold during precision press molding. There are various forms of mold release films; examples are noble metals (platinum, platinum alloys), oxides (oxides of Si, Al, Zr, La, Y, and the like), nitrides (nitrides of B, Si, and Al), and carbon-containing films. Desirable carbon-containing films are films containing primarily carbon (when the elemental content in the film is denoted as an atom percent, the content of carbon is greater than the content of other elements). Specific examples are carbon films and hydrocarbon films. Carbon-containing films can be formed using a carbon starting material by vacuum deposition, sputtering, ion plating, and other known methods, or by thermal decomposition of a material gas such as a hydrocarbon and other known methods. Other films can be formed by vapor deposition, sputtering, ion plating, sol gel methods, and the like.

The method of manufacturing the preform of the present invention is not specifically limited. However, manufacturing by the following methods utilizing the excellent properties of the above-described glasses is desirable.

The first method for manufacturing a preform for precision press molding of the present invention (Preform Manufacturing Method I) comprises melting glass starting materials; causing the glass melt obtained to flow out; separating the glass melt gobs; and molding the glass melt gobs in a cooling step; and is characterized in that a preform comprised of the above-described optical glass is molded.

The second method for manufacturing a preform for precision press molding of the present invention (Preform Manufacturing Method II) comprises melting glass starting materials; molding the glass melt obtained to prepare a molded article; and processing the molded article to prepare a preform comprised of the above-described optical glass of the present invention.

Preform Manufacturing Methods I and II share the process of manufacturing a homogeneous glass melt from glass starting materials. For example, glass starting materials blended to yield desired characteristics are charged to a melting vessel made of platinum, and heated, melted, clarified, and homogenized to prepare a homogenous glass melt. The glass melt is then caused to flow out through a flow nozzle or flow pipe of platinum or platinum alloy the temperature of which has been adjusted. It is also possible to roughly melt the glass starting materials to prepare cullets; blend the cullets obtained; heat, melt, clarify, and homogenize the mixture to obtain a glass melt; and cause the glass melt to flow out through the above-described flow nozzle or flow pipe.

When molding a small preform or a spherical preform, the glass melt is made to drip in the form of glass melt droplets of desired weight from the flow nozzle, the droplets are received by preform forming molds, and preforms are molded. Alternatively, glass melt droplets of desired weight are similarly made to drip from a flow nozzle into liquid nitrogen or the like to form preforms. When manufacturing medium or large preforms, a glass melt flow is made to flow out of a flow pipe, the tip portion of the glass melt flow is received in a preform forming mold, a constriction is formed in the glass melt flow between the nozzle and the preform forming mold, and the preform forming mold is dropped directly downward, separating the glass melt flow at the constriction by means of the surface tension of the glass melt. A glass melt gob of desired weight is received in a receiving member and formed into a preform.

To manufacture a preform having a smooth surface free of scratches, grime, wrinkles, surface deformities, and the like, such as a free surface, a method is employed such as forming a glass melt gob into a preform while the glass melt gob is being floated by applying air pressure to it while it is on a preform forming mold or the like, or placing glass melt droplets in a medium that has been liquefied by cooling a gaseous substance at ordinary pressure or reduced pressure, such as liquid nitrogen, and molding them into preforms.

When forming a preform by floating a glass melt gob, upward air pressure is applied by blowing a gas (called a "floating gas") onto the glass melt gob. In this process, the floating gas will penetrate into the glass if the viscosity of the glass melt gob is too low, forming bubbles that remain in the preform. However, the floating gas will not penetrate into the glass and the glass gob will float if the viscosity of the glass melt gob is kept to 3 to 60 dPa·s.

Examples of gases that can be employed when blowing floating gas at the preform are: air, $N_2$ gas, $O_2$ gas, Ar gas, He gas, and steam. The air pressure is not specifically limited so long as the preform is floated without contacting a solid such as the surface of the forming mold.

The precision press molded product (such as an optical element) that is manufactured from the preform is often a lens or the like having an axis of rotational symmetry. Thus, the preform desirably has a shape with an axis of rotational symmetry. Specific examples are spheres and items having a single axis of rotational symmetry. Examples of shapes having a single axis of rotational symmetry are shapes having smooth contour lines free of edges and pits in a cross-section containing an axis of rotational symmetry, such as shapes having elliptic contour lines in which a minor axis matches the axis of rotational symmetry in the cross-section. These include shapes such as flattened spheres (shapes in which there is an axis passing through the center of a sphere, with the dimension thereof being compressed in the axial direction).

In Preform Manufacturing Method I, the glass is molded within a temperature range permitting plastic deformation. Thus, the preform can be produced by press molding the glass gob. In that case, the shape of the preform can be set relatively freely. Thus, the shape of an optical element can be approximated. For example, one opposing surface can be made convex and the other concave, both surfaces can be made concave, one surface can be made flat and the other convex, one surface can be made flat and the other concave, or both surfaces can be made convex.

A preform produced in this manner is desirably employed with a carbon-containing film applied to its surface.

In Preform Manufacturing Method II, for example, the glass melt is cast into a casting mold and molded, distortion of the molded article is removed by annealing, the molded article is cut or severed to impart prescribed dimensions and shape to it, and multiple pieces of glass are produced. The glass pieces are polished to render the surfaces thereof smooth and obtain preforms comprised of a prescribed weight of glass. Preforms produced in this manner are also desirably employed with carbon-containing films applied to their surfaces. Preform Manufacturing Method II is suited to the manufacturing of spherical preforms, flat preforms, and the like that can be readily ground and polished.

In both of the manufacturing methods, the thermal stability of the optical glass employed is good. Thus, defective products tend not to be produced by glass devitrification, striae, or the like, making it possible to stabilize and manufacture a high-quality preform and making it possible to increase the large-quantity productivity of the optical element manufacturing process as a whole.

Preforms that are preferred in terms of further increasing the large-quantity productivity of optical elements in precision press molding will be described next.

Optical Glasses I and II both afford good precision press moldability from the aspect of the glass material. However, reducing the amount of deformation of the glass during precision press molding makes it possible to lower the temperature of the glass and pressing mold during precision press molding, shorten the time required for press molding, and lower the pressure employed in pressing. As a result, the reactivity of the glass and the molding surface of the pressing mold diminishes, the above-described problems occurring during precision press molding decrease, and large-quantity productivity is enhanced.

A preform that is desirably employed in precision press molding a lens possesses pressed surfaces that face in opposite directions (surfaces that are pressed by the opposing molding surfaces of the pressing mold during precision press molding), and desirably comprises an axis of rotational symmetry running through the center of the two pressed surfaces. Among such preforms, those having one pressed surface in the form of a convex surface and another pressed surface in the form of a concave surface, flat surface, or a convex surface of lower curvature than the first convex surface are suited to the precision press molding of meniscus lenses.

Preforms that are suited to the precision press molding of biconcave lenses are those in which one pressed surface is convex, concave, or flat, and the other is convex, concave, or flat.

Preforms that are suited to the precision press molding of biconvex lenses are those in which one pressed surface is convex and the other is convex or flat.

In either case, a preform with a shape approximating the shape of the article being precision press molded is desirable.

When shaping a glass melt gob into a preform with a forming mold, the lower surface of the glass above the forming mold is roughly determined by the shape of the molding surface of the forming mold. Additionally, the shape of the upper surface of the glass is determined by the surface tension of the glass melt and the weight of the glass itself. To reduce the amount of deformation of the glass during precision press molding, it is necessary to control the shape of the upper surface of the glass during shaping in the preform forming mold. The shape of the upper surface of the glass determined by the surface tension of the glass melt and the weight of the glass itself becomes a free convex surface. However, pressure is applied to the upper surface of the glass to obtain a flat surface, concave surface, or a convex surface of less curvature than the free surface. Specifically, the upper surface of the glass is pressed with a forming mold having a molding surface of desired shape, or air pressure is applied to the upper surface of the glass to mold it into a desired shape. When pressing the upper surface of the glass with a forming mold, multiple gas blowing holes can be provided in the molding surface of the forming mold, gas can be blown through these gas blowing holes to form a gas cushion between the molding surface and the upper surface of the glass, and the upper surface of the glass can be molded through the gas cushion. Alternatively, when attempting to mold the upper surface of the glass into a surface of greater curvature than the above-mentioned free surface, negative pressure can be generated in the vicinity of the upper surface of the glass to mold the upper surface into a somewhat more tightly massed configuration.

To obtain a preform with a shape more closely approximating the shape of the precision press molded article, a polished preform is desirable. For example, a preform having one surface being pressed that has been polished into a flat surface or a partially spherical surface, and another surface being pressed that has been polished into a partially spherical surface of a flat surface, is desirable. The partially spherical surface can be convex or concave; whether it is made convex or concave is desirably determined based on the surface of the precision press molded article, as set forth above.

The various preforms set forth above are desirable for forming lenses 10 mm or more in diameter and preferable for forming lenses 20 mm or more in diameter. They are also desirable for molding lenses with a center thickness exceeding 2 mm.

[The Optical Element]

The optical element of the present invention will be described next.

The first optical element of the present invention is an optical element comprised of above-described Optical Glass I or II.

The second optical element of the present invention is an optical element obtained by heating and precision press molding above-described Preform I or II.

The type of optical element is not specifically limited. Examples of classical optical elements are lenses such as aspherical lenses, spherical lenses, plano-concave lenses, plano-convex lenses, biconcave lenses, biconvex lenses, convex meniscus lenses, and concave meniscus lenses; microlenses; lens arrays; lenses with diffraction gratings; prisms; and prisms with lens functions. As needed, antireflective films, partially reflective films with wavelength selectivity, and the like can be provided on the surfaces thereof.

The optical element of the present invention is comprised of a glass of high refractive index and a low dispersion characteristic. Thus, it can be combined with optical elements comprised of other glasses to effect good chromatic correction. Since the optical element of the present invention is a glass of high refractive index, it can be employed in imaging optical systems and projection optical systems to achieve compact optical systems.

The method for manufacturing an optical element of the present invention will be described next.

In the method for manufacturing an optical element of the present invention, a preform produced from the above-described preform of the present invention (Preform I or II), or a preform produced by the above-described method of the present invention (Preform Manufacturing Method I or II) is precision press molded using a pressing mold.

In a desirable form of the method for manufacturing an optical element of the present invention, preforms of the present invention (Preform I or II) or preforms produced by the method of the present invention (Preform Manufacturing Method I or II) are repeatedly processed in a precision press molding step using a single pressing mold to produce a large quantity of optical elements.

As set forth above, the preforms employed in the present invention are comprised of high refractive index, low dispersion glass that tends not to react with the molding surface of the pressing mold during precision press molding. Thus, even when a precision press molding step is repeated with a single pressing mold, problems such as fusion of the glass to the pressing mold and the formation of bubbles on the glass surface tend not to occur. Accordingly, optical elements can be manufactured in large quantities with good productivity. The service lifetime of expensive pressing molds can be extended, which is highly economical.

To prevent oxidation of the molding surface of the pressing mold or the mold release film provided on the molding surface, the steps of heating the pressing mold and the preform and conducting precision press molding are desirably conducted in a nonoxidizing gas atmosphere, such as nitrogen gas or a mixture of nitrogen gas and hydrogen gas. In a nonoxidizing gas atmosphere, the carbon-containing film covering the preform surface does not oxidize, and this film remains on the surface of the molded product that is precision press molded. This film must be removed in the end. To relatively easily and completely remove the carbon-containing film, it suffices to heat the precision press molded article in an oxidizing atmosphere, such as air. The oxidation and removal of the carbon-containing film must be conducted at a temperature at which the precision press molded article is not deformed by heating. Specifically, they are desirably conducted within a temperature range lower than the glass transition temperature.

A pressing mold the molding surface of which has been processed with high precision to a desired shape is employed in precision press molding. To prevent fusion of the glass during pressing, a mold release film can be formed on the molding surface. Examples of the mold release film are carbon-containing films, nitride films, and noble metal films. A hydrogenated carbon film or carbon film is desirable as a carbon-containing film.

The following two forms of the method for manufacturing optical elements of the present invention exist.

In the first aspect (Optical Element Manufacturing Method I), Preform I or II is introduced into a pressing mold, the preform and pressing mold are heated together, and precision press molding is conducted. In the second aspect (Optical Element Manufacturing Method II), Preform I or II that has been heated is introduced into a preheated pressing mold and precision press molding is conducted.

In Optical Element Manufacturing Method I, the preform is positioned between an opposing pair of molds comprised of an upper mold and a lower mold the molding surfaces of which have been processed to precise shapes, the pressing mold and preform are both heated to a temperature corresponding to a glass viscosity of $10^5$ to $10^9$ dPa·s to soften the preform, and the preform is press molded to precisely transfer the molding surface of the pressing mold to the glass. Optical Element Manufacturing Method I is the recommended method when emphasizing improved molding precision, such as surface precision and eccentricity precision.

In Optical Element Manufacturing Method II, a preform that has been preheated to a temperature corresponding to a glass viscosity of $10^4$ to $10^8$ dPa·s is positioned between an opposing pair of molds comprised of an upper mold and a lower mold the molding surfaces of which have been processed to precise shapes, and the preform is press molded to precisely transfer the molding surface of the pressing mold to the glass. Optical Element Manufacturing Method II is the recommended method when emphasizing improved productivity.

The pressure applied and duration of pressing can be suitably determined in light of the glass viscosity. For example, the pressure applied can be about 5 to 15 MPa and the duration of pressing can be 10 to 300 seconds. Pressing conditions such as the pressure applied and the duration of pressing can be suitably established within known ranges in accordance with the shape and dimensions of the molded article.

Subsequently, the pressing mold and precision press molded article are cooled and, desirably at a temperature below the strain point, the molds are separated and the precision press molded article is removed. To precisely achieve desired values of optical characteristics, the annealing conditions of the molded article during cooling, such as the annealing rate, can be suitably adjusted.

The optical element of the present invention can be manufactured without employing a press-molding step. For example, a homogeneous glass melt can be poured into a casting mold to form a glass block and annealed to remove distortion. The annealing conditions can be adjusted to achieve a desired glass refractive index value and adjust the optical characteristics. Subsequently, the glass block can be cut or severed to form glass pieces which are then ground and polished to finish optical elements.

The imaging device of the present invention is equipped with the optical element of the present invention set forth above. Since the optical element of the present invention is comprised of the above-described optical glass having characteristics of a high refractive index and low dispersion, for example, it is possible to combine a lens or lenses having a high dispersion characteristic with a lens or lenses in the form of the optical element of the present invention to obtain an imaging device equipped with a compact imaging optical system that is capable of good correction of chromatic aberration. Image sensors such as CCDs or CMOSs can be employed as the imaging elements constituting the imaging device.

EMBODIMENTS

The present invention is described in greater detail below through embodiments. However, the present invention is not limited to the embodiments.

[Embodiment 1]

Starting materials in the form of boric acid, oxides, carbonates, sulfates, nitrates, hydroxides, and the like were weighed out and thoroughly mixed to form a blended starting material so as to incorporate various components in a manner yielding the glass compositions indicated in Table 1. The blended starting material was charged to a platinum crucible and heated and melted at a temperature range of 1,200 to 1,350° C. based on differences in the glass composition. Within this temperature range, a glass melting temperature of 1,250° C. or higher was desirably employed to further improve the meltability of the starting material, and a temperature of 1,300° C. or lower was desirably employed to inhibit coloration of the glass. Following melting, the glass melt was poured into a casting mold, cooled to the vicinity of the glass transition temperature, and then immediately placed in an annealing furnace. Annealing was conducted for about an hour within the glass transition temperature range, after which the interior of the furnace was allowed to cool to room temperature, yielding the various optical glasses indicated in Table 1. No precipitation of crystals was observed by microscope in the optical glasses obtained. The various characteristics of the optical glasses thus obtained are given in Table 1. Nos. 1 to 35 in Table 1 correspond to Optical Glass I. Nos. 5 to 8, 10, 11, 18 to 20, 22, 23, and 26 to 28 in Table 1 correspond to Optical Glass II.

TABLE 1

| | | No. | | | | |
|---|---|---|---|---|---|---|
| Glass component | | 1 | | | 2 | |
| ( ): Cation component | molar % | cationic % | mass % | molar % | cationic % | mass % |
| $B_2O_3$ (B) | 29.00 | 38.00 | 13.19 | 28.94 | 37.50 | 12.87 |
| $SiO_2$ (Si) | 7.63 | 5.00 | 3.00 | 7.72 | 5.00 | 2.96 |
| $GeO2$ (Ge) | 0.00 | 0.00 | 0.00 | 0.00 | 0.00 | 0.00 |
| $Li_2O$ (Li) | 0.00 | 0.00 | 0.00 | 0.00 | 0.00 | 0.00 |
| ZnO (Zn) | 26.72 | 17.50 | 14.21 | 26.23 | 17.00 | 13.64 |
| $La_2O_3$ (La) | 16.03 | 21.00 | 34.11 | 15.05 | 19.50 | 31.31 |
| $Gd_2O_3$ (Gd) | 3.82 | 5.00 | 9.04 | 4.63 | 6.00 | 10.72 |
| $Y_2O_3$ (Y) | 0.00 | 0.00 | 0.00 | 0.00 | 0.00 | 0.00 |
| $TiO_2$ (Ti) | 1.53 | 1.00 | 0.80 | 0.00 | 0.00 | 0.00 |
| $Nb_2O_5$ (Nb) | 0.00 | 0.00 | 0.00 | 0.00 | 0.00 | 0.00 |
| $WO_3$ (W) | 7.63 | 5.00 | 11.56 | 9.14 | 5.92 | 13.53 |
| $Bi_2O_3$ (Bi) | 0.00 | 0.00 | 0.00 | 0.00 | 0.00 | 0.00 |
| $ZrO_2$ (Zr) | 3.82 | 2.50 | 3.07 | 4.15 | 2.69 | 3.27 |
| $Ta_2O_5$ (Ta) | 3.82 | 5.00 | 11.02 | 4.15 | 5.38 | 11.72 |
| $Na_2O$ (Na) | 0.00 | 0.00 | 0.00 | 0.00 | 0.00 | 0.00 |
| $K_2O$ (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| $Yb_2O_3$ (Yb) | 0.00 | 0.00 | 0.00 | 0.00 | 0.00 | 0.00 |
| $Al_2O_3$ (Al) | 0.00 | 0.00 | 0.00 | 0.00 | 0.00 | 0.00 |
| Total | 100.00 | 100.00 | 100.00 | 100.01 | 98.99 | 100.02 |
| Ti + Nb + W + Bi (=X) | — | 6.00 | — | — | 5.92 | — |
| $SiO_2/B_2O_3$ | 0.26 | — | — | 0.27 | — | — |
| $La_2O_3/(La_2O_3 + Gd_2O_3 + Y_2O_3)$ | 0.81 | — | — | 0.76 | — | — |
| $La_2O_3/(La_2O_3 + Gd_2O_3)$ | 0.81 | — | — | 0.76 | — | — |
| $ZrO_2 + Ta_2O_5 + TiO_2 + Nb_2O_5 + WO_3 + Bi_2O_3$ | 16.80 | — | — | 17.44 | — | — |
| $Ti^{4+}/(Zr^{4+} + Ta^{5+} + Ti^{4+} + Nb^{5+} + W^{6+} + Bi^{3+})$ | — | 0.0740741 | — | — | 0.0000000 | — |
| Refractive index nd | | 1.8812 | | | 1.8813 | |
| Abbe number vd | | 36.96 | | | 37.01 | |
| Glass transtion Temp. Tg [° C.] | | 618 | | | 620 | |
| 655-5X [° C.] | | 625 | | | 625.4 | |
| 650-5X [° C.] | | 620 | | | 620.4 | |
| 645-5X [° C.] | | 615 | | | 615.4 | |
| 640-5X [° C.] | | 610 | | | 610.4 | |
| 635-5X [° C.] | | 605 | | | 605.4 | |
| Sag temp. Ts [° C.] | | 654 | | | 656 | |
| Tp [° C.] | | 717 | | | 717 | |
| 750-5X [° C.] | | 720 | | | 720 | |
| 745-5X [° C.] | | 715 | | | 715 | |
| 740-5X [° C.] | | 710 | | | 710 | |
| 735-5X [° C.] | | 705 | | | 705 | |
| Liquidus Temp. [° C.] | | 1050 | | | 1060 | |
| Viscosity at liquidus temp [dPa · s] | | 4.7 | | | 3.6 | |
| Available time of successive pressing n (Second test) | | | | | | |
| t [sec] (Second test) | | | | | | |

TABLE 1-continued

| | | |
|---|---|---|
| Pressing time t × n (t) [sec] (Second test) | | |
| Pressing time t × n (t) [sec] (Average of ten times) | $1.5 \times 10^4$ | $1.0 \times 10^4$ |
| Glass I/II | Optical glass I | Optical glass I |

| | No. | | | | | |
|---|---|---|---|---|---|---|
| Glass component | 3 | | | 4 | | |
| ( ): Cation component | molar % | cationic % | mass % | molar % | cationic % | mass % |
| $B_2O_3$ (B) | 26.31 | 35.00 | 12.18 | 24.63 | 33.00 | 11.59 |
| $SiO_2$ (Si) | 10.53 | 7.00 | 4.21 | 11.94 | 8.00 | 4.85 |
| $GeO_2$ (Ge) | 0.00 | 0.00 | 0.00 | 0.00 | 0.00 | 0.00 |
| $Li_2O$ (Li) | 0.00 | 0.00 | 0.00 | 0.00 | 0.00 | 0.00 |
| ZnO (Zn) | 27.82 | 18.50 | 15.06 | 29.84 | 20.00 | 16.42 |
| $La_2O_3$ (La) | 15.04 | 20.00 | 32.57 | 14.93 | 20.00 | 32.88 |
| $Gd_2O_3$ (Gd) | 4.51 | 6.00 | 10.87 | 4.48 | 6.00 | 10.97 |
| $Y_2O_3$ (Y) | 0.00 | 0.00 | 0.00 | 0.00 | 0.00 | 0.00 |
| $TiO_2$ (Ti) | 2.26 | 1.50 | 1.20 | 2.99 | 2.00 | 1.61 |
| $Nb_2O_5$ (Nb) | 0.00 | 0.00 | 0.00 | 0.00 | 0.00 | 0.00 |
| $WO_3$ (W) | 4.51 | 3.00 | 6.95 | 1.49 | 1.00 | 2.34 |
| $Bi_2O_3$ (Bi) | 0.00 | 0.00 | 0.00 | 0.00 | 0.00 | 0.00 |
| $ZrO_2$ (Zr) | 4.51 | 3.00 | 3.70 | 4.48 | 3.00 | 3.73 |
| $Ta_2O_5$ (Ta) | 4.51 | 6.00 | 13.26 | 5.22 | 7.00 | 15.61 |
| $Na_2O$ (Na) | 0.00 | 0.00 | 0.00 | 0.00 | 0.00 | 0.00 |
| $K_2O$ (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| $Yb_2O_3$ (Yb) | 0.00 | 0.00 | 0.00 | 0.00 | 0.00 | 0.00 |
| $Al_2O_3$ (Al) | 0.00 | 0.00 | 0.00 | 0.00 | 0.00 | 0.00 |
| Total | 100.00 | 100.00 | 100.00 | 100.00 | 100.00 | 100.00 |
| Ti + Nb + W + Bi (=X) | — | 4.50 | — | — | 3.00 | — |
| $SiO_2/B_2O_3$ | 0.40 | — | — | 0.48 | — | — |
| $La_2O_3/(La_2O_3 + Gd_2O_3 + Y_2O_3)$ | 0.77 | — | — | 0.77 | — | — |
| $La_2O_3/(La_2O_3 + Gd_2O_3)$ | 0.77 | — | — | 0.77 | — | — |
| $ZrO_2 + Ta_2O_5 + TiO_2 + Nb_2O_5 + WO_3 + Bi_2O_3$ | 15.79 | — | — | 14.18 | — | — |
| $Ti^{4+}/(Zr^{4+} + Ta^{5+} + Ti^{4+} + Nb^{5+} + W^{6+} + Bi^{3+})$ | — | 0.1111111 | — | — | 0.1538462 | — |
| Refractive index nd | | 1.8808 | | | 1.881 | |
| Abbe number νd | | 37.56 | | | 38.1 | |
| Glass transtion Temp. Tg [° C.] | | 626 | | | 638 | |
| 655-5X [° C.] | | 632.5 | | | 640 | |
| 650-5X [° C.] | | 627.5 | | | 635 | |
| 645-5X [° C.] | | 622.5 | | | 630 | |
| 640-5X [° C.] | | 617.5 | | | 625 | |
| 635-5X [° C.] | | 612.5 | | | 620 | |
| Sag temp. Ts [° C.] | | 673 | | | 686 | |
| Tp [° C.] | | 732 | | | 741 | |
| 750-5X [° C.] | | 728 | | | 735 | |
| 745-5X [° C.] | | 723 | | | 730 | |
| 740-5X [° C.] | | 718 | | | 725 | |
| 735-5X [° C.] | | 713 | | | 720 | |
| Liquidus Temp. [° C.] | | 1100 | | | 1140 | |
| Viscosity at liquidus temp [dPa · s] | | 3 | | | 2.5 | |
| Available time of successive pressing n (Second test) | | | | | | |
| t [sec] (Second test) | | | | | | |
| Pressing time t × n (t) [sec] (Second test) | | | | | | |
| Pressing time t × n (t) [sec] (Average of ten times) | | $1.0 \times 10^4$ | | | $1.0 \times 10^4$ | |
| Glass I/II | | Optical glass I | | | Optical glass I | |

| | No. | | | | | |
|---|---|---|---|---|---|---|
| Glass component | 5 | | | 6 | | |
| ( ): Cation component | molar % | cationic % | mass % | molar % | cationic % | mass % |
| $B_2O_3$ (B) | 33.13 | 42.50 | 15.13 | 33.10 | 42.30 | 14.92 |
| $SiO_2$ (Si) | 1.56 | 1.00 | 0.61 | 1.56 | 1.00 | 0.61 |
| $GeO_2$ (Ge) | 0.00 | 0.00 | 0.00 | 0.00 | 0.00 | 0.00 |
| $Li_2O$ (Li) | 0.00 | 0.00 | 0.00 | 0.00 | 0.00 | 0.00 |
| ZnO (Zn) | 29.63 | 19.00 | 15.81 | 29.88 | 19.10 | 15.75 |
| $La_2O_3$ (La) | 14.62 | 18.75 | 31.24 | 14.74 | 18.85 | 31.13 |

TABLE 1-continued

| Glass component | | | | | | |
|---|---|---|---|---|---|---|
| Gd₂O₃ (Gd) | 4.29 | 5.50 | 10.19 | 4.30 | 5.50 | 10.10 |
| Y₂O₃ (Y) | 0.00 | 0.00 | 0.00 | 0.00 | 0.00 | 0.00 |
| TiO₂ (Ti) | 0.78 | 0.50 | 0.41 | 0.00 | 0.00 | 0.00 |
| Nb₂O₅ (Nb) | 0.00 | 0.00 | 0.00 | 0.00 | 0.00 | 0.00 |
| WO₃ (W) | 7.80 | 5.00 | 11.85 | 7.82 | 5.00 | 11.75 |
| Bi₂O₃ (Bi) | 0.00 | 0.00 | 0.00 | 0.00 | 0.00 | 0.00 |
| ZrO₂ (Zr) | 4.29 | 2.75 | 3.46 | 4.30 | 2.75 | 3.43 |
| Ta₂O₅ (Ta) | 3.90 | 5.00 | 11.30 | 4.30 | 5.50 | 12.31 |
| Na₂O (Na) | 0.00 | 0.00 | 0.00 | 0.00 | 0.00 | 0.00 |
| K₂O (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| Yb₂O₃ (Yb) | 0.00 | 0.00 | 0.00 | 0.00 | 0.00 | 0.00 |
| Al₂O₃ (Al) | 0.00 | 0.00 | 0.00 | 0.00 | 0.00 | 0.00 |
| Total | 100.00 | 100.00 | 100.00 | 100.0 | 100.00 | 100.00 |
| Ti + Nb + W + Bi (=X) | — | 5.50 | — | — | 5.00 | — |
| SiO₂/B₂O₃ | 0.05 | — | — | 0.05 | — | — |
| La₂O₃/(La₂O₃ + Gd₂O₃ + Y₂O₃) | 0.77 | — | — | 0.77 | — | — |
| La₂O₃/(La₂O₃ + Gd₂O₃) | 0.77 | — | — | 0.77 | — | — |
| ZrO₂ + Ta₂O₅ + TiO₂ + Nb₂O₅ + WO₃ + Bi₂O₃ | 16.77 | — | — | 16.42 | — | — |
| Ti⁴⁺/(Zr⁴⁺ + Ta⁵⁺ + Ti⁴⁺ + Nb⁵⁺ + W⁶⁺ + Bi³⁺) | — | 0.0377358 | — | — | 0 | — |
| Refractive index nd | | 1.881 | | | 1.8813 | |
| Abbe number νd | | 37.02 | | | 37.29 | |
| Glass transtion Temp. Tg [° C.] | | 606 | | | 607 | |
| 655-5X [° C.] | | 627.5 | | | 630 | |
| 650-5X [° C.] | | 622.5 | | | 625 | |
| 645-5X [° C.] | | 617.5 | | | 620 | |
| 640-5X [° C.] | | 612.5 | | | 615 | |
| 635-5X [° C.] | | 607.5 | | | 610 | |
| Sag temp. Ts [° C.] | | 645 | | | 648 | |
| Tp [° C.] | | 698 | | | 700 | |
| 750-5X [° C.] | | 723 | | | 725 | |
| 745-5X [° C.] | | 718 | | | 720 | |
| 740-5X [° C.] | | 713 | | | 715 | |
| 735-5X [° C.] | | 708 | | | 710 | |
| Liquidus Temp. [° C.] | | 1050 | | | 1050 | |
| Viscosity at liquidus temp [dPa · s] | | 2.8 | | | 3.1 | |
| Available time of successive pressing n (Second test) | | 680 | | | 700 | |
| t [sec] (Second test) | | 90 | | | 85 | |
| Pressing time t × n (t) [sec] (Second test) | | 61200 | | | 59500 | |
| Pressing time t × n (t) [sec] (Average of ten times) | | $6.0 \times 10^4$ | | | $6.0 \times 10^4$ | |
| Glass I/II | | Optical glass I, II | | | Optical glass I, II | |

| Glass component | No. 7 | | | No. 8 | | |
|---|---|---|---|---|---|---|
| ( ): Cation component | molar % | cationic % | mass % | molar % | cationic % | mass % |
| B₂O₃ (B) | 31.18 | 40.50 | 14.52 | 32.76 | 42.50 | 15.28 |
| SiO₂ (Si) | 3.08 | 2.00 | 1.24 | 1.54 | 1.00 | 0.62 |
| GeO2(Ge) | 0.00 | 0.00 | 0.00 | 0.00 | 0.00 | 0.00 |
| Li₂O (Li) | 0.00 | 0.00 | 0.00 | 0.00 | 0.00 | 0.00 |
| ZnO (Zn) | 31.57 | 20.50 | 17.18 | 29.29 | 19.00 | 15.97 |
| La₂O₃ (La) | 13.86 | 18.00 | 30.19 | 12.91 | 16.75 | 28.18 |
| Gd₂O₃ (Gd) | 4.46 | 5.80 | 10.82 | 4.24 | 5.50 | 10.29 |
| Y₂O₃ (Y) | 0.00 | 0.00 | 0.00 | 0.00 | 0.00 | 0.00 |
| TiO₂ (Ti) | 1.54 | 1.00 | 0.82 | 3.08 | 2.00 | 1.65 |
| Nb₂O₅ (Nb) | 0.00 | 0.00 | 0.00 | 0.00 | 0.0 | 0.00 |
| WO₃ (W) | 5.39 | 3.50 | 8.36 | 7.71 | 5.00 | 11.97 |
| Bi₂O₃ (Bi) | 0.00 | 0.00 | 0.00 | 0.00 | 0.00 | 0.00 |
| ZrO₂ (Zr) | 4.46 | 2.90 | 3.68 | 4.24 | 2.75 | 3.50 |
| Ta₂O₅ (Ta) | 4.46 | 5.80 | 13.19 | 4.24 | 5.50 | 12.55 |
| Na₂O (Na) | 0.00 | 0.00 | 0.00 | 0.00 | 0.00 | 0.00 |
| K₂O (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |

TABLE 1-continued

| | | | | | | |
|---|---|---|---|---|---|---|
| Yb$_2$O$_3$ (Yb) | 0.00 | 0.00 | 0.00 | 0.00 | 0.00 | 0.00 |
| Al$_2$O$_3$ (Al) | 0.00 | 0.00 | 0.00 | 0.00 | 0.00 | 0.00 |
| Total | 100.00 | 100.00 | 100.00 | 100.00 | 100.00 | 100.00 |
| Ti + Nb + W + Bi (=X) | — | 4.50 | — | — | 7.00 | — |
| SiO$_2$/B$_2$O$_3$ | 0.10 | — | — | 0.05 | — | — |
| La$_2$O$_3$/(La$_2$O$_3$ + Gd$_2$O$_3$ + Y$_2$O$_3$) | 0.76 | — | — | 0.75 | — | — |
| La$_2$O$_3$/(La$_2$O$_3$ + Gd$_2$O$_3$) | 0.76 | — | — | 0.75 | — | — |
| ZrO$_2$ + Ta$_2$O$_5$ + TiO$_2$ + Nb$_2$O$_5$ + WO$_3$ + Bi$_2$O$_3$ | 15.85 | — | — | 19.27 | — | — |
| Ti$^{4+}$/(Zr$^{4+}$ + Ta$^{5+}$ + Ti$^{4+}$ + Nb$^{5+}$ + W$^{6+}$ + Bi$^{3+}$) | — | 0.0757576 | — | — | 0.1311475 | — |
| Refractive index nd | | 1.8814 | | | 1.88661 | |
| Abbe number νd | | 37.21 | | | 35.69 | |
| Glass transtion Temp. Tg [° C.] | | 606 | | | 599 | |
| 655-5X [° C.] | | 632.5 | | | 620 | |
| 650-5X [° C.] | | 627.5 | | | 615 | |
| 645-5X [° C.] | | 622.5 | | | 610 | |
| 640-5X [° C.] | | 617.5 | | | 605 | |
| 635-5X [° C.] | | 612.5 | | | 600 | |
| Sag temp. Ts [° C.] | | 647 | | | 640 | |
| Tp [° C.] | | 703 | | | 691 | |
| 750-5X [° C.] | | 728 | | | 715 | |
| 745-5X [° C.] | | 723 | | | 710 | |
| 740-5X [° C.] | | 718 | | | 705 | |
| 735-5X [° C.] | | 713 | | | 700 | |
| Liquidus Temp. [° C.] | | 1085 | | | 1070 | |
| Viscosity at liquidus temp [dPa · s] | | 2.7 | | | 2.5 | |
| Available time of successive pressing n | | 680 | | | 150 | |
| (Second test) | | | | | | |
| t [sec] | | 85 | | | 90 | |
| (Second test) | | | | | | |
| Pressing time t × n (t) [sec] | | 57800 | | | 13500 | |
| (Second test) | | | | | | |
| Pressing time t × n (t) [sec] | | 6.0 × 10$^4$ | | | 2.0 × 10$^4$ | |
| (Average of ten times) | | | | | | |
| Glass I/II | | Optical glass I, II | | | Optical glass I, II | |

| | No. | | | | | |
|---|---|---|---|---|---|---|
| Glass component | 9 | | | 10 | | |
| ( ): Cation component | molar % | cationic % | mass % | molar % | cationic % | mass % |
| B$_2$O$_3$ (B) | 31.26 | 41.50 | 15.14 | 34.52 | 43.75 | 15.83 |
| SiO$_2$ (Si) | 3.01 | 2.00 | 1.26 | 1.58 | 1.00 | 0.62 |
| GeO2(Ge) | 0.00 | 0.00 | 0.00 | 0.00 | 0.00 | 0.00 |
| Li$_2$O (Li) | 0.00 | 0.00 | 0.00 | 0.00 | 0.00 | 0.00 |
| ZnO (Zn) | 28.63 | 19.00 | 16.20 | 29.98 | 19.00 | 16.07 |
| La$_2$O$_3$ (La) | 11.11 | 14.75 | 25.18 | 14.60 | 18.50 | 31.32 |
| Gd$_2$O$_3$ (Gd) | 4.14 | 5.50 | 10.45 | 4.34 | 5.50 | 10.36 |
| Y$_2$O$_3$ (Y) | 0.00 | 0.00 | 0.00 | 0.00 | 0.00 | 0.00 |
| TiO$_2$ (Ti) | 6.03 | 4.00 | 3.35 | 0.00 | 0.00 | 0.00 |
| Nb$_2$O$_5$ (Nb) | 0.00 | 0.0 | 0.00 | 0.00 | 0.0 | 0.00 |
| WO$_3$ (W) | 7.53 | 5.00 | 12.15 | 6.31 | 4.00 | 9.64 |
| Bi$_2$O$_3$ (Bi) | 0.00 | 0.00 | 0.00 | 0.00 | 0.00 | 0.00 |
| ZrO$_2$ (Zr) | 4.14 | 2.75 | 3.55 | 4.34 | 2.75 | 3.52 |
| Ta$_2$O$_5$ (Ta) | 4.14 | 5.50 | 12.73 | 4.34 | 5.50 | 12.63 |
| Na$_2$O (Na) | 0.00 | 0.00 | 0.00 | 0.00 | 0.00 | 0.00 |
| K$_2$O (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| Yb$_2$O$_3$ (Yb) | 0.00 | 0.00 | 0.00 | 0.00 | 0.00 | 0.00 |
| Al$_2$O$_3$ (Al) | 0.00 | 0.00 | 0.00 | 0.00 | 0.00 | 0.00 |
| Total | 100.00 | 100.00 | 100.00 | 100.00 | 100.00 | 100.00 |
| Ti + Nb + W + Bi (=X) | — | 9.00 | — | — | 4.00 | — |
| SiO$_2$/B$_2$O$_3$ | 0.10 | — | — | 0.05 | — | — |
| La$_2$O$_3$/(La$_2$O$_3$ + Gd$_2$O$_3$ + Y$_2$O$_3$) | 0.73 | — | — | 0.77 | — | — |
| La$_2$O$_3$/(La$_2$O$_3$ + Gd$_2$O$_3$) | 0.73 | — | — | 0.77 | — | — |
| ZrO$_2$ + Ta$_2$O$_5$ + TiO$_2$ + Nb$_2$O$_5$ + WO$_3$ + Bi$_2$O$_3$ | 21.85 | — | — | 14.99 | — | — |
| Ti$^{4+}$/(Zr$^{4+}$ + Ta$^{5+}$ + Ti$^{4+}$ + Nb$^{5+}$ + W$^{6+}$ + Bi$^{3+}$) | — | 0.2318841 | — | — | 0 | — |
| Refractive index nd | | 1.89192 | | | 1.87172 | |
| Abbe number νd | | 34.13 | | | 38.27 | |
| Glass transtion Temp. Tg [° C.] | | 599 | | | 600 | |
| 655-5X [° C.] | | 610 | | | 635 | |
| 650-5X [° C.] | | 605 | | | 630 | |
| 645-5X [° C.] | | 600 | | | 625 | |
| 640-5X [° C.] | | 595 | | | 620 | |
| 635-5X [° C.] | | 590 | | | 615 | |

TABLE 1-continued

|  |  |  |
|---|---|---|
| Sag temp. Ts [° C.] | 640 | 641 |
| Tp [° C.] | 696 | 692 |
| 750-5X [° C.] | 705 | 730 |
| 745-5X [° C.] | 700 | 725 |
| 740-5X [° C.] | 695 | 720 |
| 735-5X [° C.] | 690 | 715 |
| Liquidus Temp. [° C.] | 1080 | 1060 |
| Viscosity at liquidus temp [dPa · s] | 2.5 | 3 |
| Available time of successive pressing n (Second test) | 100 | 250 |
| t [sec] (Second test) | 85 | 80 |
| Pressing time t × n (t) [sec] (Second test) | 8500 | 20000 |
| Pressing time t × n (t) [sec] (Avarage of ten times) | $1.0 \times 10^4$ | $3.0 \times 10^4$ |
| Glass I/II | Optical glass I, II | Optical glass I, II |

| Glass component | No. 11 | | | No. 12 | | |
|---|---|---|---|---|---|---|
| ( ): Cation component | molar % | cationic % | mass % | molar % | cationic % | mass % |
| $B_2O_3$ (B) | 34.71 | 44.00 | 16.26 | 30.15 | 39.50 | 13.88 |
| $SiO_2$ (Si) | 3.16 | 2.00 | 1.28 | 6.11 | 4.00 | 2.43 |
| GeO2(Ge) | 0.00 | 0.00 | 0.00 | 0.00 | 0.00 | 0.00 |
| $Li_2O$ (Li) | 0.00 | 0.00 | 0.00 | 0.00 | 0.00 | 0.00 |
| ZnO (Zn) | 29.98 | 19.00 | 16.42 | 29.01 | 19.00 | 15.60 |
| $La_2O_3$ (La) | 14.40 | 18.25 | 31.57 | 14.12 | 18.50 | 30.44 |
| $Gd_2O_3$ (Gd) | 4.34 | 5.50 | 10.59 | 4.20 | 5.50 | 10.05 |
| $Y_2O_3$ (Y) | 0.00 | 0.00 | 0.00 | 0.00 | 0.00 | 0.00 |
| $TiO_2$ (Ti) | 0.00 | 0.00 | 0.00 | 0.38 | 0.25 | 0.20 |
| $Nb_2O_5$ (Nb) | 0.00 | 0.0 | 0.00 | 0.00 | 0.0 | 0.00 |
| $WO_3$ (W) | 4.73 | 3.00 | 7.39 | 7.63 | 5.00 | 11.71 |
| $Bi_2O_3$ (Bi) | 0.00 | 0.00 | 0.00 | 0.00 | 0.00 | 0.00 |
| $ZrO_2$ (Zr) | 4.34 | 2.75 | 3.60 | 4.20 | 2.75 | 3.42 |
| $Ta_2O_5$ (Ta) | 4.34 | 5.50 | 12.90 | 4.20 | 5.50 | 12.27 |
| $Na_2O$ (Na) | 0.00 | 0.00 | 0.00 | 0.00 | 0.00 | 0.00 |
| $K_2O$ (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| $Yb_2O_3$ (Yb) | 0.00 | 0.00 | 0.00 | 0.00 | 0.00 | 0.00 |
| $Al_2O_3$ (Al) | 0.00 | 0.00 | 0.00 | 0.00 | 0.00 | 0.00 |
| Total | 100.00 | 100.00 | 100.00 | 100.00 | 100.00 | 100.00 |
| Ti + Nb + W + Bi (=X) | — | 3.00 | — | — | 5.25 | — |
| $SiO_2/B_2O_3$ | 0.09 | — | — | 0.203 | — | — |
| $La_2O_3/(La_2O_3 + Gd_2O_3 + Y_2O_3)$ | 0.77 | — | — | 0.77 | — | — |
| $La_2O_3/(La_2O_3 + Gd_2O_3)$ | 0.77 | — | — | 0.77 | — | — |
| $ZrO_2 + Ta_2O_5 + TiO_2 + Nb_2O_5 + WO_3 + Bi_2O_3$ | 13.41 | — | — | 16.41 | — | — |
| $Ti^{4+}/(Zr^{4+} + Ta^{5+} + Ti^{4+} + Nb^{5+} + W^{6+} + Bi^{3+})$ | — | 0 | — | — | 0.0185185 | — |
| Refractive index nd | | 1.86101 | | | 1.87565 | |
| Abbe number νd | | 39.32 | | | 37.34 | |
| Glass transtion Temp. Tg [° C.] | | 600 | | | 606 | |
| 655-5X [° C.] | | 640 | | | 628.75 | |
| 650-5X [° C.] | | 635 | | | 623.75 | |
| 645-5X [° C.] | | 630 | | | 618.75 | |
| 640-5X [° C.] | | 625 | | | 613.75 | |
| 635-5X [° C.] | | 620 | | | 608.75 | |
| Sag temp. Ts [° C.] | | 641 | | | 650 | |
| Tp [° C.] | | 697 | | | 705 | |
| 750-5X [° C.] | | 735 | | | 750 | |
| 745-5X [° C.] | | 730 | | | 745 | |
| 740-5X [° C.] | | 725 | | | 740 | |
| 735-5X [° C.] | | 720 | | | 735 | |
| Liquidus Temp. [° C.] | | 1070 | | | 1060 | |
| Viscosity at liquidus temp [dPa · s] | | 3 | | | 3.5 | |
| Available time of successive pressing n (Second test) | | 350 | | | 180 | |
| t [sec] (Second test) | | 85 | | | 80 | |
| Pressing time t × n (t) [sec] (Second test) | | 29750 | | | 14400 | |

TABLE 1-continued

| | | |
|---|---|---|
| Pressing time t × n (t) [sec] (Avarage of ten times) | 5.0 × 10⁴ | 1.5 × 10⁴ |
| Glass I/II | Optical glass I, II | Optical glass I |

| | No. | | | | | |
|---|---|---|---|---|---|---|
| | 13 | | | 14 | | |
| Glass component | | | | | | |
| ( ): Cation component | molar % | cationic % | mass % | molar % | cationic % | mass % |
| $B_2O_3$ (B) | 30.23 | 39.33 | 14.03 | 30.69 | 39.33 | 14.22 |
| $SiO_2$ (Si) | 8.96 | 5.83 | 3.59 | 9.09 | 5.83 | 3.64 |
| $GeO_2$ (Ge) | 0.00 | 0.00 | 0.00 | 0.00 | 0.00 | 0.00 |
| $Li_2O$ (Li) | 1.49 | 1.94 | 0.30 | 3.00 | 3.88 | 0.60 |
| ZnO (Zn) | 25.37 | 16.50 | 13.77 | 22.74 | 14.56 | 12.32 |
| $La_2O_3$ (La) | 8.96 | 11.65 | 19.47 | 9.09 | 11.65 | 19.73 |
| $Gd_2O_3$ (Gd) | 8.96 | 11.65 | 21.62 | 9.09 | 11.65 | 21.91 |
| $Y_2O_3$ (Y) | 0.00 | 0.00 | 0.00 | 0.00 | 0.00 | 0.00 |
| $TiO_2$ (Ti) | 0.37 | 0.24 | 0.20 | 0.38 | 0.24 | 0.20 |
| $Nb_2O_5$ (Nb) | 0.00 | 0.00 | 0.00 | 0.00 | 0.00 | 0.00 |
| $WO_3$ (W) | 7.46 | 4.85 | 11.55 | 7.58 | 4.85 | 11.70 |
| $Bi_2O_3$ (Bi) | 0.00 | 0.00 | 0.00 | 0.00 | 0.00 | 0.00 |
| $ZrO_2$ (Zr) | 4.10 | 2.67 | 3.37 | 4.17 | 2.67 | 3.42 |
| $Ta_2O_5$ (Ta) | 4.10 | 5.34 | 12.10 | 4.17 | 5.34 | 12.26 |
| $Na_2O$ (Na) | 0.00 | 0.00 | 0.00 | 0.00 | 0.00 | 0.00 |
| $K_2O$ (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| $Yb_2O_3$ (Yb) | 0.00 | 0.00 | 0.00 | 0.00 | 0.00 | 0.00 |
| $Al_2O_3$ (Al) | 0.00 | 0.00 | 0.00 | 0.00 | 0.00 | 0.00 |
| Total | 100.00 | 100.00 | 100.00 | 100.00 | 100.00 | 100.00 |
| Ti + Nb + W + Bi (=X) | — | 5.09 | — | — | 5.09 | — |
| $SiO_2/B_2O_3$ | 0.30 | — | — | 0.30 | — | — |
| $La_2O_3/(La_2O_3 + Gd_2O_3 + Y_2O_3)$ | 0.50 | — | — | 0.50 | — | — |
| $La_2O_3/(La_2O_3 + Gd_2O_3)$ | 0.50 | — | — | 0.50 | — | — |
| $ZrO_2 + Ta_2O_5 + TiO_2 + Nb_2O_5 + WO_3 + Bi_2O_3$ | 16.03 | — | — | 16.30 | — | — |
| $Ti^{4+}/(Zr^{4+} + Ta^{5+} + Ti^{4+} + Nb^{5+} + W^{6+} + Bi^{3+})$ | — | 0.0183206 | — | — | 0.0183206 | — |
| Refractive index nd | | 1.8593 | | | 1.85677 | |
| Abbe number νd | | 38.24 | | | 38.32 | |
| Glass transtion Temp. Tg [° C.] | | 599 | | | 589 | |
| 655-5X [° C.] | | 629.55 | | | 629.55 | |
| 650-5X [° C.] | | 624.55 | | | 624.55 | |
| 645-5X [° C.] | | 619.55 | | | 619.55 | |
| 640-5X [° C.] | | 614.55 | | | 614.55 | |
| 635-5X [° C.] | | 609.55 | | | 609.55 | |
| Sag temp. Ts [° C.] | | 643 | | | 632 | |
| Tp [° C.] | | 702 | | | 690 | |
| 750-5X [° C.] | | 750 | | | 750 | |
| 745-5X [° C.] | | 745 | | | 745 | |
| 740-5X [° C.] | | 740 | | | 740 | |
| 735-5X [° C.] | | 735 | | | 735 | |
| Liquidus Temp. [° C.] | | 1160 | | | 1160 | |
| Viscosity at liquidus temp [dPa · s] | | 2.0 | | | 2.0 | |
| Available time of successive pressing n (Second test) | | 250 | | | 300 | |
| t [sec] (Second test) | | 90 | | | 80 | |
| Pressing time t × n (t) [sec] (Second test) | | 22500 | | | 24000 | |
| Pressing time t × n (t) [sec] (Avarage of ten times) | | 2.5 × 10⁴ | | | 2.5 × 10⁴ | |
| Glass I/II | | Optical glass I | | | Optical glass I | |

| | No. | | | | | |
|---|---|---|---|---|---|---|
| | 15 | | | 16 | | |
| Glass component | | | | | | |
| ( ): Cation component | molar % | cationic % | mass % | molar % | cationic % | mass % |
| $B_2O_3$ (B) | 28.68 | 38.00 | 13.16 | 28.89 | 38.00 | 13.28 |
| $SiO_2$ (Si) | 8.30 | 5.50 | 3.29 | 8.37 | 5.50 | 3.32 |
| $GeO_2$ (Ge) | 0.00 | 0.00 | 0.00 | 0.00 | 0.00 | 0.00 |
| $Li_2O$ (Li) | 1.51 | 2.00 | 0.30 | 1.52 | 2.00 | 0.30 |
| ZnO (Zn) | 25.66 | 17.00 | 13.77 | 25.86 | 17.00 | 13.89 |
| $La_2O_3$ (La) | 8.30 | 11.00 | 17.84 | 9.89 | 13.00 | 21.27 |
| $Gd_2O_3$ (Gd) | 8.30 | 11.00 | 19.81 | 7.60 | 10.00 | 18.17 |
| $Y_2O_3$ (Y) | 0.00 | 0.00 | 0.00 | 0.00 | 0.00 | 0.00 |

TABLE 1-continued

| Glass component | | | | | | |
|---|---|---|---|---|---|---|
| TiO$_2$ (Ti) | 0.38 | 0.25 | 0.20 | 0.38 | 0.25 | 0.20 |
| Nb$_2$O$_5$ (Nb) | 0.00 | 0.00 | 0.00 | 0.00 | 0.00 | 0.00 |
| WO$_3$ (W) | 10.57 | 7.00 | 16.16 | 9.13 | 6.00 | 13.97 |
| Bi$_2$O$_3$ (Bi) | 0.00 | 0.00 | 0.00 | 0.00 | 0.00 | 0.00 |
| ZrO$_2$ (Zr) | 4.15 | 2.75 | 3.37 | 4.18 | 2.75 | 3.40 |
| Ta$_2$O$_5$ (Ta) | 4.15 | 5.50 | 12.10 | 4.18 | 5.50 | 12.20 |
| Na$_2$O (Na) | 0.00 | 0.00 | 0.00 | 0.00 | 0.00 | 0.00 |
| K$_2$O (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| Yb$_2$O$_3$ (Yb) | 0.00 | 0.00 | 0.00 | 0.00 | 0.00 | 0.00 |
| Al$_2$O$_3$ (Al) | 0.00 | 0.00 | 0.00 | 0.00 | 0.00 | 0.00 |
| Total | 100.00 | 100.00 | 100.00 | 100.00 | 100.00 | 100.00 |
| Ti + Nb + W + Bi (=X) | — | 7.25 | — | — | 6.25 | — |
| SiO$_2$/B$_2$O$_3$ | 0.29 | — | — | 0.29 | — | — |
| La$_2$O$_3$/(La$_2$O$_3$ + Gd$_2$O$_3$ + Y$_2$O$_3$) | 0.50 | — | — | 0.57 | — | — |
| La$_2$O$_3$/(La$_2$O$_3$ + Gd$_2$O$_3$) | 0.50 | — | — | 0.57 | — | — |
| ZrO$_2$ + Ta$_2$O$_5$ + TiO$_2$ + Nb$_2$O$_5$ + WO$_3$ + Bi$_2$O$_3$ | 19.25 | — | — | 17.87 | — | — |
| Ti$^{4+}$/(Zr$^{4+}$ + Ta$^{5+}$ + Ti$^{4+}$ + Nb$^{5+}$ + W$^{6+}$ + Bi$^{3+}$) | — | 0.016129 | — | — | 0.0172414 | — |
| Refractive index nd | | 1.8693 | | | 1.86943 | |
| Abbe number vd | | 36.43 | | | 36.93 | |
| Glass transtion Temp. Tg [° C.] | | 592 | | | 595 | |
| 655-5X [° C.] | | 618.75 | | | 623.75 | |
| 650-5X [° C.] | | 613.75 | | | 618.75 | |
| 645-5X [° C.] | | 608.75 | | | 613.75 | |
| 640-5X [° C.] | | 603.75 | | | 608.75 | |
| 635-5X [° C.] | | 598.75 | | | 603.75 | |
| Sag temp. Ts [° C.] | | 635 | | | 638 | |
| Tp [° C.] | | 693 | | | 696 | |
| 750-5X [° C.] | | 750 | | | 750 | |
| 745-5X [° C.] | | 745 | | | 745 | |
| 740-5X [° C.] | | 740 | | | 740 | |
| 735-5X [° C.] | | 735 | | | 735 | |
| Liquidus Temp. [° C.] | | 1170 | | | 1150 | |
| Viscosity at liquidus temp [dPa · s] | | 1.5 | | | 1.5 | |
| Available time of successive pressing n (Second test) | | 250 | | | 220 | |
| t [sec] (Second test) | | 80 | | | 85 | |
| Pressing time t × n (t) [sec] (Second test) | | 20000 | | | 18700 | |
| Pressing time t × n (t) [sec] (Avarage of ten times) | | 2.0 × 10$^4$ | | | 2.0 × 10$^4$ | |
| Glass I/II | | Optical glass I | | | Optical glass I | |

| | No. | | | | | |
|---|---|---|---|---|---|---|
| | 17 | | | 18 | | |
| Glass component | molar % | cationic % | mass % | molar % | cationic % | mass % |
| ( ): Cation component | | | | | | |
| B$_2$O$_3$ (B) | 27.80 | 36.73 | 12.67 | 32.14 | 41.23 | 14.36 |
| SiO$_2$ (Si) | 8.49 | 5.61 | 3.34 | 1.59 | 1.02 | 0.61 |
| GeO2(Ge) | 0.00 | 0.00 | 0.00 | 0.00 | 0.00 | 0.00 |
| Li$_2$O (Li) | 1.54 | 2.04 | 0.30 | 0.00 | 0.00 | 0.00 |
| ZnO (Zn) | 26.25 | 17.35 | 13.99 | 30.22 | 19.39 | 15.79 |
| La$_2$O$_3$ (La) | 10.04 | 13.27 | 21.42 | 14.99 | 19.23 | 31.37 |
| Gd$_2$O$_3$ (Gd) | 7.72 | 10.20 | 18.30 | 4.37 | 5.61 | 10.16 |
| Y$_2$O$_3$ (Y) | 0.00 | 0.00 | 0.00 | 0.00 | 0.00 | 0.00 |
| TiO$_2$ (Ti) | 0.39 | 0.26 | 0.20 | 0.00 | 0.00 | 0.00 |
| Nb$_2$O$_5$ (Nb) | 0.00 | 0.00 | 0.00 | 0.00 | 0.00 | 0.00 |
| WO$_3$ (W) | 9.27 | 6.12 | 14.07 | 7.95 | 5.10 | 11.84 |
| Bi$_2$O$_3$ (Bi) | 0.00 | 0.00 | 0.00 | 0.00 | 0.00 | 0.00 |
| ZrO$_2$ (Zr) | 4.25 | 2.81 | 3.42 | 4.37 | 2.81 | 3.46 |
| Ta$_2$O$_5$ (Ta) | 4.25 | 5.61 | 12.29 | 4.37 | 5.61 | 12.41 |
| Na$_2$O (Na) | 0.00 | 0.00 | 0.00 | 0.00 | 0.00 | 0.00 |
| K$_2$O (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| Yb$_2$O$_3$ (Yb) | 0.00 | 0.00 | 0.00 | 0.00 | 0.00 | 0.00 |
| Al$_2$O$_3$ (Al) | 0.00 | 0.00 | 0.00 | 0.00 | 0.00 | 0.00 |
| Total | 100.00 | 100.00 | 100.00 | 100.00 | 100.00 | 100.00 |
| Ti + Nb + W + Bi (=X) | — | 6.38 | — | — | 5.10 | — |
| SiO$_2$/B$_2$O$_3$ | 0.31 | — | — | 0.05 | — | — |

TABLE 1-continued

| | | | | | | |
|---|---|---|---|---|---|---|
| $La_2O_3/(La_2O_3 + Gd_2O_3 + Y_2O_3)$ | 0.57 | — | — | 0.77 | — | — |
| $La_2O_3/(La_2O_3 + Gd_2O_3)$ | 0.57 | — | — | 0.77 | — | — |
| $ZrO_2 + Ta_2O_5 + TiO_2 + Nb_2O_5 + WO_3 + Bi_2O_3$ | 18.16 | — | — | 16.69 | — | — |
| $Ti^{4+}/(Zr^{4+} + Ta^{5+} + Ti^{4+} + Nb^{5+} + W^{6+} + Bi^{3+})$ | — | 0.0175676 | — | — | 0 | — |
| Refractive index nd | | 1.87483 | | | 1.88658 | |
| Abbe number νd | | 36.6 | | | 36.86 | |
| Glass transtion Temp. Tg [° C.] | | 597 | | | 602 | |
| 655-5X [° C.] | | 623.1 | | | 629.5 | |
| 650-5X [° C.] | | 618.1 | | | 625 | |
| 645-5X [° C.] | | 613.1 | | | 620 | |
| 640-5X [° C.] | | 608.1 | | | 615 | |
| 635-5X [° C.] | | 603.1 | | | 610 | |
| Sag temp. Ts [° C.] | | 640 | | | 643 | |
| Tp [° C.] | | 698 | | | 690 | |
| 750-5X [° C.] | | 750 | | | 750 | |
| 745-5X [° C.] | | 745 | | | 745 | |
| 740-5X [° C.] | | 740 | | | 740 | |
| 735-5X [° C.] | | 735 | | | 735 | |
| Liquidus Temp. [° C.] | | 1210 | | | 1080 | |
| Viscosity at liquidus temp [dPa · s] | | 1.0 | | | 2.0 | |
| Available time of successive pressing n (Second test) | | 170 | | | 600 | |
| t [sec] (Second test) | | 90 | | | 90 | |
| Pressing time t × n (t) [sec] (Second test) | | 15300 | | | 54000 | |
| Pressing time t × n (t) [sec] (Avarage of ten times) | | $1.5 \times 10^4$ | | | $5.5 \times 10^4$ | |
| Glass I/II | | Optical glass I | | | Optical glass I, II | |

| | No. | | | | | |
|---|---|---|---|---|---|---|
| | 19 | | | 20 | | |
| Glass component ( ): Cation component | molar % | cationic % | mass % | molar % | cationic % | mass % |
| $B_2O_3$ (B) | 30.52 | 39.31 | 13.72 | 32.75 | 42.50 | 15.26 |
| $SiO_2$ (Si) | 1.56 | 1.00 | 0.60 | 1.54 | 1.00 | 0.62 |
| $GeO2$ (Ge) | 3.11 | 2.00 | 2.10 | 0.00 | 0.00 | 0.00 |
| $Li_2O$ (Li) | 0.00 | 0.00 | 0.00 | 0.00 | 0.00 | 0.00 |
| ZnO (Zn) | 29.57 | 19.04 | 15.53 | 29.29 | 19.00 | 15.97 |
| $La_2O_3$ (La) | 14.64 | 18.85 | 30.78 | 12.91 | 16.75 | 28.19 |
| $Gd_2O_3$ (Gd) | 4.28 | 5.51 | 10.01 | 4.24 | 5.50 | 10.28 |
| $Y_2O_3$ (Y) | 0.00 | 0.00 | 0.00 | 0.00 | 0.00 | 0.00 |
| $TiO_2$ (Ti) | 0.00 | 0.00 | 0.00 | 3.08 | 2.00 | 1.65 |
| $Nb_2O_5$ (Nb) | 0.00 | 0.00 | 0.00 | 0.00 | 0.00 | 0.00 |
| $WO_3$ (W) | 7.78 | 5.01 | 11.64 | 7.71 | 5.00 | 11.98 |
| $Bi_2O_3$ (Bi) | 0.00 | 0.00 | 0.00 | 0.00 | 0.00 | 0.00 |
| $ZrO_2$ (Zr) | 4.28 | 2.76 | 3.40 | 4.24 | 2.75 | 3.50 |
| $Ta_2O_5$ (Ta) | 4.28 | 5.51 | 12.21 | 4.24 | 5.50 | 12.55 |
| $Na_2O$ (Na) | 0.00 | 0.00 | 0.00 | 0.00 | 0.00 | 0.00 |
| $K_2O$ (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| $Yb_2O_3$ (Yb) | 0.00 | 0.00 | 0.00 | 0.00 | 0.00 | 0.00 |
| $Al_2O_3$ (Al) | 0.00 | 0.00 | 0.00 | 0.00 | 0.00 | 0.00 |
| Total | 100.00 | 99.00 | 100.00 | 100.00 | 100.00 | 100.00 |
| Ti + Nb + W + Bi (=X) | — | 5.01 | — | — | 7.00 | — |
| $SiO_2/B_2O_3$ | 0.05 | — | — | 0.05 | — | — |
| $La_2O_3/(La_2O_3 + Gd_2O_3 + Y_2O_3)$ | 0.77 | — | — | 0.75 | — | — |
| $La_2O_3/(La_2O_3 + Gd_2O_3)$ | 0.77 | — | — | 0.75 | — | — |
| $ZrO_2 + Ta_2O_5 + TiO_2 + Nb_2O_5 + WO_3 + Bi_2O_3$ | 16.34 | — | — | 19.27 | — | — |
| $Ti^{4+}/(Zr^{4+} + Ta^{5+} + Ti^{4+} + Nb^{5+} + W^{6+} + Bi^{3+})$ | — | 0 | — | — | 0.1311475 | — |
| Refractive index nd | | 1.88508 | | | 1.88661 | |
| Abbe number νd | | 36.92 | | | 35.69 | |
| Glass transtion Temp. Tg [° C.] | | 602 | | | 602 | |
| 655-5X [° C.] | | 629.9 | | | 620 | |
| 650-5X [° C.] | | 625 | | | 615 | |
| 645-5X [° C.] | | 620 | | | 610 | |
| 640-5X [° C.] | | 615 | | | 605 | |
| 635-5X [° C.] | | 610 | | | 600 | |
| Sag temp. Ts [° C.] | | 640 | | | 644 | |
| Tp [° C.] | | 693 | | | 690 | |
| 750-5X [° C.] | | 750 | | | 750 | |
| 745-5X [° C.] | | 745 | | | 745 | |
| 740-5X [° C.] | | 740 | | | 740 | |
| 735-5X [° C.] | | 735 | | | 735 | |

TABLE 1-continued

| | | |
|---|---|---|
| Liquidus Temp. [° C.] | 1110 | 1070 |
| Viscosity at liquidus temp [dPa · s] | 1.5 | 2.5 |
| Available time of successive pressing n (Second test) | 400 | 300 |
| t [sec] (Second test) | 85 | 85 |
| Pressing time t × n (t) [sec] (Second test) | 34000 | 25500 |
| Pressing time t × n (t) [sec] (Avarage of ten times) | $3.5 \times 10^4$ | $2.0 \times 10^4$ |
| Glass I/II | Optical glass I, II | Optical glass I, II |

| | No. | | | | | |
|---|---|---|---|---|---|---|
| | 21 | | | 22 | | |
| Glass component | | | | | | |
| ( ): Cation component | molar % | cationic % | mass % | molar % | cationic % | mass % |
| $B_2O_3$ (B) | 31.27 | 41.50 | 15.14 | 34.51 | 43.75 | 15.83 |
| $SiO_2$ (Si) | 3.01 | 2.00 | 1.26 | 1.58 | 1.00 | 0.62 |
| $GeO_2$ (Ge) | 0.00 | 0.00 | 0.00 | 0.00 | 0.00 | 0.00 |
| $Li_2O$ (Li) | 0.00 | 0.00 | 0.00 | 0.00 | 0.00 | 0.00 |
| ZnO (Zn) | 28.63 | 19.00 | 16.20 | 29.98 | 19.00 | 16.07 |
| $La_2O_3$ (La) | 11.11 | 14.75 | 25.19 | 14.60 | 18.50 | 31.34 |
| $Gd_2O_3$ (Gd) | 4.14 | 5.50 | 10.43 | 4.34 | 5.50 | 10.35 |
| $Y_2O_3$ (Y) | 0.00 | 0.00 | 0.00 | 0.00 | 0.00 | 0.00 |
| $TiO_2$ (Ti) | 6.03 | 4.00 | 3.35 | 0.00 | 0.00 | 0.00 |
| $Nb_2O_5$ (Nb) | 0.00 | 0.00 | 0.00 | 0.00 | 0.00 | 0.00 |
| $WO_3$ (W) | 7.53 | 5.00 | 12.15 | 6.31 | 4.00 | 9.64 |
| $Bi_2O_3$ (Bi) | 0.00 | 0.00 | 0.00 | 0.00 | 0.00 | 0.00 |
| $ZrO_2$ (Zr) | 4.14 | 2.75 | 3.55 | 4.34 | 2.75 | 3.52 |
| $Ta_2O_5$ (Ta) | 4.14 | 5.50 | 12.73 | 4.34 | 5.50 | 12.63 |
| $Na_2O$ (Na) | 0.00 | 0.00 | 0.00 | 0.00 | 0.00 | 0.00 |
| $K_2O$ (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 000 | 0.00 | 0.00 | 0.00 | 0.00 | 0.00 |
| BaO (Ba) | 0.00 | 0.00 | 0.00 | 0.00 | 0.00 | 0.00 |
| $Yb_2O_3$ (Yb) | 0.00 | 0.00 | 0.00 | 0.00 | 0.00 | 0.00 |
| $Al_2O_3$ (Al) | 0.00 | 0.00 | 0.00 | 0.00 | 0.00 | 0.00 |
| Total | 100.00 | 100.0 | 100.0 | 100.0 | 100.00 | 100.0 |
| Ti + Nb + W + Bi (=X) | — | 9.00 | — | — | 4.00 | — |
| $SiO_2/B_2O_3$ | 0.10 | — | — | 0.05 | — | — |
| $La_2O_3/(La_2O_3 + Gd_2O_3 + Y_2O_3)$ | 0.73 | — | — | 0.77 | — | — |
| $La_2O_3/(La_2O_3 + Gd_2O_3)$ | 0.73 | — | — | 0.77 | — | — |
| $ZrO_2 + Ta_2O_5 + TiO_2 + Nb_2O_5 + WO_3 + Bi_2O_3$ | 21.84 | — | — | 14.99 | — | — |
| $Ti^{4+}/(Zr^{4+} + Ta^{5+} + Ti^{4+} + Nb^{5+} + W^{6+} + Bi^{3+})$ | — | 0.2318841 | — | — | 0 | — |
| Refractive index nd | | 1.89192 | | | 1.87172 | |
| Abbe number νd | | 34.13 | | | 38.27 | |
| Glass transtion Temp. Tg [° C.] | | 599 | | | 600 | |
| 655-5X [° C.] | | 610 | | | 635 | |
| 650-5X [° C.] | | 605 | | | 630 | |
| 645-5X [° C.] | | 600 | | | 625 | |
| 640-5X [° C.] | | 595 | | | 620 | |
| 635-5X [° C.] | | 590 | | | 615 | |
| Sag temp. Ts [° C.] | | 642 | | | 642 | |
| Tp [° C.] | | 691 | | | 689 | |
| 750-5X [° C.] | | 750 | | | 750 | |
| 745-5X [° C.] | | 745 | | | 745 | |
| 740-5X [° C.] | | 740 | | | 740 | |
| 735-5X [° C.] | | 735 | | | 735 | |
| Liquidus Temp. [° C.] | | 1080 | | | 1060 | |
| Viscosity at liquidus temp [dPa · s] | | 2.0 | | | 3.0 | |
| Available time of successive pressing n (Second test) | | 200 | | | 350 | |
| t [sec] (Second test) | | 85 | | | 90 | |
| Pressing time t × n (t) [sec] (Second test) | | 17000 | | | 31500 | |
| Pressing time t × n (t) [sec] (Avarage of ten times) | | $1.0 \times 10^4$ | | | $3.0 \times 10^4$ | |
| Glass I/II | | Optical glass I, II | | | Optical glass I, II | |

TABLE 1-continued

| Glass component | No. 23 | | | No. 24 | | |
|---|---|---|---|---|---|---|
| ( ): Cation component | molar % | cationic % | mass % | molar % | cationic % | mass % |
| $B_2O_3$ (B) | 34.71 | 44.00 | 16.25 | 31.50 | 41.50 | 15.19 |
| $SiO_2$ (Si) | 3.16 | 2.00 | 1.28 | 3.04 | 2.00 | 1.26 |
| $GeO_2$ (Ge) | 0.00 | 0.00 | 0.00 | 0.00 | 0.00 | 0.00 |
| $Li_2O$ (Li) | 0.00 | 0.00 | 0.00 | 0.76 | 1.00 | 0.16 |
| ZnO (Zn) | 29.98 | 19.00 | 16.42 | 26.57 | 17.50 | 14.97 |
| $La_2O_3$ (La) | 14.40 | 18.25 | 31.58 | 11.20 | 14.75 | 25.27 |
| $Gd_2O_3$ (Gd) | 4.34 | 5.50 | 10.57 | 4.17 | 5.50 | 10.46 |
| $Y_2O_3$ (Y) | 0.00 | 0.00 | 0.00 | 0.00 | 0.00 | 0.00 |
| $TiO_2$ (Ti) | 0.00 | 0.00 | 0.00 | 6.07 | 4.00 | 3.36 |
| $Nb_2O_5$ (Nb) | 0.00 | 0.00 | 0.00 | 0.00 | 0.00 | 0.00 |
| $WO_3$ (W) | 4.73 | 3.00 | 7.39 | 7.59 | 5.00 | 12.19 |
| $Bi_2O_3$ (Bi) | 0.00 | 0.00 | 0.00 | 0.00 | 0.00 | 0.00 |
| $ZrO_2$ (Zr) | 4.34 | 2.75 | 3.60 | 4.17 | 2.75 | 3.56 |
| $Ta_2O_5$ (Ta) | 4.34 | 5.50 | 12.91 | 4.17 | 5.50 | 12.78 |
| $Na_2O$ (Na) | 0.00 | 0.00 | 0.00 | 0.00 | 0.00 | 0.00 |
| $K_2O$ (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.76 | 0.50 | 0.80 |
| $Yb_2O_3$ (Yb) | 0.00 | 0.00 | 0.00 | 0.00 | 0.00 | 0.00 |
| $Al_2O_3$ (Al) | 0.00 | 0.00 | 0.00 | 0.00 | 0.00 | 0.00 |
| Total | 100.00 | 100.00 | 100.00 | 100.00 | 100.00 | 100.00 |
| Ti + Nb + W + Bi (=X) | — | 3.00 | — | — | 9.00 | — |
| $SiO_2/B_2O_3$ | 0.09 | — | — | 0.097 | — | — |
| $La_2O_3/(La_2O_3 + Gd_2O_3 + Y_2O_3)$ | 0.77 | — | — | 0.73 | — | — |
| $La_2O_3/(La_2O_3 + Gd_2O_3)$ | 0.77 | — | — | 0.73 | — | — |
| $ZrO_2 + Ta_2O_5 + TiO_2 + Nb_2O_5 + WO_3 + Bi_2O_3$ | 13.41 | — | — | 22.00 | — | — |
| $Ti^{4+}/(Zr^{4+} + Ta^{5+} + Ti^{4+} + Nb^{5+} + W^{6+} + Bi^{3+})$ | — | 0 | — | — | 0.2318841 | — |
| Refractive index nd | | 1.86101 | | | 1.88986 | |
| Abbe number νd | | 39.32 | | | 34.21 | |
| Glass transtion Temp. Tg [° C.] | | 606 | | | 597 | |
| 655-5X [° C.] | | 640 | | | 610 | |
| 650-5X [° C.] | | 635 | | | 605 | |
| 645-5X [° C.] | | 630 | | | 600 | |
| 640-5X [° C.] | | 625 | | | 595 | |
| 635-5X [° C.] | | 620 | | | 590 | |
| Sag temp. Ts [° C.] | | 649 | | | 639 | |
| Tp [° C.] | | 699 | | | 687 | |
| 750-5X [° C.] | | 750 | | | 750 | |
| 745-5X [° C.] | | 745 | | | 745 | |
| 740-5X [° C.] | | 740 | | | 740 | |
| 735-5X [° C.] | | 735 | | | 735 | |
| Liquidus Temp. [° C.] | | 1070 | | | 1120 | |
| Viscosity at liquidus temp [dPa · s] | | 2.5 | | | 2.0 | |
| Available time of successive pressing n (Second test) | | 400 | | | 200 | |
| t [sec] (Second test) | | 85 | | | 85 | |
| Pressing time t × n (t) [sec] (Second test) | | 34000 | | | 17000 | |
| Pressing time t × n (t) [sec] (Avarage of ten times) | | $5.0 \times 10^4$ | | | $1.5 \times 10^4$ | |
| Glass I/II | | Optical glass I, II | | | Optical glass I, II | |

| Glass component | No. 25 | | | No. 26 | | |
|---|---|---|---|---|---|---|
| ( ): Cation component | molar % | cationic % | mass % | molar % | cationic % | mass % |
| $B_2O_3$ (B) | 31.67 | 41.50 | 15.38 | 26.68 | 36.00 | 11.91 |
| $SiO_2$ (Si) | 3.44 | 2.25 | 1.44 | 2.96 | 2.00 | 1.14 |
| $GeO_2$ (Ge) | 0.00 | 0.00 | 0.00 | 0.00 | 0.00 | 0.00 |
| $Li_2O$ (Li) | 1.53 | 2.00 | 0.32 | 0.00 | 0.00 | 0.00 |
| ZnO (Zn) | 25.95 | 17.00 | 14.74 | 34.08 | 23.00 | 17.78 |
| $La_2O_3$ (La) | 11.07 | 14.50 | 25.18 | 12.59 | 17.00 | 26.31 |
| $Gd_2O_3$ (Gd) | 4.20 | 5.50 | 10.61 | 4.44 | 6.00 | 10.31 |
| $Y_2O_3$ (Y) | 0.00 | 0.00 | 0.00 | 0.00 | 0.00 | 0.00 |
| $TiO_2$ (Ti) | 6.11 | 4.00 | 3.41 | 0.00 | 0.00 | 0.00 |
| $Nb_2O_5$ (Nb) | 0.00 | 0.00 | 0.00 | 0.00 | 0.00 | 0.00 |
| $WO_3$ (W) | 7.63 | 5.00 | 12.36 | 11.85 | 8.00 | 17.62 |
| $Bi_2O_3$ (Bi) | 0.00 | 0.00 | 0.00 | 0.00 | 0.00 | 0.00 |

TABLE 1-continued

| | | | | | | |
|---|---|---|---|---|---|---|
| $ZrO_2$ (Zr) | 4.20 | 2.75 | 3.61 | 2.96 | 2.00 | 2.34 |
| $Ta_2O_5$ (Ta) | 4.20 | 5.50 | 12.95 | 4.44 | 6.00 | 12.59 |
| $Na_2O$ (Na) | 0.00 | 0.00 | 0.00 | 0.00 | 0.00 | 0.00 |
| $K_2O$ (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| $Yb_2O_3$ (Yb) | 0.00 | 0.00 | 0.00 | 0.00 | 0.00 | 0.00 |
| $Al_2O_3$ (Al) | 0.00 | 0.00 | 0.00 | 0.00 | 0.00 | 0.00 |
| Total | 100.00 | 100.00 | 100.00 | 100.00 | 100.00 | 100.00 |
| Ti + Nb + W + Bi (=X) | — | 9.00 | — | — | 8.00 | — |
| $SiO_2/B_2O_3$ | 0.11 | — | — | 0.11 | — | — |
| $La_2O_3/(La_2O_3 + Gd_2O_3 + Y_2O_3)$ | 0.72 | — | — | 0.74 | — | — |
| $La_2O_3/(La_2O_3 + Gd_2O_3)$ | 0.72 | — | — | 0.74 | — | — |
| $ZrO_2 + Ta_2O_5 + TiO_2 + Nb_2O_5 + WO_3 + Bi_2O_3$ | 22.14 | — | — | 19.25 | — | — |
| $Ti^{4+}/(Zr^{4+} + Ta^{5+} + Ti^{4+} + Nb^{5+} + W^{6+} + Bi^{3+})$ | — | 0.2318841 | — | — | 0 | — |
| Refractive index nd | | 1.88776 | | | 1.90148 | |
| Abbe number vd | | 34.25 | | | 34.73 | |
| Glass transtion Temp. Tg [° C.] | | 584 | | | 589 | |
| 655-5X [° C.] | | 610 | | | 615 | |
| 650-5X [° C.] | | 605 | | | 610 | |
| 645-5X [° C.] | | 600 | | | 605 | |
| 640-5X [° C.] | | 595 | | | 600 | |
| 635-5X [° C.] | | 590 | | | 595 | |
| Sag temp. Ts [° C.] | | 625 | | | 630 | |
| Tp [° C.] | | 674 | | | 678 | |
| 750-5X [° C.] | | 750 | | | 750 | |
| 745-5X [° C.] | | 745 | | | 745 | |
| 740-5X [° C.] | | 740 | | | 740 | |
| 735-5X [° C.] | | 735 | | | 735 | |
| Liquidus Temp. [° C.] | | 1130 | | | 1100 | |
| Viscosity at liquidus temp [dPa · s] | | 1.5 | | | 2.0 | |
| Available time of successive pressing n (Second test) | | 250 | | | 220 | |
| t [sec] (Second test) | | 85 | | | 80 | |
| Pressing time t × n (t) [sec] (Second test) | | 21250 | | | 17600 | |
| Pressing time t × n (t) [sec] (Avarage of ten times) | | $2.0 \times 10^4$ | | | $2.0 \times 10^4$ | |
| Glass I/II | | Optical glass I, II | | | Optical glass I, II | |

| | No. | | | | | |
|---|---|---|---|---|---|---|
| | 27 | | | 28 | | |
| Glass component ( ): Cation component | molar % | cationic % | mass % | molar % | cationic % | mass % |
| $B_2O_3$ (B) | 29.32 | 38.60 | 13.09 | 31.01 | 40.00 | 14.26 |
| $SiO_2$ (Si) | 2.30 | 1.51 | 0.89 | 4.65 | 3.00 | 1.85 |
| GeO2 (Ge) | 0.00 | 0.00 | 0.00 | 0.00 | 0.00 | 0.00 |
| $Li_2O$ (Li) | 0.00 | 0.00 | 0.00 | 0.00 | 0.00 | 0.00 |
| ZnO (Zn) | 32.20 | 21.20 | 16.82 | 28.68 | 18.50 | 15.44 |
| $La_2O_3$ (La) | 13.75 | 18.11 | 28.76 | 15.50 | 20.00 | 33.42 |
| $Gd_2O_3$ (Gd) | 4.41 | 5.81 | 10.24 | 3.88 | 5.00 | 9.28 |
| $Y_2O_3$ (Y) | 0.00 | 0.00 | 0.00 | 0.00 | 0.00 | 0.00 |
| $TiO_2$ (Ti) | 0.00 | 0.00 | 0.00 | 2.33 | 1.50 | 1.23 |
| $Nb_2O_5$ (Nb) | 0.00 | 0.00 | 0.00 | 0.00 | 0.00 | 0.00 |
| $WO_3$ (W) | 9.96 | 6.56 | 14.82 | 4.65 | 3.00 | 7.14 |
| $Bi_2O_3$ (Bi) | 0.00 | 0.00 | 0.00 | 0.00 | 0.00 | 0.00 |
| $ZrO_2$ (Zr) | 3.65 | 2.40 | 2.88 | 4.65 | 3.00 | 3.79 |
| $Ta_2O_5$ (Ta) | 4.41 | 5.81 | 12.50 | 4.65 | 6.00 | 13.59 |
| $Na_2O$ (Na) | 0.00 | 0.00 | 0.00 | 0.00 | 0.00 | 0.00 |
| $K_2O$ (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| $Yb_2O_3$ (Yb) | 0.00 | 0.00 | 0.00 | 0.00 | 0.00 | 0.00 |
| $Al_2O_3$ (Al) | 0.00 | 0.00 | 0.00 | 0.00 | 0.00 | 0.00 |
| Total | 100.00 | 100.00 | 100.00 | 100.00 | 100.00 | 100.00 |
| Ti + Nb + W + Bi (=X) | — | 6.56 | — | — | 4.50 | — |
| $SiO_2/B_2O_3$ | 0.08 | — | — | 0.150 | — | — |
| $La_2O_3/(La_2O_3 + Gd_2O_3 + Y_2O_3)$ | 0.76 | — | — | 0.80 | — | — |
| $La_2O_3/(La_2O_3 + Gd_2O_3)$ | 0.76 | — | — | 0.80 | — | — |
| $ZrO_2 + Ta_2O_5 + TiO_2 + Nb_2O_5 + WO_3 + Bi_2O_3$ | 18.02 | — | — | 16.28 | — | — |
| $Ti^{4+}/(Zr^{4+} + Ta^{5+} + Ti^{4+} + Nb^{5+} + W^{6+} + Bi^{3+})$ | — | 0 | — | — | 0.1111111 | — |

TABLE 1-continued

| | | |
|---|---|---|
| Refractive index nd | 1.89294 | 1.88311 |
| Abbe number νd | 35.78 | 37.4 |
| Glass transtion Temp. Tg [° C.] | 596 | 607 |
| 655-5X [° C.] | 622.5 | 632.5 |
| 650-5X [° C.] | 617.2 | 627.5 |
| 645-5X [° C.] | 612.2 | 622.5 |
| 640-5X [° C.] | 607.2 | 617.5 |
| 635-5X [° C.] | 602.2 | 612.5 |
| Sag temp. Ts [° C.] | 638 | 650 |
| Tp [° C.] | 684 | 702 |
| 750-5X [° C.] | 750 | 750 |
| 745-5X [° C.] | 745 | 745 |
| 740-5X [° C.] | 740 | 740 |
| 735-5X [° C.] | 735 | 735 |
| Liquidus Temp. [° C.] | 1090 | 1120 |
| Viscosity at liquidus temp [dPa · s] | 2.0 | 2.0 |
| Available time of successive pressing n (Second test) | 200 | 150 |
| t [sec] (Second test) | 100 | 80 |
| Pressing time t × n (t) [sec] (Second test) | 20000 | 12000 |
| Pressing time t × n (t) [sec] (Avarage of ten times) | 2.0 ×10$^4$ | 1.0 ×10$^4$ |
| Glass I/II | Optical glass I, II | Optical glass I, II |

| | No. | | | | | |
|---|---|---|---|---|---|---|
| Glass component | 29 | | | 30 | | |
| ( ): Cation component | molar % | cationic % | mass % | molar % | cationic % | mass % |
| $B_2O_3$ (B) | 29.12 | 38.00 | 13.32 | 29.27 | 38.00 | 13.29 |
| $SiO_2$ (Si) | 7.66 | 5.00 | 3.03 | 7.71 | 5.00 | 3.02 |
| $GeO_2$ (Ge) | 0.00 | 0.00 | 0.00 | 0.00 | 0.00 | 0.00 |
| $Li_2O$ (Li) | 0.00 | 0.00 | 0.00 | 0.00 | 0.00 | 0.00 |
| ZnO (Zn) | 26.82 | 17.50 | 14.36 | 26.98 | 17.50 | 14.32 |
| $La_2O_3$ (La) | 15.71 | 20.50 | 33.68 | 16.19 | 21.00 | 34.40 |
| $Gd_2O_3$ (Gd) | 3.83 | 5.00 | 9.12 | 3.85 | 5.00 | 9.10 |
| $Y_2O_3$ (Y) | 0.00 | 0.00 | 0.00 | 0.00 | 0.00 | 0.00 |
| $TiO_2$ (Ti) | 2.30 | 1.50 | 1.21 | 1.93 | 1.25 | 1.00 |
| $Nb_2O_5$ (Nb) | 0.00 | 0.00 | 0.00 | 0.00 | 0.00 | 0.00 |
| $WO_3$ (W) | 5.36 | 3.50 | 8.18 | 5.01 | 3.25 | 7.58 |
| $Bi_2O_3$ (Bi) | 0.00 | 0.00 | 0.00 | 0.00 | 0.00 | 0.00 |
| $ZrO_2$ (Zr) | 4.60 | 3.00 | 3.73 | 4.24 | 2.75 | 3.41 |
| $Ta_2O_5$ (Ta) | 4.60 | 6.00 | 13.37 | 4.82 | 6.25 | 13.88 |
| $Na_2O$ (Na) | 0.00 | 0.00 | 0.00 | 0.00 | 0.00 | 0.00 |
| $K_2O$ (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| $Yb_2O_3$ (Yb) | 0.00 | 0.00 | 0.00 | 0.00 | 0.00 | 0.00 |
| $Al_2O_3$ (Al) | 0.00 | 0.00 | 0.00 | 0.00 | 0.00 | 0.00 |
| Total | 100.00 | 100.00 | 100.00 | 100.00 | 100.00 | 100.00 |
| Ti + Nb + W + Bi (=X) | — | 5.00 | — | — | 4.50 | — |
| $SiO_2/B_2O_3$ | 0.26 | — | — | 0.26 | — | — |
| $La_2O_3/(La_2O_3 + Gd_2O_3 + Y_2O_3)$ | 0.80 | — | — | 0.81 | — | — |
| $La_2O_3/(La_2O_3 + Gd_2O_3)$ | 0.80 | — | — | 0.81 | — | — |
| $ZrO_2 + Ta_2O_5 + TiO_2 + Nb_2O_5 + WO_3 + Bi_2O_3$ | 16.86 | — | — | 16.00 | — | — |
| $Ti^{4+}/(Zr^{4+} + Ta^{5+} + Ti^{4+} + Nb^{5+} + W^{6+} + Bi^{3+})$ | — | 0.1071429 | — | — | 0.0925926 | — |
| Refractive index nd | 1.88492 | | | 1.88169 | | |
| Abbe number νd | 37.09 | | | 37.55 | | |
| Glass transtion Temp. Tg [° C.] | 621 | | | 620 | | |
| 655-5X [° C.] | 630 | | | 632.5 | | |
| 650-5X [° C.] | 625 | | | 627.5 | | |
| 645-5X [° C.] | 620 | | | 622.5 | | |
| 640-5X [° C.] | 615 | | | 617.5 | | |
| 635-5X [° C.] | 610 | | | 612.5 | | |
| Sag temp. Ts [° C.] | 665 | | | 664 | | |
| Tp [° C.] | 723 | | | 722 | | |
| 750-5X [° C.] | 750 | | | 750 | | |
| 745-5X [° C.] | 745 | | | 745 | | |
| 740-5X [° C.] | 740 | | | 740 | | |
| 735-5X [° C.] | 735 | | | 735 | | |
| Liquidus Temp. [° C.] | 1120 | | | 1120 | | |
| Viscosity at liquidus temp [dPa · s] | 2.0 | | | 2.0 | | |
| Available time of successive pressing n (Second test) | 100 | | | 120 | | |

TABLE 1-continued

| | | |
|---|---|---|
| t [sec] (Second test) | 80 | 80 |
| Pressing time t × n (t) [sec] (Second test) | 8000 | 9600 |
| Pressing time t × n (t) [sec] (Avarage of ten times) | $1.0 \times 10^4$ | $1.0 \times 10^4$ |
| Glass I/II | Optical glass I | Optical glass I |

| | No. | | | | | |
|---|---|---|---|---|---|---|
| | 31 | | | 32 | | |
| Glass component | | | | | | |
| ( ): Cation component | molar % | cationic % | mass % | molar % | cationic % | mass % |
| $B_2O_3$ (B) | 26.41 | 35.00 | 12.14 | 29.08 | 38.00 | 13.61 |
| $SiO_2$ (Si) | 10.57 | 7.00 | 4.20 | 7.65 | 5.00 | 3.09 |
| $GeO_2$ (Ge) | 0.00 | 0.00 | 0.00 | 0.00 | 0.00 | 0.00 |
| $Li_2O$ (Li) | 0.00 | 0.00 | 0.00 | 0.00 | 0.00 | 0.00 |
| ZnO (Zn) | 27.17 | 18.00 | 14.61 | 27.55 | 18.00 | 15.07 |
| $La_2O_3$ (La) | 15.09 | 20.00 | 32.51 | 15.31 | 20.00 | 33.54 |
| $Gd_2O_3$ (Gd) | 4.53 | 6.00 | 10.83 | 4.59 | 6.00 | 11.17 |
| $Y_2O_3$ (Y) | 0.00 | 0.00 | 0.00 | 0.00 | 0.00 | 0.00 |
| $TiO_2$ (Ti) | 2.26 | 1.50 | 1.20 | 3.83 | 2.50 | 2.05 |
| $Nb_2O_5$ (Nb) | 0.38 | 0.50 | 0.66 | 0.00 | 0.00 | 0.00 |
| $WO_3$ (W) | 4.53 | 3.00 | 6.94 | 3.83 | 2.50 | 5.97 |
| $Bi_2O_3$ (Bi) | 0.00 | 0.00 | 0.00 | 0.00 | 0.00 | 0.00 |
| $ZrO_2$ (Zr) | 4.53 | 3.00 | 3.69 | 4.08 | 2.67 | 3.38 |
| $Ta_2O_5$ (Ta) | 4.53 | 6.00 | 13.22 | 4.08 | 5.33 | 12.12 |
| $Na_2O$ (Na) | 0.00 | 0.00 | 0.00 | 0.00 | 0.00 | 0.00 |
| $K_2O$ (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| $Yb_2O_3$ (Yb) | 0.00 | 0.00 | 0.00 | 0.00 | 0.00 | 0.00 |
| $Al_2O_3$ (Al) | 0.00 | 0.00 | 0.00 | 0.00 | 0.00 | 0.00 |
| Total | 100.00 | 100.00 | 100.00 | 100.00 | 100.00 | 100.00 |
| Ti + Nb + W + Bi (=X) | — | 5.00 | — | — | 5.00 | — |
| $SiO_2/B_2O_3$ | 0.40 | — | — | 0.26 | — | — |
| $La_2O_3/(La_2O_3 + Gd_2O_3 + Y_2O_3)$ | 0.77 | — | — | 0.77 | — | — |
| $La_2O_3/(La_2O_3 + Gd_2O_3)$ | 0.77 | — | — | 0.77 | — | — |
| $ZrO_2 + Ta_2O_5 + TiO_2 + Nb_2O_5 + WO_3 + Bi_2O_3$ | 16.23 | — | — | 15.82 | — | — |
| $Ti^{4+}/(Zr^{4+} + Ta^{5+} + Ti^{4+} + Nb^{5+} + W^{5+} + Bi^{3+})$ | — | 0.1071429 | — | — | 0.1923077 | — |
| Refractive index nd | | 1.88384 | | | 1.88117 | |
| Abbe number νd | | 37.25 | | | 37.4 | |
| Glass transtion Temp. Tg [° C.] | | 625 | | | 616 | |
| 655-5X [° C.] | | 630 | | | 630 | |
| 650-5X [° C.] | | 625 | | | 625 | |
| 645-5X [° C.] | | 620 | | | 620 | |
| 640-5X [° C.] | | 615 | | | 615 | |
| 635-5X [° C.] | | 610 | | | 610 | |
| Sag temp. Ts [° C.] | | 672 | | | 663 | |
| Tp [° C.] | | 764 | | | 718 | |
| 750-5X [° C.] | | 750 | | | 750 | |
| 745-5X [° C.] | | 745 | | | 745 | |
| 740-5X [° C.] | | 740 | | | 740 | |
| 735-5X [° C.] | | 735 | | | 735 | |
| Liquidus Temp. [° C.] | | 1130 | | | 1100 | |
| Viscosity at liquidus temp [dPa · s] | | 2.5 | | | 2.5 | |
| Available time of successive pressing n (Second test) | | 90 | | | 160 | |
| t [sec] (Second test) | | 80 | | | 80 | |
| Pressing time t × n (t) [sec] (Second test) | | 7200 | | | 12800 | |
| Pressing time t × n (t) [sec] (Average of ten times) | | $5.0 \times 10^3$ | | | $1.5 \times 10^4$ | |
| Glass I/II | | Optical glass I | | | Optical glass I | |

| | No. | | | | | |
|---|---|---|---|---|---|---|
| | 33 | | | 34 | | |
| Glass component | | | | | | |
| ( ): Cation component | molar % | cationic % | mass % | molar % | cationic % | mass % |
| $B_2O_3$ (B) | 28.25 | 37.00 | 12.96 | 24.54 | 33.00 | 11.30 |
| $SiO_2$ (Si) | 7.63 | 5.00 | 3.02 | 11.90 | 8.00 | 4.73 |
| $GeO_2$ (Ge) | 0.00 | 0.00 | 0.00 | 0.00 | 0.00 | 0.00 |
| $Li_2O$ (Li) | 0.00 | 0.00 | 0.00 | 0.00 | 0.00 | 0.00 |

TABLE 1-continued

| | | | | | | |
|---|---|---|---|---|---|---|
| ZnO (Zn) | 28.24 | 18.50 | 15.13 | 29.74 | 20.00 | 16.01 |
| La$_2$O$_3$ (La) | 15.27 | 20.00 | 32.76 | 14.87 | 20.00 | 32.06 |
| Gd$_2$O$_3$ (Gd) | 4.58 | 6.00 | 10.91 | 4.46 | 6.00 | 10.68 |
| Y$_2$O$_3$ (Y) | 0.00 | 0.00 | 0.00 | 0.00 | 0.00 | 0.00 |
| TiO$_2$ (Ti) | 2.29 | 1.50 | 1.20 | 0.00 | 0.00 | 0.00 |
| Nb$_2$O$_5$ (Nb) | 0.00 | 0.00 | 0.00 | 0.00 | 0.00 | 0.00 |
| WO$_3$ (W) | 4.58 | 3.00 | 6.99 | 4.46 | 3.00 | 6.85 |
| Bi$_2$O$_3$ (Bi) | 0.00 | 0.00 | 0.00 | 0.00 | 0.00 | 0.00 |
| ZrO$_2$ (Zr) | 4.58 | 3.00 | 3.71 | 5.20 | 3.50 | 4.24 |
| Ta$_2$O$_5$ (Ta) | 4.58 | 6.00 | 13.32 | 4.83 | 6.50 | 14.13 |
| Na$_2$O (Na) | 0.00 | 0.00 | 0.00 | 0.00 | 0.00 | 0.00 |
| K$_2$O (K) | 0.00 | 0.00 | 0.00 | 0.00 | 0.00 | 0.00 |
| MgO (Mg) | 0.00 | 0.00 | 0.00 | 0.00 | 0.00 | 0.00 |
| CaO (Ca) | 0.00 | 0.00 | 0.00 | 0.00 | 0.00 | 0.00 |
| SrO (Sr) | 0.00 | 0.00 | 0.00 | 0.00 | 0.00 | 0.00 |
| BaO (Ba) | 0.00 | 0.00 | 0.00 | 0.00 | 0.00 | 0.00 |
| Yb$_2$O$_3$ (Yb) | 0.00 | 0.00 | 0.00 | 0.00 | 0.00 | 0.00 |
| Al$_2$O$_3$ (Al) | 0.00 | 0.00 | 0.00 | 0.00 | 0.00 | 0.00 |
| Total | 100.00 | 100.00 | 100.00 | 100.00 | 100.00 | 100.00 |
| Ti + Nb + W + Bi (=X) | — | 4.50 | — | — | 3.00 | — |
| SiO$_2$/B$_2$O$_3$ | 0.27 | — | — | 0.485 | — | — |
| La$_2$O$_3$/(La$_2$O$_3$ + Gd$_2$O$_3$ + Y$_2$O$_3$) | 0.77 | — | — | 0.77 | — | — |
| La$_2$O$_3$/(La$_2$O$_3$ + Gd$_2$O$_3$) | 0.77 | — | — | 0.77 | — | — |
| ZrO$_2$ + Ta$_2$O$_5$ + TiO$_2$ + Nb$_2$O$_5$ + WO$_3$ + Bi$_2$O$_3$ | 16.03 | — | — | 14.49 | — | — |
| Ti$^{4+}$/(Zr$^{4+}$ + Ta$^{5+}$ + Ti$^{4+}$ + Nb$^{5+}$ + W$^{5+}$ + Bi$^{3+}$) | — | 0.1111111 | — | — | 0 | — |
| Refractive index nd | | 1.885 | | | 1.87772 | |
| Abbe number vd | | 37.39 | | | 38.33 | |
| Glass transtion Temp. Tg [° C.] | | 623 | | | 623 | |
| 655-5X [° C.] | | 632.5 | | | 640 | |
| 650-5X [° C.] | | 627.5 | | | 635 | |
| 645-5X [° C.] | | 622.5 | | | 630 | |
| 640-5X [° C.] | | 617.5 | | | 625 | |
| 635-5X [° C.] | | 612.5 | | | 620 | |
| Sag temp. Ts [° C.] | | 670 | | | 669 | |
| Tp [° C.] | | 725 | | | 735 | |
| 750-5X [° C.] | | 750 | | | 750 | |
| 745-5X [° C.] | | 745 | | | 745 | |
| 740-5X [° C.] | | 740 | | | 740 | |
| 735-5X [° C.] | | 735 | | | 735 | |
| Liquidus Temp. [° C.] | | 1120 | | | 1150 | |
| Viscosity at liquidus temp [dPa · s] | | 2.0 | | | 2.5 | |
| Available time of successive pressing n (Second test) | | 100 | | | 80 | |
| t [sec] (Second test) | | 90 | | | 100 | |
| Pressing time t × n (t) [sec] (Second test) | | 9000 | | | 8000 | |
| Pressing time t × n (t) [sec] (Average of ten times) | | 1.0 × 10$^4$ | | | 1.0 × 10$^4$ | |
| Glass I/II | | Optical glass I | | | Optical glass I | |

| Glass component | No. 35 | | |
|---|---|---|---|
| ( ): Cation component | molar % | cationic % | mass % |
| B$_2$O$_3$ (B) | 24.08 | 32.50 | 11.35 |
| SiO$_2$ (Si) | 12.60 | 8.50 | 5.13 |
| GeO2(Ge) | 0.00 | 0.00 | 0.00 |
| Li$_2$O (Li) | 0.00 | 0.00 | 0.00 |
| ZnO (Zn) | 29.64 | 20.00 | 16.34 |
| La$_2$O$_3$ (La) | 14.81 | 20.00 | 32.73 |
| Gd$_2$O$_3$ (Gd) | 4.44 | 6.00 | 10.90 |
| Y$_2$O$_3$ (Y) | 0.00 | 0.00 | 0.00 |
| TiO$_2$ (Ti) | 2.22 | 1.50 | 1.20 |
| Nb$_2$O$_5$ (Nb) | 0.37 | 0.50 | 0.67 |
| WO$_3$ (W) | 2.96 | 2.00 | 4.66 |
| Bi$_2$O$_3$ (Bi) | 0.00 | 0.00 | 0.00 |
| ZrO$_2$ (Zr) | 4.44 | 3.00 | 3.71 |
| Ta$_2$O$_5$ (Ta) | 4.44 | 6.00 | 13.31 |
| Na$_2$O (Na) | 0.00 | 0.00 | 0.00 |
| K$_2$O (K) | 0.00 | 0.00 | 0.00 |
| MgO (Mg) | 0.00 | 0.00 | 0.00 |
| CaO (Ca) | 0.00 | 0.00 | 0.00 |
| SrO (Sr) | 0.00 | 0.00 | 0.00 |
| BaO (Ba) | 0.00 | 0.00 | 0.00 |

TABLE 1-continued

|  | | | |
|---|---|---|---|
| $Yb_2O_3$ (Yb) | 0.00 | 0.00 | 0.00 |
| $Al_2O_3$ (Al) | 0.00 | 0.00 | 0.00 |
| Total | 100.00 | 100.00 | 100.00 |
| Ti + Nb + W + Bi (=X) | — | 4.00 | — |
| $SiO_2/B_2O_3$ | 0.52 | — | — |
| $La_2O_3/(La_2O_3 + Gd_2O_3 + Y_2O_3)$ | 0.77 | — | — |
| $La_2O_3/(La_2O_3 + Gd_2O_3)$ | 0.77 | — | — |
| $ZrO_2 + Ta_2O_5 + TiO_2 + Nb_2O_5 + WO_3 + Bi_2O_3$ | 14.43 | — | — |
| $Ti^{4+}/(Zr^{4+} + Ta^{5+} + Ti^{4+} + Nb^{5+} + W^{6+} + Bi^{3+})$ | — | 0.1153846 | — |
| Refractive index nd | | 1.87963 | |
| Abbe number νd | | 37.75 | |
| Glass transtion Temp. Tg [° C.] | | 627 | |
| 655-5X [° C.] | | 635 | |
| 650-5X [° C.] | | 630 | |
| 645-5X [° C.] | | 625 | |
| 640-5X [° C.] | | 620 | |
| 635-5X [° C.] | | 615 | |
| Sag temp. Ts [° C.] | | 675 | |
| Tp [° C.] | | 740 | |
| 750-5X [° C.] | | 750 | |
| 745-5X [° C.] | | 745 | |
| 740-5X [° C.] | | 740 | |
| 735-5X [° C.] | | 735 | |
| Liquidus Temp. [° C.] | | 1125 | |
| Viscosity at liquidus temp [dPa · s] | | 3.0 | |
| Available time of successive pressing n (Second test) | | 75 | |
| t [sec] (Second test) | | 100 | |
| Pressing time t × n (t) [sec] (Second test) | | 7500 | |
| Pressing time t × n (t) [sec] (Average of ten times) | | $1.0 \times 10^4$ | |
| Glass I/II | | Optical glass I | |

(Note 1)
Ti + Nb + W + Bi is the total quantity of Ti, Nb, W, and Bi denoted as a cation percentage.
(Note 2)
Tp is the temperature at which the glass exhibited a viscosity of $10^{7.2}$ dPa · s.

The various characteristics of the optical glasses were measured by the following methods.

(1) Refractive Index nd and Abbé number ν(nu)d

For those glasses obtained by reducing the temperature at a temperature reduction rate of 30° C./hour, the refractive indexes nd, nF, and nc were measured by the refractive index measuring methods of the Japan Optical Glass Industry Association Standards. The Abbé number ν(nu)d was calculated from the results.

(2) Liquidus Temperature LT and Viscosity at Liquidus Temperature

The glass was placed in a furnace that had been heated to a prescribed temperature and kept there for two hours. After cooling, the interior of the glass was observed at 100-fold magnification by optical microscopy and the liquidus temperature was determined based on whether or not crystals were present. The viscosity at the liquidus temperature of the glass was measured by the rotating cylinder method based on "JIS Z 8803-1991 'The viscosity of liquids—Measurement methods' 8. The measurement of viscosity with a single cylinder rotating viscometer."

(3) Glass Transition Temperature Tg and Sag Temperature Ts

These were measured at a rate of temperature rise of 4° C./minute with a thermomechanical analyzer (TMA) made by Bruker AXS.

(4) Tp

Measurement was conducted over a viscosity range of $10^5$ to $10^9$ dPa·s with a parallel plate viscometer, and the temperature at which a viscosity of $10^{7.2}$ dPa·s was exhibited was adopted as the Tp.

[Embodiment 2]

Glass starting materials blended to yield the various optical glasses prepared in Embodiment 1 were melted, clarified, and homogenized to prepare glass melts. Glass melt droplets were dripped from platinum nozzles and received in preform forming molds. Spherical preforms comprised of the various glasses were molded while floating the droplets by applying air pressure.

Further, the above glass melts were caused to flow continuously out of platinum pipes, the lower end portions were received in preform forming molds, constrictions were formed in the glass melt flows, and the preform forming molds were lowered abruptly to sever the glass melt flows at the constrictions. The glass melt gobs that were separated were received on preform forming molds, and preforms comprised of the various glasses were molded while being floated by applying air pressure.

Further, the above glass melts were caused to flow continuously out of platinum pipes, the lower end portions were received in preform forming molds, constrictions were formed in the glass melt flows, and the preform forming molds were lowered abruptly to sever the glass melt flows at the constrictions. The glass melt gobs that were separated were received on preform forming molds, press molded on the preform forming molds, and then molded into preforms comprised of the various glasses while being floated by applying air pressure.

No devitrification, striae, or other defects were observed on the preforms obtained by either of the above methods. The preforms were optically uniform.

[Embodiment 3]

The glass melts prepared in Embodiment 2 were caused to continuously flow out into casting molds, molded into glass blocks, annealed, and cut to obtain multiple pieces of glass. The pieces of glass were ground and polished to prepare preforms comprised of the various above-described types of glass.

No devitrification, striae, or other defects were observed on the preforms obtained by this method. The preforms were optically uniform.

[Embodiment 4]

The surfaces of the preforms prepared in Embodiments 2 and 3 were coated with carbon-containing films. The preforms were placed in pressing molds comprising upper, lower, and sleeve molds of SiC on the molding surfaces of which were provided carbon-based mold release films. The pressing molds and the preforms were heated together in a nitrogen atmosphere to soften the preforms. Precision press molding was conducted to fabricate various lenses such as aspherical convex meniscus lenses, aspherical concave meniscus lenses, aspherical biconvex lenses, and aspherical biconcave lenses comprised of the various above-described glasses. (This corresponded to Optical Element Manufacturing Method 1.)

Similarly, preforms coated with carbon-containing films were heated, placed in pressing molds, comprised of upper, lower, and sleeve molds of SiC on the molding surfaces of which were provided carbon-based mold release films, that were preheated separately from the preforms, and precision press molding was conducted to fabricate various lenses such as aspherical convex meniscus lenses, aspherical concave meniscus lenses, aspherical biconvex lenses, aspherical biconcave lenses comprised of the various above-described glasses. (This corresponded to Optical Element Manufacturing Method 2.)

In each of the above examples, the molding conditions of above-described Optical Element Manufacturing Methods 1 and 2 were applied.

After being removed from the pressing mold, each of the optical elements was subjected to oxidation to remove the carbon-containing film remaining on the glass surface.

As a first test, Table 2 shows the time t×n corresponding to the extended press molding time obtained by multiplying the number of press molding cycles "n" in which smooth precision press molding was achieved with a single pressing mold by the time "t" during which the temperature of the glass exceeded the glass transition temperature in a single cycle of precision press molding with pressure being applied to the glass by the pressing mold, that is, in a state where the molding surface was in tight contact with the glass, when employing the various optical glasses of Nos. 1 to 11 in Table 1.

TABLE 2

| | Time t × n [sec] | |
| --- | --- | --- |
| Example | Manufacturing Method 1 | Manufacturing Method 2 |
| 1 | 20000 | 20000 |
| 2 | 8800 | 8800 |
| 3 | 8500 | 8500 |
| 4 | 21250 | 21250 |
| 5 | 42500 | 42500 |
| 6 | 42500 | 42500 |
| 7 | 42500 | 42500 |
| 8 | 8500 | 8500 |
| 9 | 8500 | 8500 |
| 10 | 8500 | 8500 |
| 11 | 8500 | 8500 |

As a second test, Table 1 shows the time t×n corresponding to the extended press molding time obtained by multiplying the number of press molding cycles "n" in which smooth precision press molding was achieved with a single pressing mold by the time "t" during which the temperature of the glass exceeded the glass transition temperature in a single cycle of precision press molding with pressure being applied to the glass by the pressing mold, that is, in a state where the molding surface was in tight contact with the glass, when employing the various optical glasses of Nos. 5 to 35 in Table 1.

Separately from the first and second tests, a test in which the value of t×n was calculated for precision press molding using the various optical glasses of Nos. 1 to 35 in Table 1 was conducted 10 times, and the arithmetic mean of t×n (10 times) was calculated. Table 1 shows the various arithmetic means (10 times) of t×n obtained. The values of these arithmetic means matched the results of the second test.

Each of the optical glasses exhibited good large quantity production properties.

When glasses outside the ranges of both Optical Glass I and Optical Glass II were used to conduct precision press molding, n×t did not reach 4,000 seconds. Even when precision press molding was possible, large quantity production properties were poor.

[Embodiment 5]

The glass melts prepared in Embodiment 2 were caused to flow out into casting molds and glass blocks were fabricated. The blocks were cut, ground, and polished to fabricate various spherical lenses and prisms.

[Embodiment 6]

The aspherical convex meniscus lenses, aspherical concave meniscus lenses, aspherical biconvex lenses, and aspherical biconcave lenses fabricated in Embodiment 4 and the various spherical lenses fabricated in Embodiment 5 were used to fabricate various replacement lenses for a single-lens reflex camera with various built-in lenses.

The aspherical convex meniscus lenses, aspherical concave meniscus lenses, aspherical biconvex lenses, and aspherical biconcave lenses fabricated in Embodiment 4 and the various spherical lenses fabricated in Embodiment 5 were used to fabricate the various optical systems of compact digital cameras and modularized. Image sensors such as CCDs or CMOSs were mounted in these optical systems and modularized.

Using the various lenses obtained in Embodiments 3 and 4 in this manner made it possible to obtain highly functional, compact optical systems, replacement lenses, lens modules, and imaging devices.

[Embodiment 7]

A preform having two pressed surfaces facing in opposite directions and an axis of rotational symmetry running through the center of the two pressed surfaces was prepared using the various optical glasses of Nos. 1 to 35 in Table 1.

A glass melt that had been clarified and homogenized was caused to flow out, glass melt gobs of desired weight were separated, the upper surfaces of the glass gobs were pressed on the concave portions of preform forming molds, or the molded glass was ground and polished, to obtain the various preforms below.

A preform with one convex and one concave surface to be pressed.

A preform with one convex and one flat surface to be pressed.

A preform with one convex surface to be pressed, and another convex surface to be pressed of lesser curvature than the first convex pressed surface.

When these preforms were precision press molded to obtain aspherical convex meniscus lenses and aspherical concave meniscus lenses, good large quantity production properties were achieved. Good large quantity production properties were also achieved with aspherical biconcave lenses. It was also possible to fabricate lenses with large diameters of 20 mm or greater, lenses with a maximum thickness along the optical axis exceeding 3 mm (desirably lenses with a maximum thickness exceeding 3 mm, preferably lenses with a maximum thickness exceeding 5 mm), and lenses in which the thickness ratio of the maximum thickness along the optical axis to the minimum thickness exceeded 1.5 (desirably lenses with a thickness ratio exceeding 2.0) with good productivity.

A preform in which both surfaces to be pressed were flat.

A perform in which both surfaces to be pressed were concave.

A perform with one flat and one concave surface to be pressed.

Good large quantity production properties were achieved for aspherical biconcave lenses by precision press molding using these preforms.

A preform in which both surfaces to be pressed were convex.

A preform with one convex and one concave surface to be pressed.

Good large quantity production properties were achieved for aspherical biconvex lenses by precision press molding using these preforms. It was also possible to fabricate lenses with large diameters of 20 mm or greater and lenses with a center thickness exceeding 2 mm with good productivity.

In all cases, large-quantity productivity can be increased by manufacturing preforms with shapes better approximating the shape of the targeted lens.

The various above lenses were used to fabricate various replacement lenses for a single-lens reflex camera with various built-in lenses.

Various optical systems of compact digital cameras were fabricated with the various above lenses and these systems were modularized. Image sensors such as CCDs and CMOSs were mounted in these optical systems and modularized.

This made it possible to obtain highly functional, compact optical systems, replacement lenses, lens modules, and imaging devices.

The invention claimed is:

1. An optical Glass characterized by comprising, denoted as molar percentages:

| | |
|---|---|
| $B_2O_3$ | 5 to 45 percent; |
| $SiO_2$ | 0 to 6 percent (excluding 6 percent); |
| $Li_2O$, $Na_2O$, $K_2O$ in total | 0 to 3 percent; |
| ZnO | 10 to 40 percent; |
| $La_2O_3$ | 5 to 30 percent; |
| $Gd_2O_3$ | 1 to 20 percent; and |
| $ZrO_2$, $TaO_2$, $TiO_2$, $Nb_2O_5$, $WO_3$, and $Bi_2O_3$ in total | 12.5 to 20 percent; |

$ZrO_2$, $TaO_2$, $TiO_2$, $Nb_2O_5$, $WO_3$, and $Bi_2O_3$ in total 12.5 to 20 percent;
in that the cation ratio of the $Ti^{4+}$ content relative to the total content of $Zr^{4+}$, $Ta^{5+}$, $Ti^{4+}$, $Nb^{5+}$, $W^{6+}$, and $Bi^{3+}$ is 0.30 or lower; in that the temperature Tp at which a viscosity of $10^{7.2}$ dPa·s is exhibited is 706° C. or lower; and in that the refractive index nd and the Abbé number ν(nu)d satisfy all of relations (I) to (IV) below $$34.0 \leq vd < 40 \tag{I}$$

$$nd \geq 1.87 \tag{II}$$

$$nd \geq 2.245 - 0.01 \times vd \tag{III}$$

$$nd \leq 2.28 - 0.01 \times vd \tag{IV}.$$

2. The optical Glass according to claim 1, wherein the glass further comprises, denoted as molar percentages:

$ZrO_2$ equal to or less than 10 percent;

| | |
|---|---|
| $ZrO_2$ | equal to or less than 10 percent; |
| $Ta_2O_5$ | equal to or less than 15 percent; |
| $TiO_2$ | equal to or less than 10 percent; |
| $Nb_2O_5$ | equal to or less than 8 percent; |
| $WO_3$ | equal to or less than 20 percent; and |
| $Bi_2O_3$ | equal to or less than 10 molar percent. |

3. The optical Glass according to claim 1, wherein the glass further comprises, denoted as molar percentages:

| | |
|---|---|
| MgO, CaO, SrO, and BaO in total | 0 to 10 percent; |
| $Y_2O_3$ | 0 to 10 percent; |
| $Yb_2O_3$ | 0 to 10 percent; and |
| $Al_2O_3$ | 0 to 10 percent. |

4. The optical Glass according to claim 1, characterized in that the glass further comprises as an optional element 0 to 10 molar percent of $Y_2O_3$; and
the ratio of the $La_2O_3$ content to the total content of $La_2O_3$, $Gd_2O_3$, and $Y_2O_3$ ($La_2O_3+Gd_2O_3+Y_2O_3$), which is ($La_2O_3/(La_2O_3+Gd_2O_3+Y_2O_3)$) is greater than 0.66.

5. The optical Glass according to claim 1, wherein the glass comprises, denoted as molar percentages:

| | |
|---|---|
| $TiO_2$ | equal to or less than 10 percent; |
| $Nb_2O_5$ | equal to or less than 8 percent; |
| $WO_3$ | equal to or less than 20 percent; and |
| $Bi_2O_3$ | equal to or less than 10 percent. |

6. The optical Glass according to claim 1, wherein the glass comprises:

$Ta_2O_5$ 1 to 15 molar percent.

7. The optical Glass according to claim 1, wherein liquidus temperature is equal to or lower than 1,200° C.

8. A preform for precise press molding comprised of the optical glass according to claim 1.

9. An optical element comprised of the optical glass according to claim 1.

10. A method of manufacturing an optical element comprising precision press molding a preform according to claim 8.

11. A method of manufacturing an optical element comprising precision press molding preforms according to claim 8 by repeatedly being processed in a precision press molding step using a single pressing mold to produce a large quantity of optical elements.

12. The method of manufacturing an optical element according to claim 10, wherein the preform is introduced into a pressing mold, the preform and pressing mold are heated together, and precision press molding is conducted.

13. The method of manufacturing an optical element according to claim 11, wherein the preform is introduced into a pressing mold, the preform and pressing mold are heated together, and precision press molding is conducted.

14. The method of manufacturing an optical element according to claim 10 or 11, wherein the preform that has been heated is introduced into a preheated pressing mold and precision press molding is conducted.

15. An imaging device equipped with the optical element according to claim 9.

* * * * *